US009948492B2

(12) United States Patent
Jung et al.

(10) Patent No.: US 9,948,492 B2
(45) Date of Patent: *Apr. 17, 2018

(54) METHODS AND SYSTEMS FOR MANAGING DATA

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 279 days.

This patent is subject to a terminal disclaimer.

(21) Appl. No.: 13/685,491

(22) Filed: Nov. 26, 2012

(65) Prior Publication Data

US 2014/0123305 A1    May 1, 2014

Related U.S. Application Data

(63) Continuation-in-part of application No. 13/987,300, filed on Oct. 30, 2012, which is a continuation-in-part (Continued)

(51) Int. Cl.
*H04L 29/06* (2006.01)
*H04L 29/08* (2006.01)
(Continued)

(52) U.S. Cl.
CPC ...... *H04L 29/0602* (2013.01); *G06F 21/60* (2013.01); *G06F 21/6218* (2013.01);
(Continued)

(58) Field of Classification Search
CPC .......... H04L 29/06; H04L 63/10; G06F 21/60
See application file for complete search history.

(56) References Cited

U.S. PATENT DOCUMENTS

| 6,029,175 A | 2/2000 | Chow et al. |
| 6,122,520 A | 9/2000 | Want et al. |

(Continued)

FOREIGN PATENT DOCUMENTS

| EP | 1818807 A | 8/2007 | |
| WO | WO 01/28273 | * 4/2001 | ............... H04Q 7/38 |
| WO | WO 01/28273 A1 | 4/2001 | |

OTHER PUBLICATIONS

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.

(Continued)

*Primary Examiner* — Brandon Hoffman
*Assistant Examiner* — Wasika Nipa

(57) ABSTRACT

Computationally implemented methods and systems include acquiring data regarding a device having a particular protected portion for which the device is configured to selectively allow access, facilitating presentation of an offer to carry out at least one service, said at least one service at least partly related to the device, in exchange for access to the particular protected portion of the device, and facilitating performance of at least a portion of the at least one service that is at least partly related to the device, in response to a grant of access to the particular protected portion of the device. In addition to the foregoing, other aspects are described in the claims, drawings, and text.

48 Claims, 35 Drawing Sheets

Related U.S. Application Data of application No. 13/385,604, filed on Oct. 31, 2012, now Pat. No. 9,088,450.

(51) Int. Cl.
*G06F 21/60* (2013.01)
*H04L 12/24* (2006.01)
*G06F 21/62* (2013.01)

(52) U.S. Cl.
CPC .... *G06F 21/6254* (2013.01); *H04L 29/06551* (2013.01); *H04L 29/08072* (2013.01); *H04L 41/5054* (2013.01); *H04L 63/10* (2013.01); *H04L 67/16* (2013.01); *H04L 67/18* (2013.01); *G06F 2221/2111* (2013.01); *G06F 2221/2117* (2013.01); *G06F 2221/2141* (2013.01); *G06F 2221/2149* (2013.01); *G06F 2221/2153* (2013.01)

(56) References Cited

U.S. PATENT DOCUMENTS

| | | | |
|---|---|---|---|
| 6,509,830 B1 | 1/2003 | Elliot | |
| 6,871,277 B1* | 3/2005 | Keronen | 713/167 |
| 7,178,034 B2 | 2/2007 | Cihula et al. | |
| 7,203,752 B2 | 4/2007 | Rice et al. | |
| 7,269,853 B1 | 9/2007 | Dunn | |
| 7,496,652 B2 | 2/2009 | Pezzutti | |
| 7,647,164 B2 | 1/2010 | Reeves | |
| 7,685,238 B2* | 3/2010 | Etelapera | 709/205 |
| 7,849,311 B2 | 12/2010 | Donlin et al. | |
| 7,860,807 B2 | 12/2010 | Kaneko et al. | |
| 7,873,957 B2 | 1/2011 | Nallipogu et al. | |
| 7,913,312 B2 | 3/2011 | de Jong | |
| 7,917,154 B2 | 3/2011 | Fortescue et al. | |
| 7,996,682 B2 | 8/2011 | Schutz et al. | |
| 8,175,794 B1 | 5/2012 | Szybalski | |
| 8,364,389 B2 | 1/2013 | Dorogusker et al. | |
| 8,387,155 B2 | 2/2013 | Gregg et al. | |
| 8,504,729 B2 | 8/2013 | Pezzutti | |
| 8,554,608 B1 | 10/2013 | O'Connor | |
| 8,578,483 B2 | 11/2013 | Seshadri et al. | |
| 8,630,494 B1 | 1/2014 | Svendsen | |
| 8,756,321 B2 | 6/2014 | Clark et al. | |
| 8,838,751 B1 | 9/2014 | Scofield et al. | |
| 9,047,648 B1 | 6/2015 | Lekutai et al. | |
| 2001/0025316 A1 | 9/2001 | Oh | |
| 2002/0032798 A1 | 3/2002 | Xu | |
| 2003/0023726 A1 | 1/2003 | Rice et al. | |
| 2003/0045308 A1 | 3/2003 | Sidhu et al. | |
| 2003/0145229 A1 | 7/2003 | Cohen et al. | |
| 2003/0191877 A1 | 10/2003 | Zaudtke et al. | |
| 2004/0002902 A1 | 1/2004 | Muehlhaeuser | |
| 2004/0036611 A1 | 2/2004 | Kidney et al. | |
| 2004/0128500 A1 | 7/2004 | Cihula et al. | |
| 2004/0214576 A1 | 10/2004 | Myers et al. | |
| 2004/0230835 A1 | 11/2004 | Goldfeder et al. | |
| 2005/0162699 A1 | 7/2005 | Fukunaga et al. | |
| 2005/0182825 A1 | 8/2005 | Eytchison | |
| 2005/0272445 A1 | 12/2005 | Zellner | |
| 2005/0278342 A1 | 12/2005 | Abdo et al. | |
| 2006/0010047 A1 | 1/2006 | Minor | |
| 2006/0229778 A1 | 10/2006 | Obradovich et al. | |
| 2007/0006321 A1 | 1/2007 | Bantz et al. | |
| 2007/0044143 A1 | 2/2007 | Zhu et al. | |
| 2007/0113079 A1 | 5/2007 | Ito et al. | |
| 2007/0136466 A1 | 6/2007 | Etelapera | |
| 2007/0142727 A1 | 6/2007 | Zhang et al. | |
| 2007/0232268 A1 | 10/2007 | Park et al. | |
| 2007/0273583 A1 | 11/2007 | Rosenberg | |
| 2008/0046886 A1 | 2/2008 | Brown et al. | |
| 2008/0076451 A1 | 3/2008 | Sheha et al. | |
| 2008/0102856 A1 | 5/2008 | Fortescue et al. | |
| 2008/0126541 A1 | 5/2008 | Rosenberg et al. | |
| 2008/0153670 A1 | 6/2008 | McKirdy et al. | |
| 2008/0189793 A1 | 8/2008 | Kirkup et al. | |
| 2008/0207232 A1 | 8/2008 | Rice et al. | |
| 2008/0229389 A1 | 9/2008 | Singh et al. | |
| 2009/0077085 A1 | 3/2009 | Olivieri et al. | |
| 2009/0160970 A1 | 6/2009 | Fredlund et al. | |
| 2009/0248833 A1 | 10/2009 | Frazier | |
| 2010/0015993 A1 | 1/2010 | Dingler et al. | |
| 2010/0024020 A1 | 1/2010 | Baugher et al. | |
| 2010/0035596 A1 | 2/2010 | Nachman et al. | |
| 2010/0070475 A1 | 3/2010 | Chen | |
| 2010/0082237 A1 | 4/2010 | Black | |
| 2010/0107225 A1 | 4/2010 | Spencer et al. | |
| 2010/0151842 A1 | 6/2010 | De Vries | |
| 2010/0238985 A1 | 9/2010 | Traywick et al. | |
| 2010/0324819 A1 | 12/2010 | Nurminen et al. | |
| 2011/0018759 A1* | 1/2011 | Bennett | G01C 21/3688 342/357.4 |
| 2011/0022468 A1 | 1/2011 | Muster et al. | |
| 2011/0059693 A1 | 3/2011 | O'Sullivan | |
| 2011/0093941 A1 | 4/2011 | Liu et al. | |
| 2011/0099040 A1 | 4/2011 | Felt et al. | |
| 2011/0125866 A1 | 5/2011 | Williams | |
| 2011/0128568 A1 | 6/2011 | Bhogal et al. | |
| 2011/0136472 A1 | 6/2011 | Rector et al. | |
| 2011/0145089 A1 | 6/2011 | Khunger et al. | |
| 2011/0173681 A1 | 7/2011 | Qureshi et al. | |
| 2011/0179366 A1* | 7/2011 | Chae | 715/764 |
| 2011/0190009 A1 | 8/2011 | Gerber, Jr. et al. | |
| 2011/0205965 A1 | 8/2011 | Sprigg et al. | |
| 2011/0209221 A1 | 8/2011 | Hanson et al. | |
| 2011/0231092 A1 | 9/2011 | Kuo et al. | |
| 2011/0243553 A1 | 10/2011 | Russell | |
| 2011/0274011 A1 | 11/2011 | Stuempert et al. | |
| 2011/0295899 A1 | 12/2011 | James et al. | |
| 2011/0313804 A1 | 12/2011 | Camp et al. | |
| 2011/0313880 A1 | 12/2011 | Paul et al. | |
| 2012/0016951 A1 | 1/2012 | Li et al. | |
| 2012/0017252 A1 | 1/2012 | Li et al. | |
| 2012/0036345 A1 | 2/2012 | Chen et al. | |
| 2012/0054841 A1 | 3/2012 | Schultz et al. | |
| 2012/0084247 A1 | 4/2012 | Aguera y Arcas et al. | |
| 2012/0089465 A1 | 4/2012 | Froloff | |
| 2012/0096080 A1 | 4/2012 | Levesque et al. | |
| 2012/0101952 A1 | 4/2012 | Raleigh et al. | |
| 2012/0117232 A1 | 5/2012 | Brown et al. | |
| 2012/0143662 A1* | 6/2012 | Heath | G01W 1/00 705/14.5 |
| 2012/0179764 A1 | 7/2012 | Erdal | |
| 2012/0185912 A1* | 7/2012 | Lee et al. | 726/1 |
| 2012/0197852 A1* | 8/2012 | Dutta | H04L 67/2804 707/692 |
| 2012/0209923 A1 | 8/2012 | Mathur et al. | |
| 2012/0222083 A1 | 8/2012 | Vaha-Sipila et al. | |
| 2012/0252498 A1 | 10/2012 | Trinchero et al. | |
| 2012/0291101 A1 | 11/2012 | Ahlstrom et al. | |
| 2012/0293465 A1 | 11/2012 | Nandu et al. | |
| 2012/0296455 A1 | 11/2012 | Ohnemus et al. | |
| 2012/0317565 A1 | 12/2012 | Carrara et al. | |
| 2013/0014212 A1 | 1/2013 | Cohen | |
| 2013/0046632 A1 | 2/2013 | Grigg et al. | |
| 2013/0054139 A1 | 2/2013 | Bodin et al. | |
| 2013/0059698 A1 | 3/2013 | Barton | |
| 2013/0110854 A1 | 5/2013 | Lockhart et al. | |
| 2013/0124546 A1 | 5/2013 | Wormley et al. | |
| 2013/0179244 A1 | 7/2013 | Laffoon et al. | |
| 2013/0179988 A1 | 7/2013 | Bekker et al. | |
| 2013/0218704 A1 | 8/2013 | Duncan et al. | |
| 2013/0219461 A1 | 8/2013 | Esaki et al. | |
| 2013/0232573 A1 | 9/2013 | Saidi et al. | |
| 2013/0263000 A1 | 10/2013 | Lucas et al. | |
| 2013/0263206 A1 | 10/2013 | Nefedov et al. | |
| 2013/0268378 A1 | 10/2013 | Yovin | |
| 2013/0282227 A1 | 10/2013 | Chen et al. | |
| 2013/0290359 A1 | 10/2013 | Eronen et al. | |
| 2013/0318627 A1 | 11/2013 | Lundkvist et al. | |
| 2013/0339234 A1 | 12/2013 | Prakash et al. | |
| 2014/0006616 A1 | 1/2014 | Aad et al. | |
| 2014/0031959 A1 | 1/2014 | Glode et al. | |
| 2014/0047062 A1 | 2/2014 | Krueger et al. | |

(56) References Cited

U.S. PATENT DOCUMENTS

| | | |
|---|---|---|
| 2014/0059695 A1 | 2/2014 | Parecki et al. |
| 2014/0074570 A1 | 3/2014 | Hope et al. |
| 2014/0078304 A1 | 3/2014 | Othmer |
| 2014/0122890 A1 | 5/2014 | Prot |
| 2014/0123300 A1 | 5/2014 | Jung et al. |
| 2014/0195349 A1 | 7/2014 | Muster et al. |
| 2015/0222641 A1 | 8/2015 | Lu et al. |

OTHER PUBLICATIONS

PCT International Search Report; International App. No. PCT/US14/19562; dated Jun. 10, 2014; pp. 1-2.

Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.

Holder, Joseph; "BlackBerry 101—Application permissions"; bearing a date of Dec. 31, 2010; printed on Sep. 28, 2016; pp. 1-6.

Extended European Search Report; European App. No. EP 14 75 7393; dated Oct. 13, 2016 (received by our Agent on Oct. 14, 2016); pp. 1-8.

Hildenbrand, Jerry; "Android app permissions—How Google gets it right . . . "; bearing a date of Feb. 2012; printed on Apr. 1, 2017; pp. 1-22; located at: http://www.androidcentral.com/android-permissions-privacy-security.

Tasker; "Total Automation for Android"; User Guide, Jul. 5, 2012;14 pages; located at: http://tasker.dinglisch.net/.

Beresford et al.; "MockDroid: trading privacy for application functionality on smartphones"; Hotmobile '11; Mar. 1-3, 2011; pp. 49-54.

\* cited by examiner

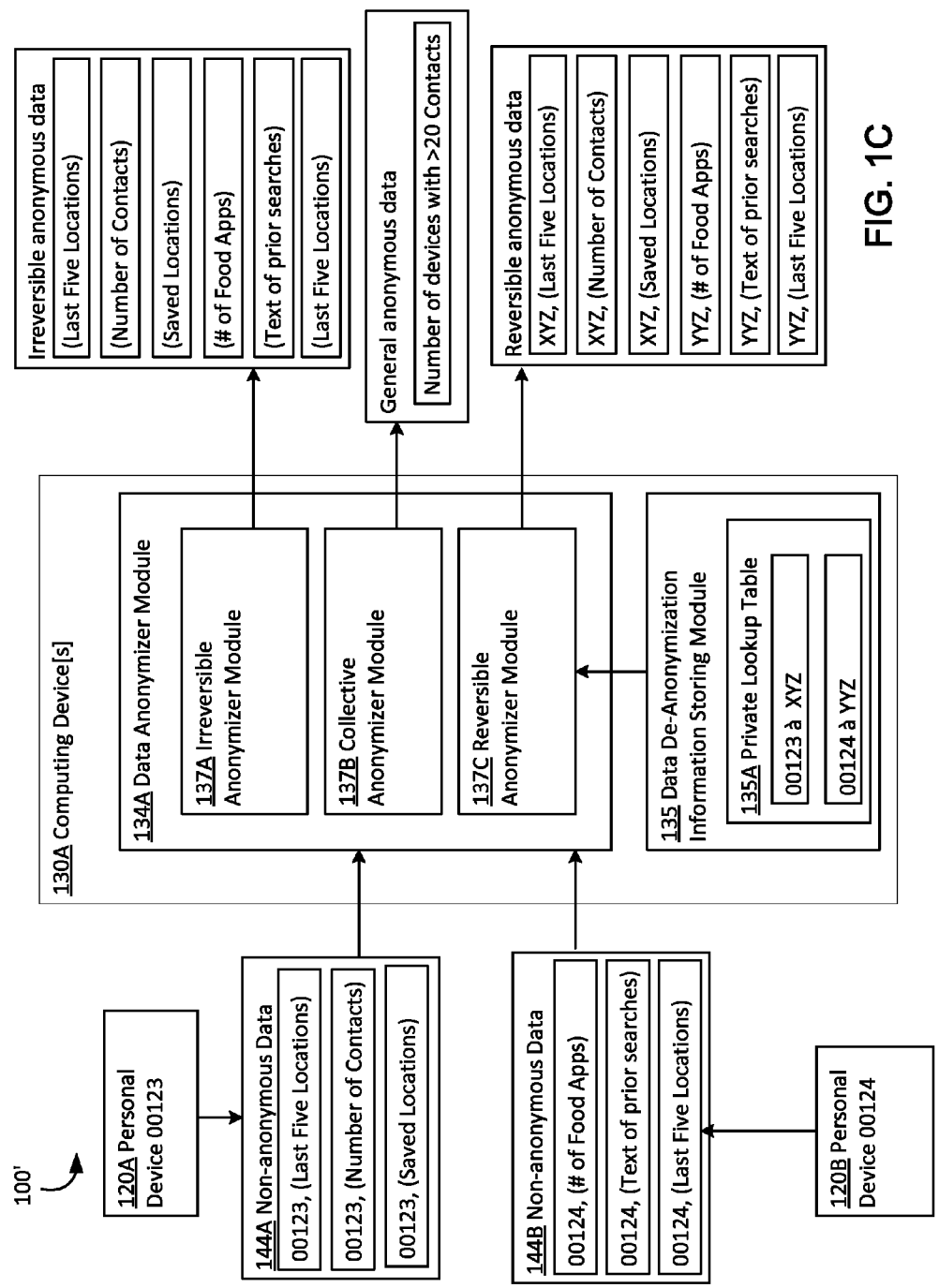

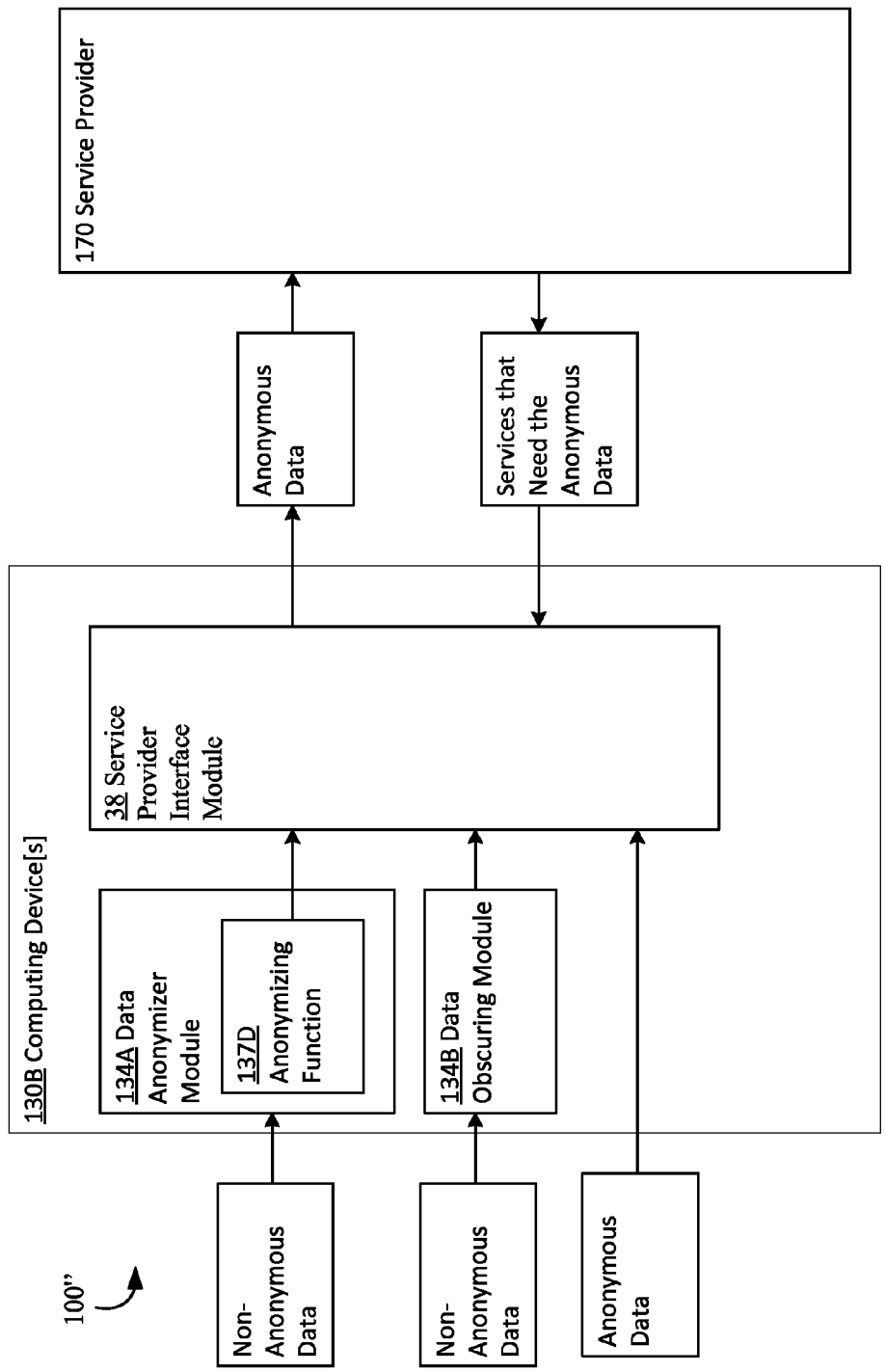

152 Data Related To A Device Having A Particular Protected Portion For Which The Device Controls Access Acquiring Module 216 Data Related To A Device Having Particular Protected Data For Which The Device Controls Access Acquiring Module 224 Data Indicating At Least One Characteristic Of Particular Protected Data For Which The Device Controls Access Acquiring Module 226 Data Indicating At Least A Portion Of The Particular Protected Data Meets A Predetermined Condition, Said Data Having Access Controlled By The Device Acquiring Module 236 Data Indicating At Least A Portion Of The Particular Protected Data Is Position Data Indicating That The Device Was Located At A Particular Position, Said Position Data Having Access Controlled By The Device Acquiring Module 238 Data Indicating At Least A Portion Of The Particular Protected Data Is Contact List Data That Has More Than Twenty-five Entries In The Contact List, Said Contact List Data Having Access Controlled By The Device Acquiring Module

152 Data Related To A Device Having A Particular Protected Portion For Which The Device Controls Access Acquiring Module 240 Derivation Data That Is Derived From Device Data For Which The Device Controls Access Acquiring Module 248 Locked Data That Is Device Data For Which One Or More Device Identifying Portions Of The Device Data That Has Been Modified, Said Device Data Access Controlled By The Device Acquiring Module 256 Locked Data That Is Particular Protected Data And An Obfuscated Identifier That Has Been Generated From The Particular Protected Data And A Device Identifier, Said Device Identifier Configured To Be Unretrievable From The Locked Identifier Acquiring Module 258 Locked Data That Is Particular Protected Data And An Obfuscated Identifier That Has Been Generated From The Particular Protected Data And A Device Identifier, Said Device Identifier Configured To Be Unretrievable From The Obfuscated Identifier By The Locked Data Acquiring Entity Acquiring Module 260 Locked Data That Is Particular Protected Data And An Obfuscated Identifier That Has Been Generated From The Particular Protected Data And A Device Identifier, Said Locked Data Acquiring Entity Configured To Be Unable To Discern A Retrievability Of The Device Identifier From The Obfuscated Identifier Acquiring Module

FIG. 3A

154 Presentation Of A Proposal To Assist In Performing At Least One Device-related Service In Return For Access To The Device Particular Protected Portion Facilitating Module 308 Presentation Of A Proposal To Perform At Least One Device-related Service In Return For Access To The Device Particular Protected Portion Executing Module 302 Presentation Of An Offer To Install At Least One Program On The Device In Return For Access To The Device Particular Protected Portion Facilitating Module 304 Presentation Of An Offer To Install At Least One Program On The Device Configured To Utilize Data Stored In The Particular Protected Portion Of The Device In Return For Access To The Device Particular Protected Portion Facilitating Module 306 Presentation Of An Offer To Install At Least One Alternative-eatery Finding Program On The Device Configured To Utilize Data Stored In The Particular Protected Portion Of The Device In Return For Access To The Device Particular Protected Portion Facilitating Module 154 Presentation Of A Proposal To Assist In Performing At Least One Device-related Service In Return For Access To The Device Particular Protected Portion Facilitating Module 324 At Least One Service Selecting At Least Partly Based On Acquired Data Module 328 At Least One Service Selecting At Least Partly Based On Acquired Data Regarding The Particular Protected Portion Of The Device Module

| 330 At Least One Service Selecting At Least Partly Based On Acquired Data Indicating An Amount Of Data Stored In The Particular Protected Portion Of The Device Module | 332 At Least One Service Selecting At Least Partly Based On Acquired Data Indicating A Type Of Data Stored In The Particular Protected Portion Of The Device Module | 334 At Least One Service Selecting At Least Partly Based On Acquired Data Describing One Or More Sensors That Are A Portion Of The Particular Protected Portion Of The Device Module | 336 At Least One Service Selecting At Least Partly Based On Acquired Data Including Sample Data From One Or More Sensors That Are A Portion Of The Particular Protected Portion Of The Device Module | 338 At Least One Service Selecting At Least Partly Based On Acquired Anonymized Data Including Data From One Or More Particular Protected Portion Sensors That Has Been Anonymized Device Module | 340 At Least One Service Selecting At Least Partly Based On Acquired Anonymized Data Including Data Stored On At Least Part Of The Particular Protected Portion That Has Been Anonymized Device Module |

326 Access To Data Acquired By The Device As Negotiated Result Of Facilitating A Presentation Of An Offer To Provide The At Least One Selected Services Module

FIG. 3C

154 Presentation Of A Proposal To Assist In Performing At Least One Device-related Service In Return For Access T The Device Particular Protected Portion Facilitating Module

342 At Least One Service Selecting At Least Partly Based On Anonymized Version Of Data From The Particular Protected Portion Of The Device Module

346 At Least One Service Selecting At Least Partly Based On Version Of Data From The Particular Protected Portion Of The Device Without Device Uniquely Identifying Information Module

348 At Least One Service Selecting At Least Partly Based On Version Of Data From The Particular Protected Portion Of The Device For Which Device Uniquely Identifying Information Has Been Modified Module

350 At Least One Service Selecting At Least Partly Based On Version Of Data From The Particular Protected Portion Of The Device For Which Device Uniquely Identifying Information Has Been Encrypted Module

352 At Least One Service Selecting At Least Partly Based On Version Of Data From The Particular Protected Portion Of The Device For Which Device Uniquely Identifying Information Has Been Substituted For Data That Is Not Device Uniquely Identifying Module

344 Access To Data That Will Enable Deanonymization Of At Least A Portion Of The Data From The Particular Protected Portion Acquired By The Device As Negotiated Result Of Facilitating A Presentation Of An Offer To Provide The At Least One Selected Services Module

FIG. 3D

METHODS AND SYSTEMS FOR MANAGING DATA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/987,300, that application having been converted to a non-provisional application on Nov. 30, 2012 and filed originally as U.S. Provisional Patent Application No. 61/720,245, titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/385,604, that application having been converted to a non-provisional application on Nov. 30, 2012 and filed originally as U.S. Provisional Patent Application No. 61/720,874, titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which is currently co-pending or is an application of which a currently co-pending application is entitled to the benefit of the filing date.

RELATED APPLICATIONS

U.S. patent application Ser. No. 13/685,485, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012 , is related to the present application.

U.S. patent application Ser. No. 13/685,609, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012 , is related to the present application.

U.S. patent application Ser. No. 13/685,488, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012 , is related to the present application.

U.S. patent application Ser. No. 13/685,612, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012, is related to the present application.

U.S. patent application Ser. No. 13/685,613, entitled METHODS AND SYSTEMS FOR MANAGING DATA, naming Edward K.Y. Jung, Royce A. Levien, Richard T. Lord, Robert W. Lord, and Mark A. Malamud as inventors, filed 26 Nov. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services.

SUMMARY

In one or more various aspects, a method includes but is not limited to acquiring data regarding a device having a particular protected portion for which the device is configured to selectively allow access, facilitating presentation of an offer to carry out at least one service, said at least one service at least partly related to the device, in exchange for access to the particular protected portion of the device, and facilitating performance of at least a portion of the at least one service that is at least partly related to the device, in response to a grant of access to the particular protected portion of the device. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring data regarding a device having a particular protected portion for which the device is configured to selectively allow access, means for facilitating presentation of an offer to carry out at least one service, said at least one service at least partly related to the device, in exchange for access to the particular protected portion of the device, and means for facilitating performance of at least a portion of the at least one service that is at least partly related to the device, in response to a grant of access to the particular protected portion of the device. In addition to the foregoing, other system aspects are described in the claims, drawings, and text forming a part of the disclosure set forth herein.

In one or more various aspects, a system includes, but is not limited to, circuitry for acquiring data regarding a device having a particular protected portion for which the device is configured to selectively allow access, circuitry for facilitating presentation of an offer to carry out at least one service, said at least one service at least partly related to the device, in exchange for access to the particular protected portion of the device, and circuitry for facilitating performance of at least a portion of the at least one service that is at least partly related to the device, in response to a grant of access to the particular protected portion of the device. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring data regarding a device having a particular protected portion for which the device is configured to selectively allow access, one or more instructions for facilitating presentation of an offer to carry out at least one service, said at least one service at least partly related to the device, in exchange for access to the particular protected portion of the device, and one or more instructions for facilitating performance of at least a portion of the at least one service that is at least partly related to the device, in response to a grant of access to the particular protected portion of the device. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring data regarding a device having a particular protected portion for which the device is configured to selectively allow access, one or more interchained physical machines ordered for facilitating presentation of an offer to carry out at least one service, said at least one service at least partly related to the device, in exchange for access to the particular protected portion of the device, and one or more interchained physical machines ordered for facilitating performance of at least a portion of the at least one service that is at least partly related to the device, in response to a grant of access to the particular protected portion of the device.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1C shows a high level block diagram of a computing device 130A operating in an exemplary embodiment 100', according to an embodiment.

FIG. 1D shows a high-level block diagram of a computing device 130B operating in an exemplary embodiment 100", according to an embodiment.

FIG. 2, including FIGS. 2A-2E, shows a particular perspective of the data related to a device having a particular protected portion for which the device controls access acquiring module 152 of processing module 150 of computing device 130 of FIG. 1B, according to an embodiment.

FIG. 3, including FIGS. 3A-3F, shows a particular perspective of the presentation of a proposal to assist in performing at least one device-related service in return for access to the device particular protected portion facilitating module 154 of processing module 150 of computing device 130 of FIG. 1B, according to an embodiment.

FIG. 4, including

FIG. 7I is a high-level logic flow chart of a process depicting alternate implementations of an offer to carry out a service presentation facilitating operation 504, according to one or more embodiments.

DETAILED DESCRIPTION

Figure 1A:
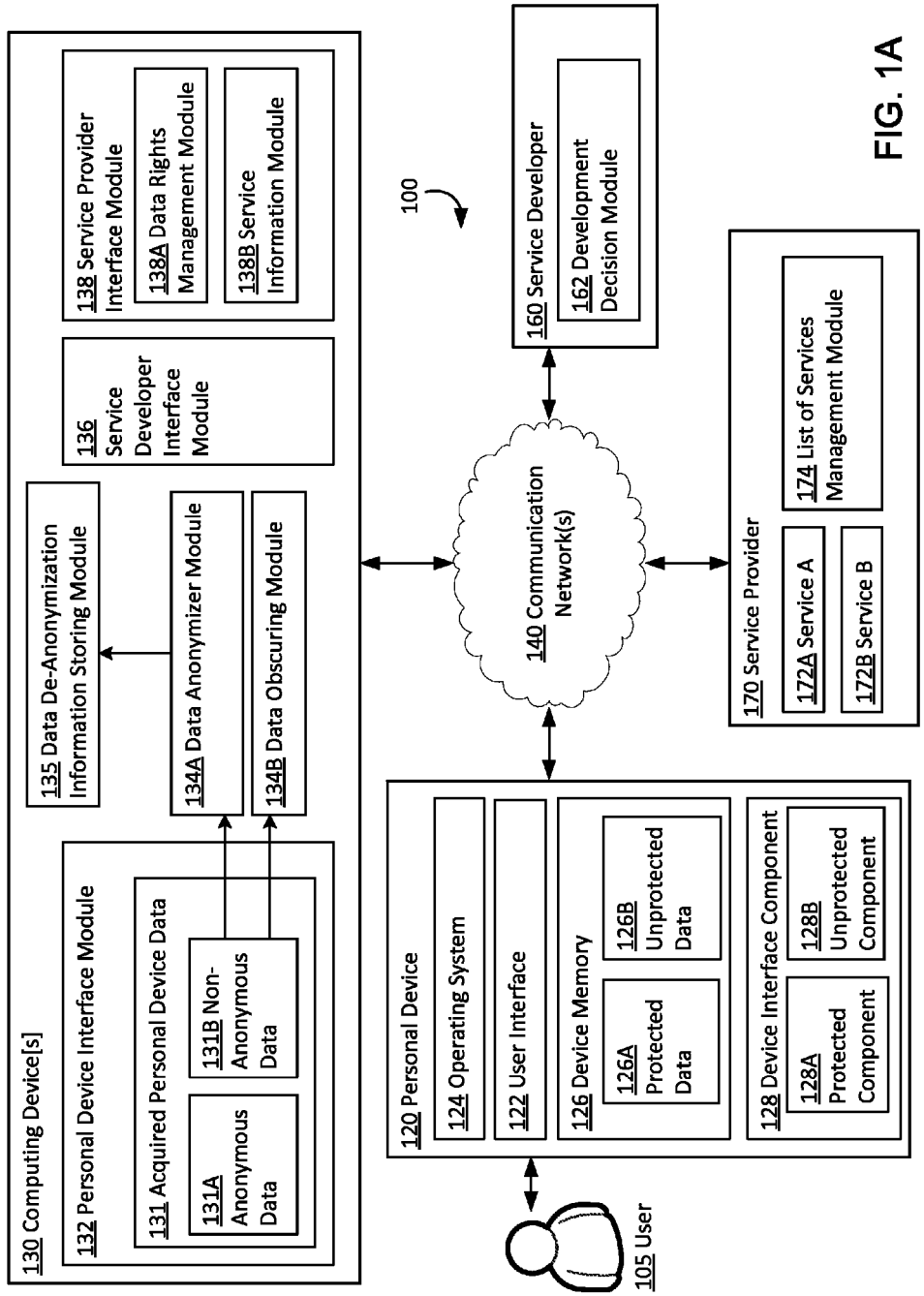
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring data regarding a device having a particular protected portion for which the device is configured to selectively allow access, facilitating presentation of an offer to carry out at least one service, said at least one service at least partly related to the device, in exchange for access to the particular protected portion of the device, and facilitating performance of at least a portion of the at least one service that is at least partly related to the device, in response to a grant of access to the particular protected portion of the device.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1, FIG. 1 illustrates an example environment 100 in which the methods, systems, circuitry, articles of manufacture, and computer program products and architecture, in accordance with various embodiments, may be implemented by one or more computing devices 30 As shown in FIG. 1A, one or more personal devices 20, one or more service providers 70, one or more service developers 60, and one or more computing devices 30 may communicate via one or more communication networks 40. In an embodiment, service provider 70 may have one or more services that personal device 20 may want. In an embodiment, computing device 30, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 20. In an embodiment, as described in more detail herein, computing device 30 may have access to some or all of the data on personal device 20. In another embodiment, computing device 30 may have access to only a portion of the data on personal device 20. In still another embodiment, computing device 30 may have access to a modified version of the data on personal device 20. Specifically, in an embodiment, computing device 20 may have access to the data stored on personal device 20, but in anonymous form.

In an embodiment, computing device 30 may offer one or more services to personal device 20. In an embodiment, the offer of one or more services may be conditional on a grant of access to part or all of the data stored and/or collected by personal device 20. In an embodiment, computing device 30 may receive one or more services from service provider 70 and/or service developer 60, and may select one or more of the received services for presentation to the personal device 20. In an embodiment, the data from personal device 20 may be shared with one or more of service provider 70 and service developer 60. In an embodiment, the data from personal device 20 may be anonymized prior to sharing with service developer 60 and/or service developer 70.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 20 may include a user interface 122. User interface 122 may include any hardware, software, firmware, and combination thereof that allows a user 105 to interact with a personal device 120, and for a personal device 120 to interact with a user 105. In some embodiments, user interface 122 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating on the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 is a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 30 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 30 may request data from personal device 120. In some embodiments, computing device 30 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 30 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially or non-uniquely identify its origin, e.g., the user 105 or the personal device 120 from which the anonymous data came. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Referring to FIGS. 1A-1D, in an embodiment, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multi-dimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the anonymized data may be used by the service provider interface module 38 to give data to the service provider 170, either to carry out a portion of a service, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Referring again to FIG. 1B, FIG. 1B shows a more detailed description of computing device 130. In an embodiment, computing device 130 may include a processor 132. Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is as a single processor that is part of a single personal device 120, processor 132 may be multiple processors distributed over one or many computing devices 30, which may or may not be configured to operate together. Processor 132 is illustrated as being configured to execute computer readable instructions in order to execute one or more operations described above, and as illustrated in FIGS. 5, 6A-6F, 7A-7I, and 8A-8B. In some embodiments, processor 132 is designed to be configured to operate as processing module 150, which may include one or more of data related to a device having a particular protected portion for which the device controls access acquiring module 152, presentation of a proposal to assist in performing at least one device-related service in return for access to the device particular protected portion facilitating module 154, and performance of at least a portion of the one or more services facilitating in response to a grant of access to data acquired by the device module 154.

In an embodiment, computing device 130 may include a memory 133. In some embodiments, memory 133 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 133 may be located at a single network site. In some embodiments, memory 133 may be located at multiple network sites, including sites that are distant from each other.

Figure 2A:
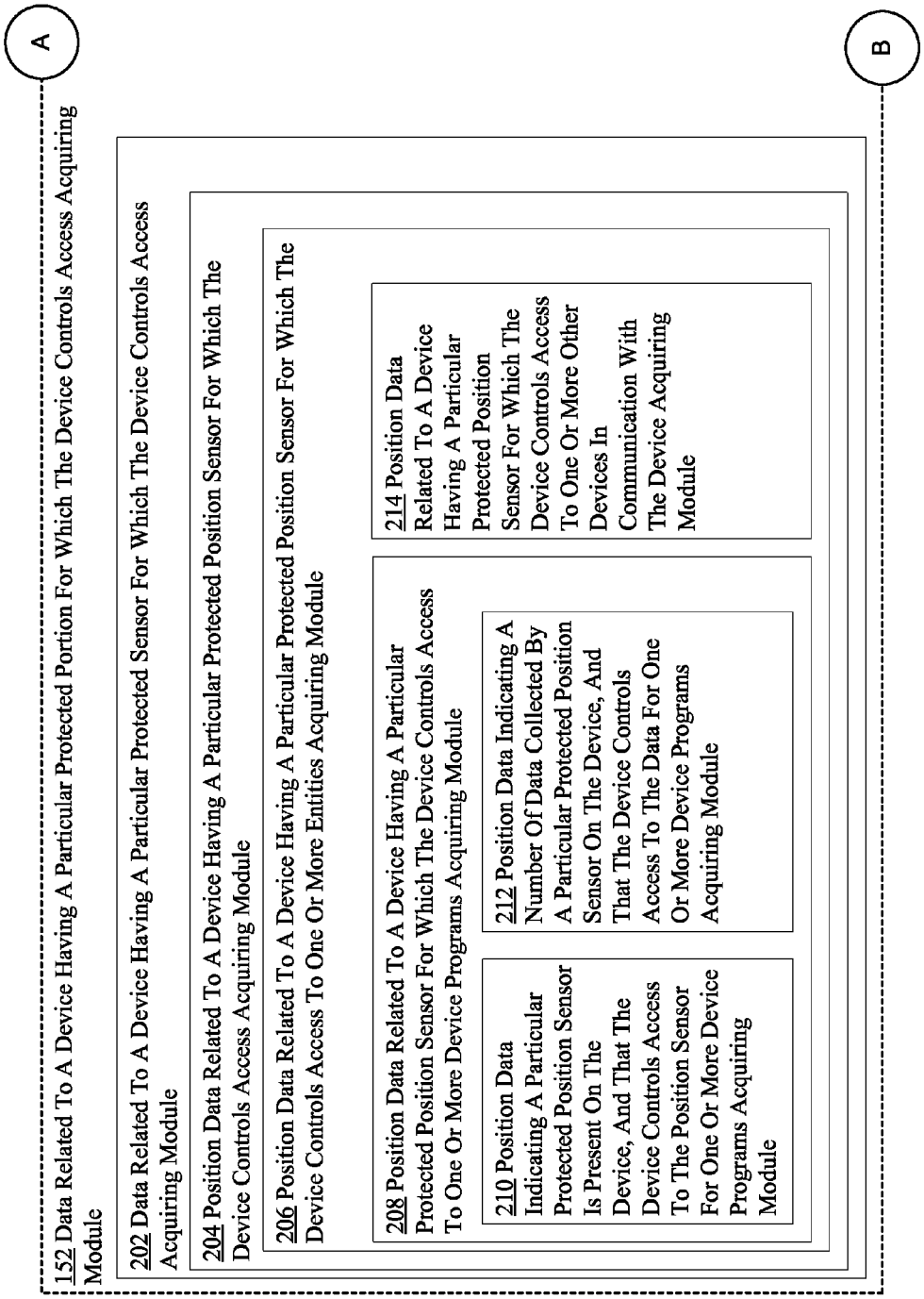

Referring now to FIG. 2, FIG. 2 illustrates an exemplary implementation of the data related to a device having a particular protected portion for which the device controls access acquiring module 152. As illustrated in FIG. 2, the data related to a device having a particular protected portion for which the device controls access acquiring module may include one or more sub-logic modules in various alternative implementations and embodiments. For example, as shown in FIG. 2, e.g., FIG. 2A, in some embodiments, module 152 may include data related to a device having a particular protected sensor for which the device controls access acquiring module 202. In some embodiments, module 202 may include position data related to a device having a particular protected position sensor for which the device controls access acquiring module 204. In some embodiments, module 204 may include position data related to a device having a particular protected position sensor for which the device controls access to one or more entities acquiring module 206. In some embodiments, module 206 may include one or more of position data related to a device having a particular protected position sensor for which the device controls access to one or more device programs acquiring module 208 and position data related to a device having a particular protected position sensor for which the device controls access to one or more other devices in communication with the device acquiring module 214. In some embodiments, module 208 may include one or more of position data indicating a particular protected position sensor is present on the device, and that the device controls access to the position sensor for one or more device programs acquiring module 210 and position data indicating a number of data collected by a particular protected position sensor on the device, and that the device controls access to the data for one or more device programs acquiring module 212.

Figure 2B:
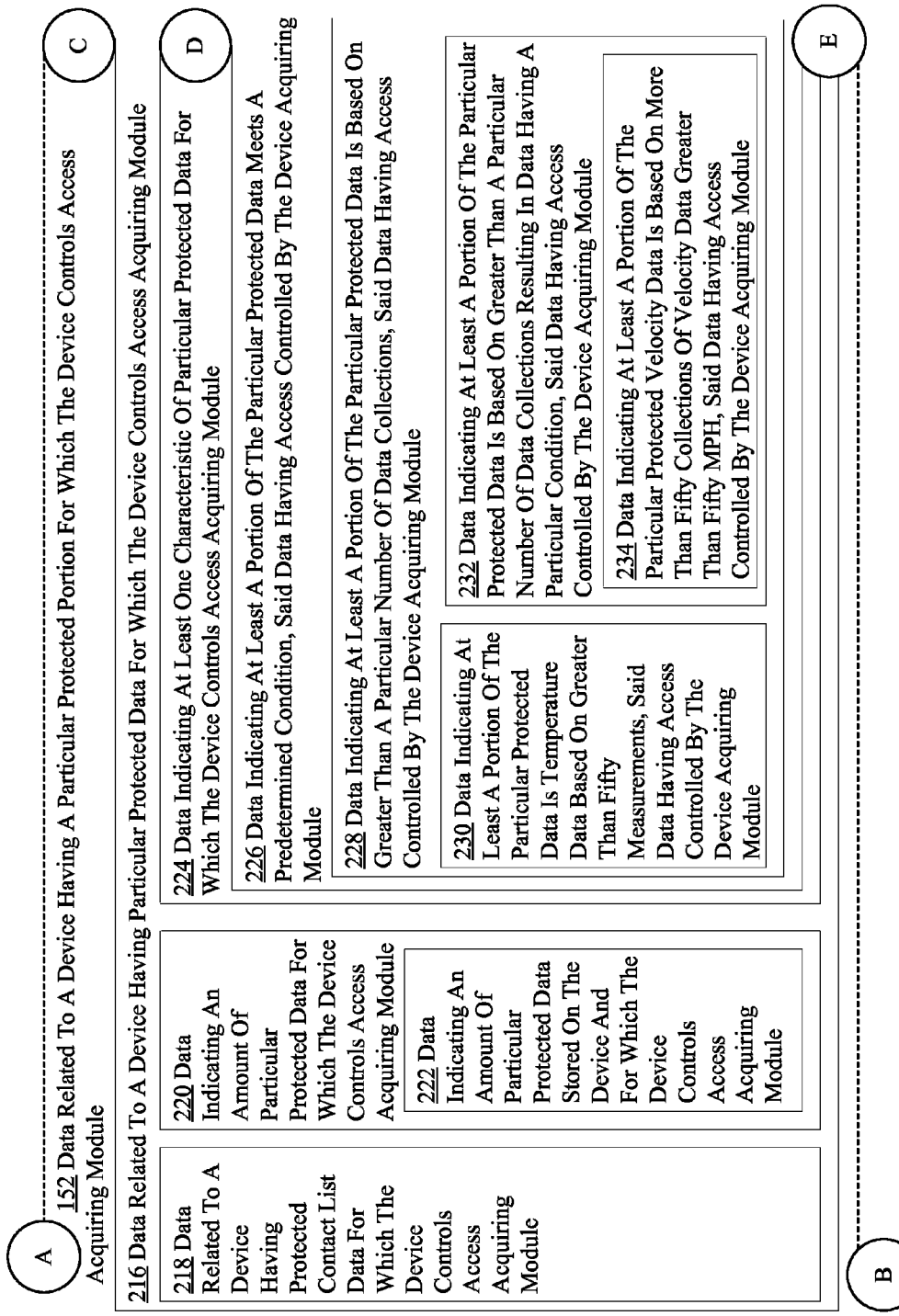

Referring again to FIG. 2, e.g., FIG. 2B, in some embodiments, module 152 may include data related to a device having particular protected data for which the device controls access acquiring module 216. In some embodiments, module 216 may include one or more of data related to a device having protected contact list data for which the device controls access acquiring module 218, data indicating an amount of particular protected data for which the device controls access acquiring module 220, and data indicating at least one characteristic of particular protected data for which the device controls access acquiring module 224. In some embodiments, module 220 may include data indicating an amount of particular protected data stored on the device and for which the device controls access acquiring module 222. In some embodiments, module 224 may include data indicating at least a portion of the particular protected data meets a predetermined condition, said data having access controlled by the device acquiring module 226. In some embodiments, module 226 may include data indicating at least a portion of the particular protected data is based on greater than a particular number of data collections, said data having access controlled by the device acquiring module 228. In some embodiments, module 228 may include one or more of data indicating at least a portion of the particular protected data is temperature data based on greater than fifty measurements, said data having access controlled by the device acquiring module 230 and data indicating at least a portion of the particular protected data is based on greater than a particular number of data collections resulting in data having a particular condition, said data having access controlled by the device acquiring module 232. In some embodiments, module 232 may include data indicating at least a portion of the particular protected velocity data is based on more than fifty collections of velocity data greater than fifty MPH, said data having access controlled by the device acquiring module 234.

Referring again to FIG. 2, e.g., FIG. 2C, as described above, in some embodiments, module 152 may include module 216, module 216 may include module 224, and module 224 may include module 226, In some embodiments, module 226 may include one or more of data indicating at least a portion of the particular protected data is position data indicating that the device was located at a particular position, said position data having access controlled by the device acquiring module 236 and data indicating at least a portion of the particular protected data is contact list data that has more than twenty-five entries in the contact list, said contact list data having access controlled by the device acquiring module 238.

Figure 2D:
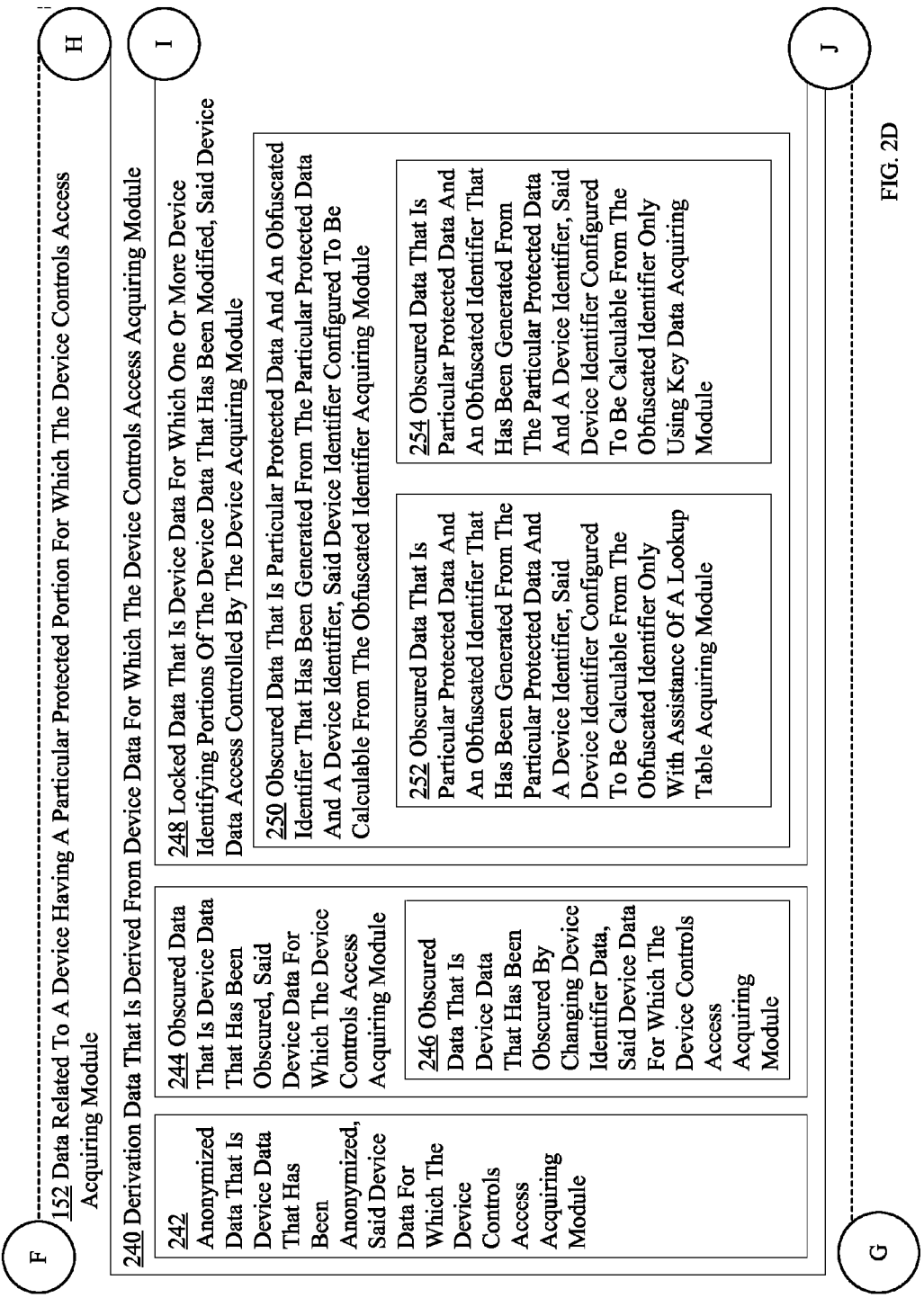

Referring again to FIG. 2, e.g., FIG. 2D, in some embodiments, module 152 may include derivation data that is derived from device data for which the device controls access acquiring module 240. In some embodiments, module 240 may include one or more of anonymized data that is device data that has been anonymized, said device data for which the device controls access acquiring module 242, obscured data that is device data that has been obscured, said device data for which the device controls access acquiring module 244, and locked data that is device data for which one or more device identifying portions of the device data that has been modified, said device data access controlled by the device acquiring module 248. In some embodiments, module 244 may include obscured data that is device data that has been obscured by changing device identifier data, said device data for which the device controls access acquiring module 246. In some embodiments, module 248 may include obscured data that is particular protected data and an obfuscated identifier that has been generated from the particular protected data and a device identifier, said device identifier configured to be calculable from the obfuscated identifier acquiring module 250. In some embodiments, module 250 may include one or more of obscured data that is particular protected data and an obfuscated identifier that has been generated from the particular protected data and a device identifier, said device identifier configured to be calculable from the obfuscated identifier only with assistance of a lookup table acquiring module 252 and obscured data that is particular protected data and an obfuscated identifier that has been generated from the particular protected data and a device identifier, said device identifier configured to be calculable from the obfuscated identifier only using key data acquiring module 254.

Referring again to FIG. 2, e.g., FIG. 2E, in some embodiments, as described above, module 152 may include module 240, and module 240 may include module 248. In some embodiments, module 248 may include one or more of locked data that is particular protected data and an obfuscated identifier that has been generated from the particular protected data and a device identifier, said device identifier configured to be irretrievable from the locked identifier acquiring module 256, locked data that is particular protected data and an obfuscated identifier that has been generated from the particular protected data and a device identifier, said device identifier configured to be irretrievable from the obfuscated identifier by the locked data acquiring entity acquiring module 258, and locked data that is particular protected data and an obfuscated identifier that has been generated from the particular protected data and a device identifier, said locked data acquiring entity configured to be unable to discern a retrievability of the device identifier from the obfuscated identifier acquiring module 260.

Referring now to FIG. 3, FIG. 3 illustrates an exemplary implementation of presentation of a proposal to assist in performing at least one device-related service in return for access to the device particular protected portion facilitating module 154. As illustrated in FIG. 3, the presentation of a proposal to assist in performing at least one device-related service in return for access to the device particular protected portion facilitating module 154 may include one or more sub-logic modules in various alternative implementations and embodiments. For example, as shown in FIG. 3 (e.g., FIG. 3A), in some embodiments, module 154 may include one or more of presentation of an offer to install at least one program on the device in return for access to the device particular protected portion facilitating module 302 and presentation of a proposal to perform at least one device-related service in return for access to the device particular protected portion executing module 308. In some embodiments, module 302 may include presentation of an offer to install at least one program on the device configured to utilize data stored in the particular protected portion of the device in return for access to the device particular protected portion facilitating module 304. In some embodiments, module 304 may include presentation of an offer to install at least one alternative-eatery finding program on the device configured to utilize data stored in the particular protected portion of the device in return for access to the device particular protected portion facilitating module 306.

Figure 3B:
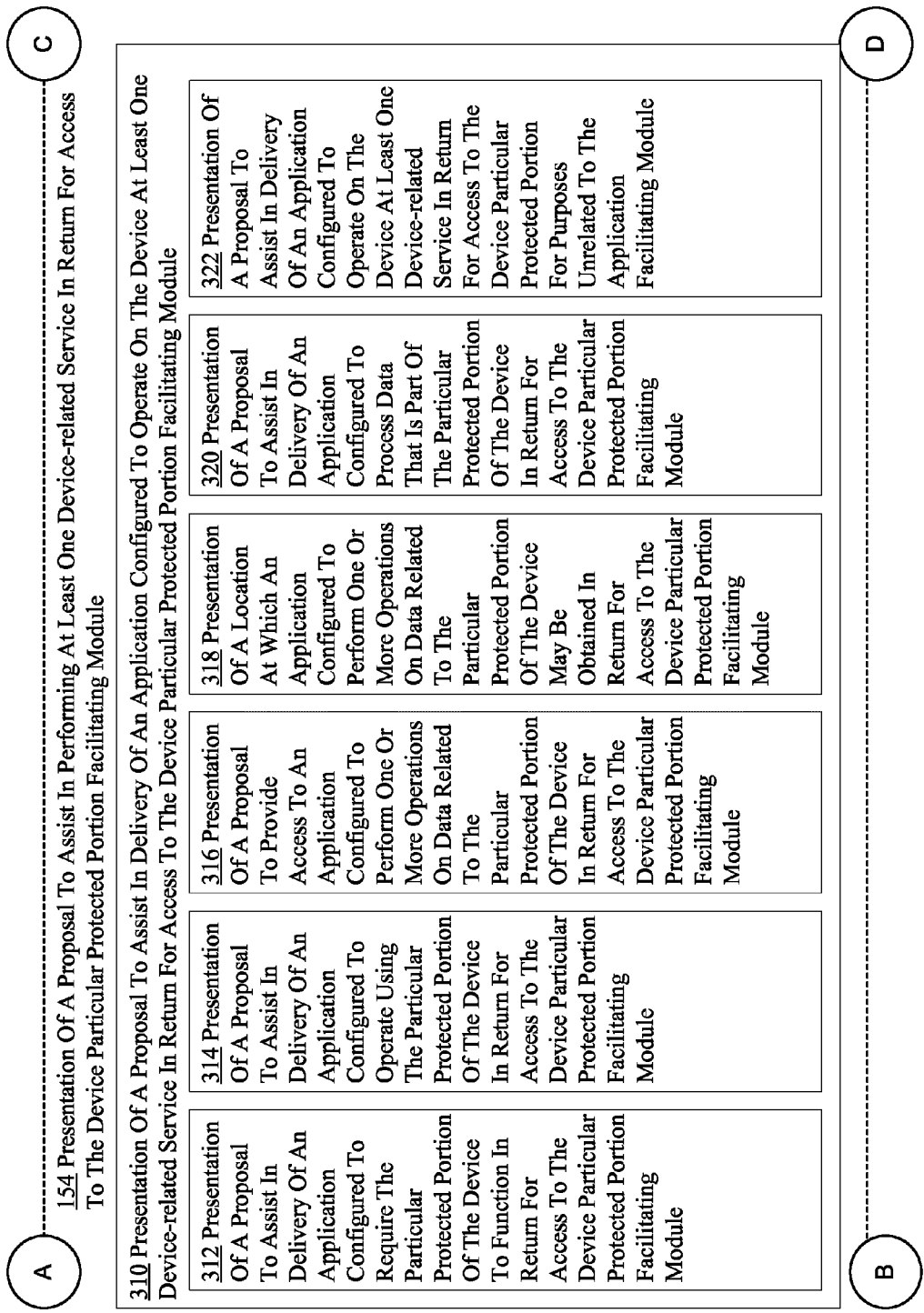

Referring again to FIG. 3, e.g., FIG. 3B, module 154 may include presentation of a proposal to assist in delivery of an application configured to operate on the device at least one device-related service in return for access to the device particular protected portion facilitating module 310. In some embodiments, module 310 may include one or more of presentation of a proposal to assist in delivery of an application configured to require the particular protected portion of the device to function in return for access to the device particular protected portion facilitating module 312, presentation of a proposal to assist in delivery of an application configured to operate using the particular protected portion of the device in return for access to the device particular protected portion facilitating module 314, presentation of a proposal to provide access to an application configured to perform one or more operations on data related to the particular protected portion of the device in return for access to the device particular protected portion facilitating module 316, presentation of a location at which an application configured to perform one or more operations on data related to the particular protected portion of the device may be obtained in return for access to the device particular protected portion facilitating module 318, presentation of a proposal to assist in delivery of an application configured to process data that is part of the particular protected portion of the device in return for access to the device particular protected portion facilitating module 320, and presentation of a proposal to assist in delivery of an application configured to operate on the device at least one device-related service in return for access to the device particular protected portion for purposes unrelated to the application facilitating module 322.

Referring again to FIG. 3, e.g., FIG. 3C, in some embodiments, module 154 may include one or more of at least one service selecting at least partly based on acquired data module 324 and access to data acquired by the device as negotiated result of facilitating a presentation of an offer to provide the at least one selected services module 326. In some embodiments, module 324 may include at least one service selecting at least partly based on acquired data regarding the particular protected portion of the device module 328. In some embodiments, module 328 may include one or more of at least one service selecting at least partly based on acquired data indicating an amount of data stored in the particular protected portion of the device module 330, at least one service selecting at least partly based on acquired data indicating a type of data stored in the particular protected portion of the device module 332, at least one service selecting at least partly based on acquired data describing one or more sensors that are a portion of the particular protected portion of the device module 334, at least one service selecting at least partly based on acquired data including sample data from one or more sensors that are a portion of the particular protected portion of the device module 336, at least one service selecting at least partly based on acquired anonymized data including data from one or more particular protected portion sensors that has been anonymized device module 338, and at least one service selecting at least partly based on acquired anonymized data including data stored on at least part of the particular protected portion that has been anonymized device module 340.

Referring again to FIG. 3, e.g., FIG. 3D, in some embodiments, module 154 may include one or more of at least one service selecting at least partly based on anonymized version of data from the particular protected portion of the device module 342 and access to data that will enable deanonymization of at least a portion of the data from the particular protected portion acquired by the device as negotiated result of facilitating a presentation of an offer to provide the at least one selected services module 344. In some embodiments, module 342 may include one or more of at least one service selecting at least partly based on version of data from the particular protected portion of the device without device uniquely identifying information module 346 and at least one service selecting at least partly based on version of data from the particular protected portion of the device for which device uniquely identifying information has been modified module 348. In some embodiments, module 348 may include one or more of at least one service selecting at least partly based on version of data from the particular protected portion of the device for which device uniquely identifying information has been encrypted module 350 and at least one service selecting at least partly based on version of data from the particular protected portion of the device for which device uniquely identifying information has been substituted for data that is not device uniquely identifying module 352.

Figure 3E:
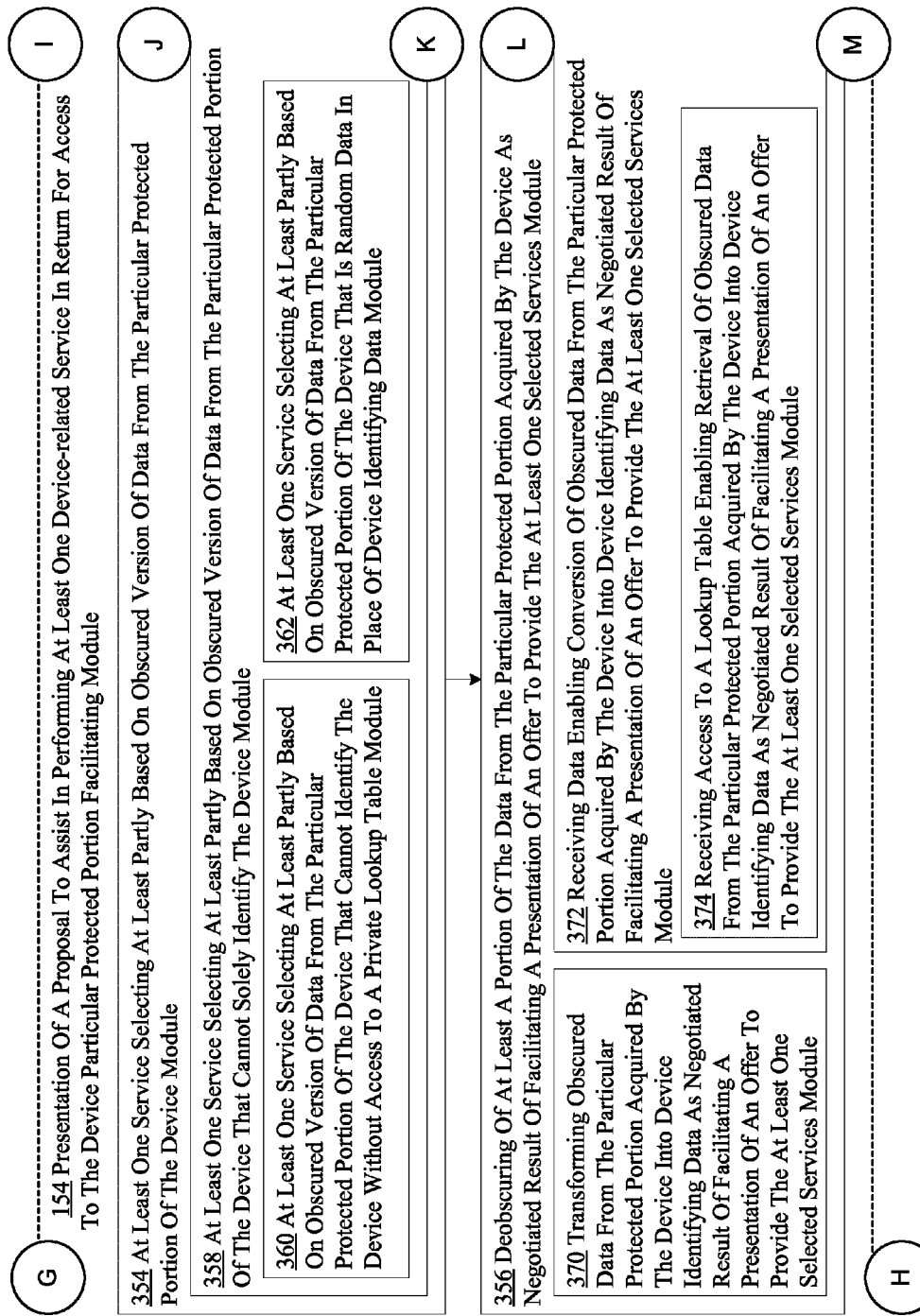

Referring again to FIG. 3, e.g., FIG. 3E, in some embodiments, module 154 may include one or more of at least one service selecting at least partly based on obscured version of data from the particular protected portion of the device module 354 and deobscuring of at least a portion of the data from the particular protected portion acquired by the device as negotiated result of facilitating a presentation of an offer to provide the at least one selected services module 356. In some embodiments, module 354 may include at least one service selecting at least partly based on obscured version of data from the particular protected portion of the device that cannot solely identify the device module 358. In some embodiments, module 358 may include one or more of at least one service selecting at least partly based on obscured version of data from the particular protected portion of the device that cannot identify the device without access to a private lookup table module 360 and at least one service selecting at least partly based on obscured version of data from the particular protected portion of the device that is random data in place of device identifying data module 362. In some embodiments, module 356 may include one or more of transforming obscured data from the particular protected portion acquired by the device into device identifying data as negotiated result of facilitating a presentation of an offer to provide the at least one selected services module 370 and receiving data enabling conversion of obscured data from the particular protected portion acquired by the device into device identifying data as negotiated result of facilitating a presentation of an offer to provide the at least one selected services module 372. In some embodiments, module 372 may include one or more of receiving access to a lookup table enabling retrieval of obscured data from the particular protected portion acquired by the device into device identifying data as negotiated result of facilitating a presentation of an offer to provide the at least one selected services module 374.

Figure 3F:
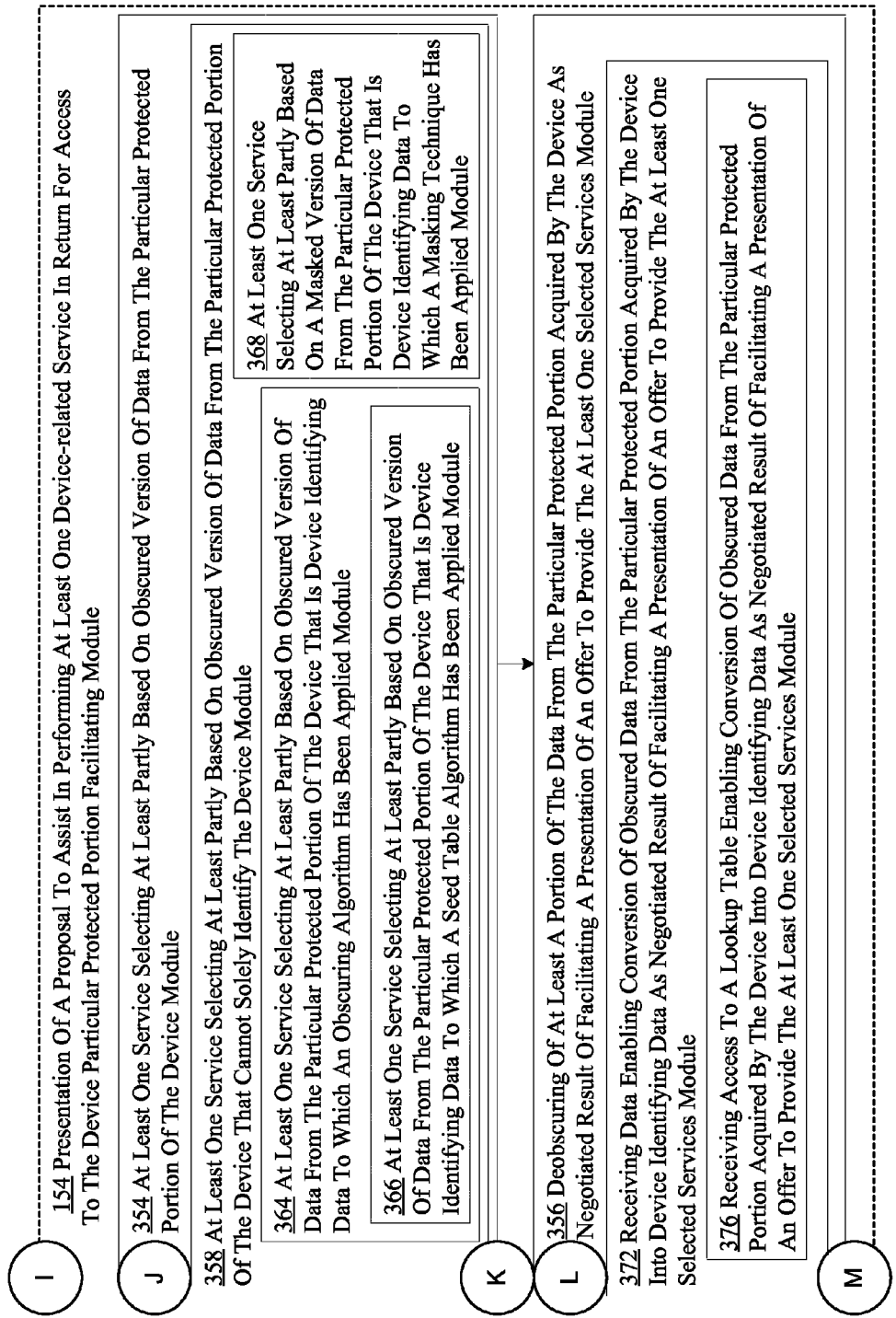

Referring again to FIG. 3, e.g., FIG. 3F, in some embodiments, as described above, module 154 may include module 354, and module 354 may include module 358. In some embodiments, module 358 may include one or more of at least one service selecting at least partly based on obscured version of data from the particular protected portion of the device that is device identifying data to which an obscuring algorithm has been applied module 364 and at least one service selecting at least partly based on a masked version of data from the particular protected portion of the device that is device identifying data to which a masking technique has been applied module 368. In some embodiments, module 364 may include at least one service selecting at least partly based on obscured version of data from the particular protected portion of the device that is device identifying data to which a seed table algorithm has been applied module 366. In some embodiments, as described above, module 154 may include module 356, and module 356 may include module 372. In some embodiments, module 372 may include receiving access to a lookup table enabling conversion of obscured data from the particular protected portion acquired by the device into device identifying data as negotiated result of facilitating a presentation of an offer to provide the at least one selected services module 376.

Figure 4A:
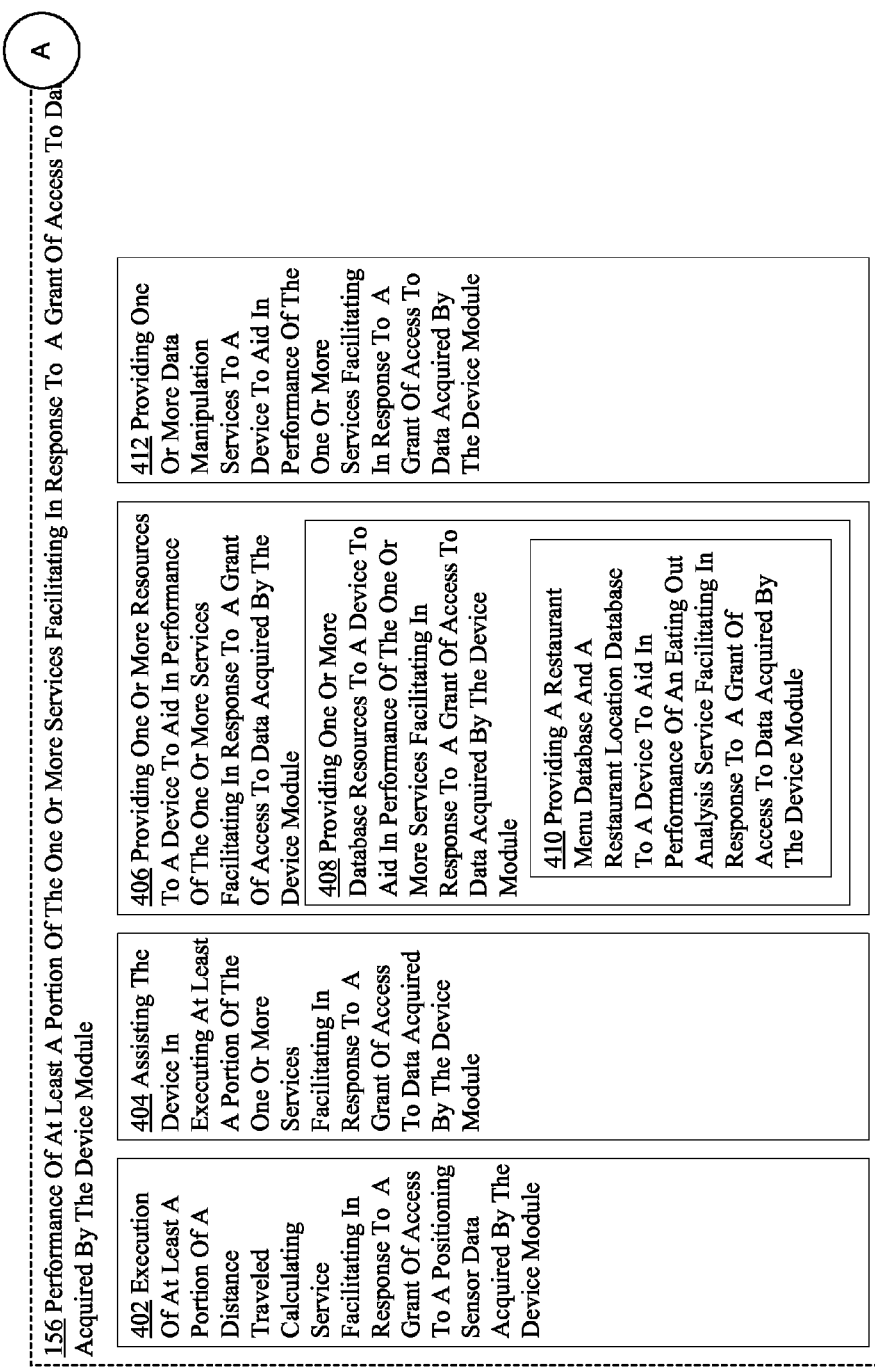
FIGS. 4A-4B, shows a particular perspective of the performance of at least a portion of the one or more services facilitating in response to a grant of access to data acquired by the device module 156 of processing module 150 of computing device 130 of FIG. 1B, according to an embodiment.

Referring now to FIG. 4, FIG. 4 illustrates an exemplary implementation of the performance of at least a portion of the one or more services facilitating in response to a grant of access to data acquired by the device module 156. As illustrated in FIG. 4, the performance of at least a portion of the one or more services facilitating in response to a grant of access to data acquired by the device module 156 may include one or more sub-logic modules in various alternative implementations and embodiments. For example, as shown in FIG. 4, e.g., FIG. 4A, in some embodiments, module 156 may include one or more of execution of at least a portion of a distance traveled calculating service facilitating in response to a grant of access to a positioning sensor data acquired by the device module 402, assisting the device in executing at least a portion of the one or more services facilitating in response to a grant of access to data acquired by the device module 404, providing one or more resources to a device to aid in performance of the one or more services facilitating in response to a grant of access to data acquired by the device module 406, and providing one or more data manipulation services to a device to aid in performance of the one or more services facilitating in response to a grant of access to data acquired by the device module 412. In some embodiments, module 406 may include providing one or more database resources to a device to aid in performance of the one or more services facilitating in response to a grant of access to data acquired by the device module 408. In some embodiments, module 408 may include providing a restaurant menu database and a restaurant location database to a device to aid in performance of an eating out analysis service facilitating in response to a grant of access to data acquired by the device module 410.

Figure 4B:
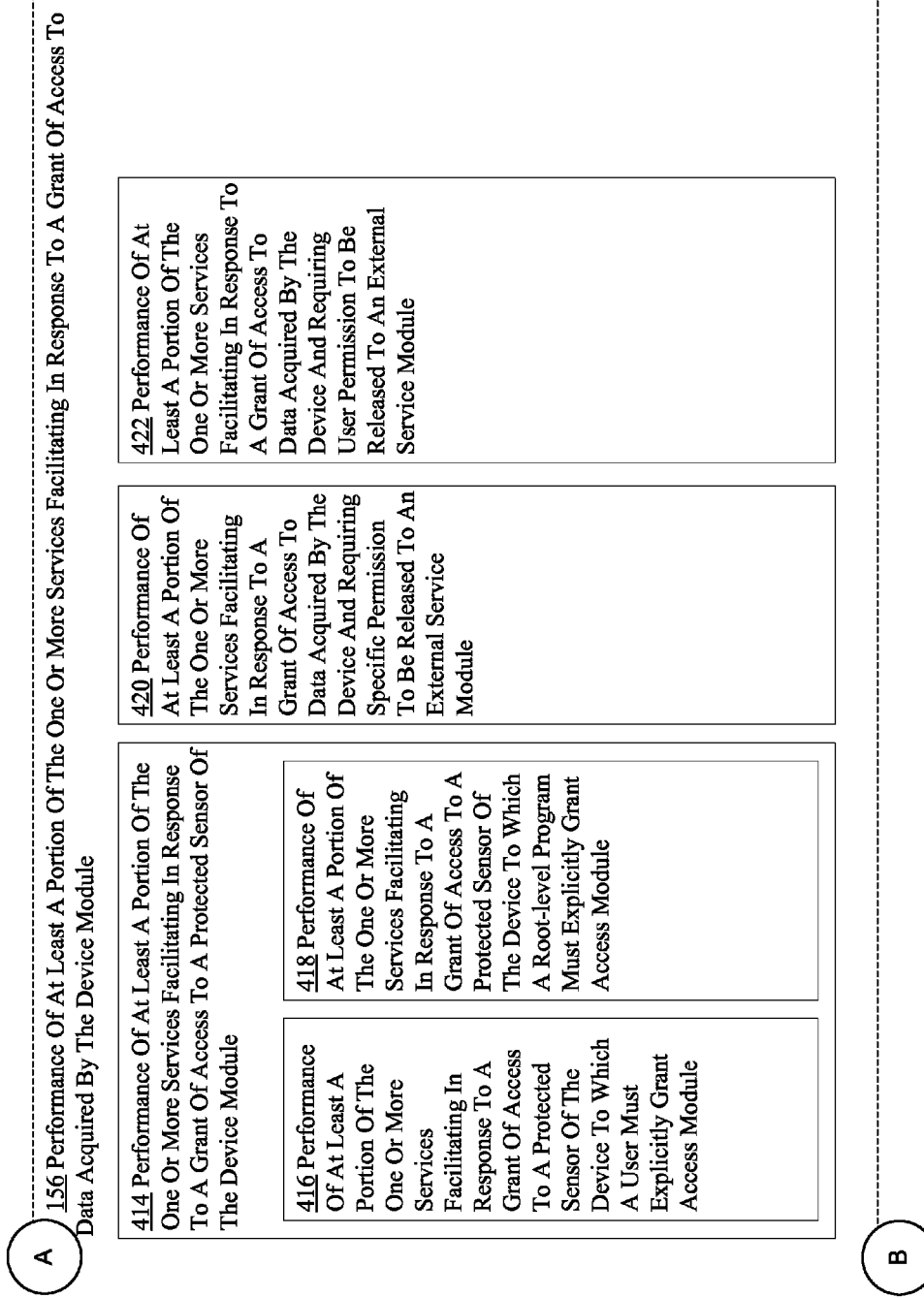

Referring again to FIG. 4, e.g., FIG. 4B, in some embodiments, module 156 may include one or more of performance of at least a portion of the one or more services facilitating in response to a grant of access to a protected sensor of the device module 414, performance of at least a portion of the one or more services facilitating in response to a grant of access to data acquired by the device and requiring specific permission to be released to an external service module 420, and performance of at least a portion of the one or more services facilitating in response to a grant of access to data acquired by the device and requiring user permission to be released to an external service module 422. In some embodiments, module 414 may include one or more of performance of at least a portion of the one or more services facilitating in response to a grant of access to a protected sensor of the device to which a user must explicitly grant access module 416 and performance of at least a portion of the one or more services facilitating in response to a grant of access to a protected sensor of the device to which a root-level program must explicitly grant access module 418.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
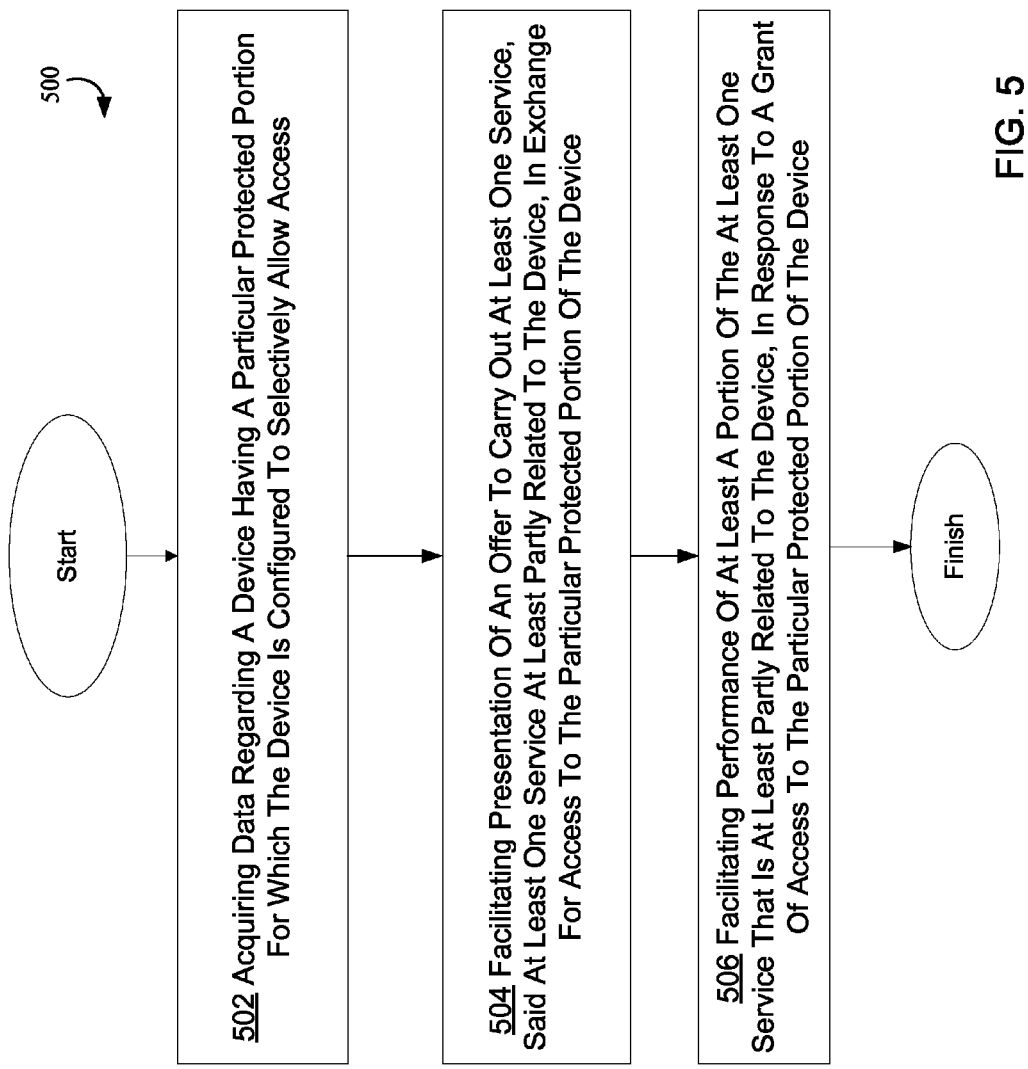
FIG. 5 is a high-level logic flowchart of a process, e.g., operational flow 500, according to an embodiment.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5-8 as well as the other operations to be described herein may be performed by at least one of a machine, an article of manufacture, or a composition of matter.

Figure 1B:
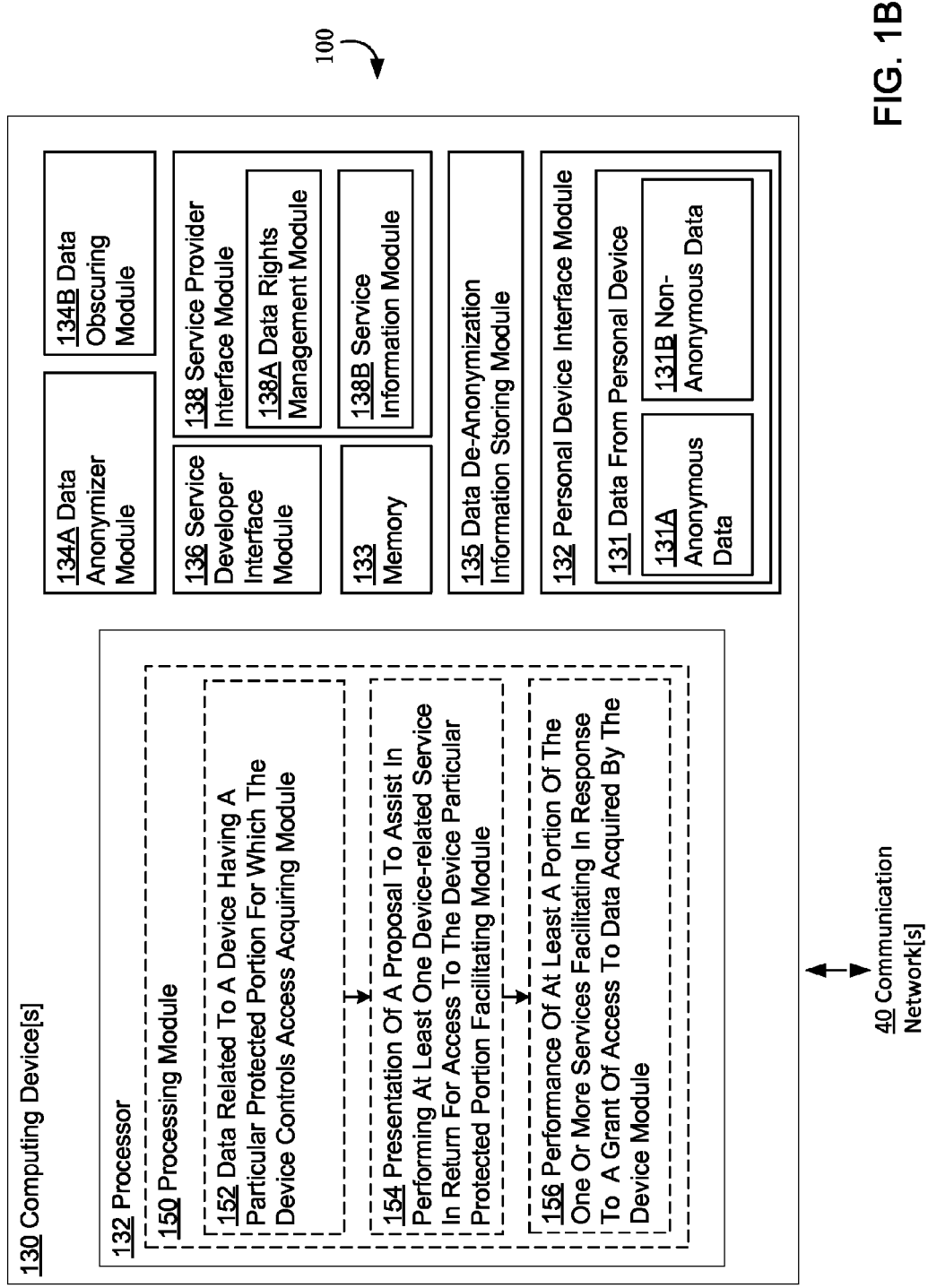
FIG. 1B shows a high-level block diagram of a computing device 130 operating in an exemplary environment 100, according to an embodiment.

Referring now to FIG. 5, FIG. 5 shows operation 500, which may include operation 502 depicting acquiring data regarding a device having a particular protected portion for which the device is configured to selectively allow access. For example, FIG. 1, e.g., FIG. 1B, shows data related to a device having a particular protected portion for which the device controls access acquiring module 152 acquiring (e.g., receiving, retrieving, picking up, creating, generating, intercepting, reading, hearing, detecting, and the like) data regarding (e.g., data about any aspect, whether temporary or permanent, or whether related to the environment) a device (e.g., a piece of equipment and/or a person or entity that may use that equipment) having a particular protected portion (e.g., a contact list where a list of the user of the device's contacts are stored, and the particular protected portion can refer to either or both of the contact list data and the physical place in memory at which the contact list data is stored) for which the device (e.g., a smartphone) is configured to selectively allow access (e.g., prior to accessing (e.g., reading, writing, modifying, or otherwise operating upon) the contact list data, the device determines whether the entity attempting to access the contact list data has permission to do so, e.g., in an embodiment, some of the applications loaded on the smartphone may have access to the contact list data, and some may not).

Referring again to FIG. 5, operation 500 may include operation 504 depicting facilitating presentation of an offer to carry out at least one service, said at least one service at least partly related to the device, in exchange for access to the particular protected portion of the device. For example, FIG. 1, e.g., FIG. 1B, shows presentation of a proposal to assist in performing at least one device-related service in return for access to the device particular protected portion facilitating module 154 facilitating (e.g., taking one or more actions that, whether directly or indirectly, are intended to assist in the completion, execution, or carrying out of at least a portion of) presentation (e.g., a communication to a user) of an offer (e.g., a presentation to a potential recipient for which the recipient is free to accept or reject, e.g., which may be in the form of, for example "this is a service we are willing to provide, are you interested," or any variant of that) to carry out (e.g., execute, intend to execute, or begin executing, or taking one or more steps to allow the execution of) at least one service (e.g., a "where are your friends" service that shows a user of a device where the user's friends, e.g., the people listed in the user's contact list, are located), said at least one service (e.g., the "where are the user's friends" service) at least partly related (e.g., related in any way, regardless of how tenuous, e.g., in the example listed herein, the service is related because there is a contact list present on the smartphone, which for purposes of an embodiment of this application, is more than sufficient to establish "related") to the device (e.g., the smartphone which has the user's friends stored on it in the form of a contact list), in exchange for access (e.g., one or more of reading, writing, modifying, altering, deleting, encrypting, transmitting, receiving, or performing any of one or more actions or operations upon) to the particular protected portion (e.g., the user's contact list) of the device (e.g., the user's smartphone).

Figure 6A:
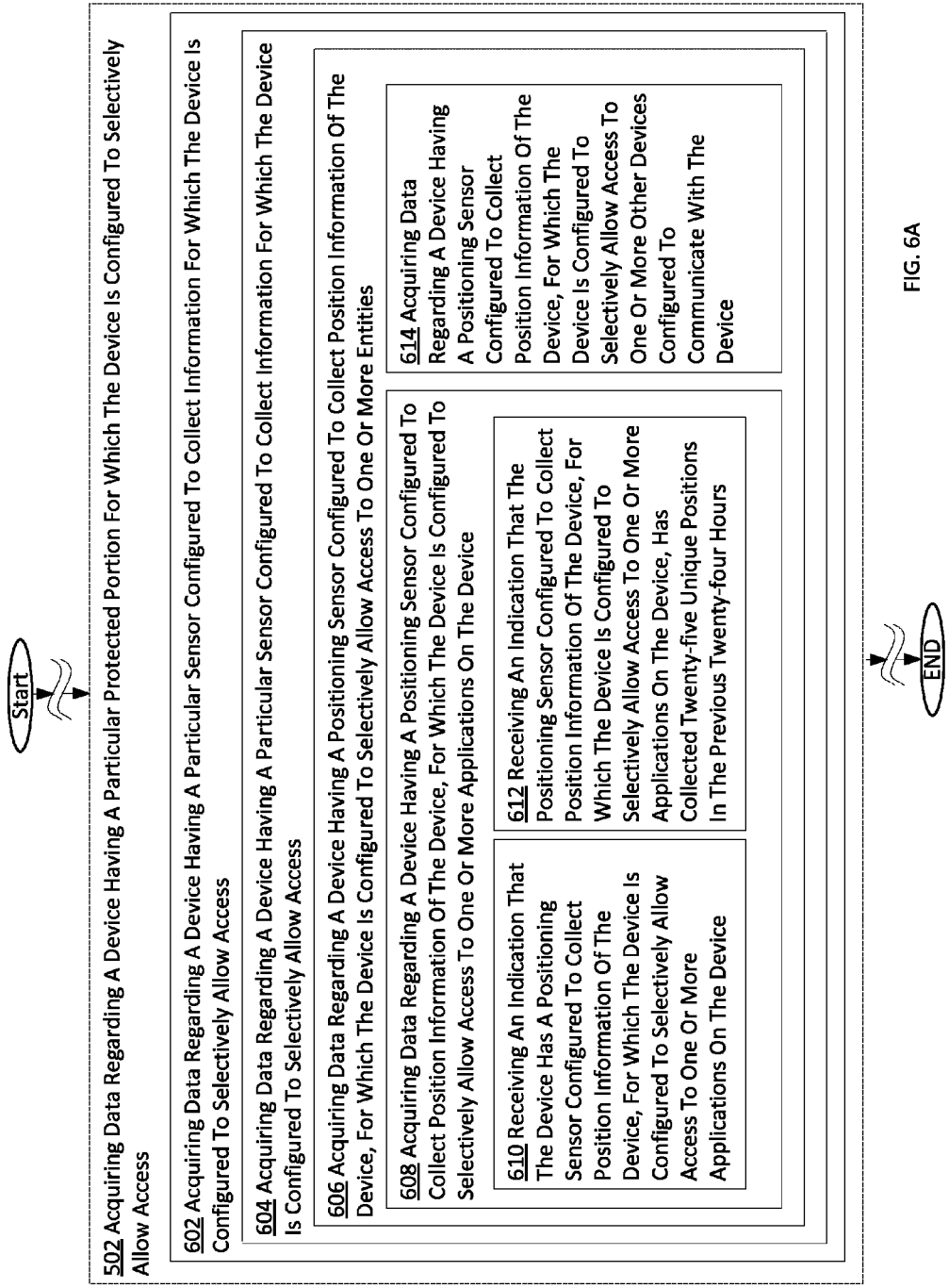
FIG. 6A is a high-level logic flow chart of a process depicting alternate implementations of a data acquiring operation 502, according to one or more embodiments.

Referring again to FIG. 5, operation 500 may include operation 506 depicting facilitating performance of at least a portion of the at least one service that is at least partly related to the device, in response to a grant of access to the particular protected portion of the device. For example. FIG. 1, e.g., FIG. 1B, shows performance of at least a portion of the one or more services facilitating in response to a grant of access to data acquired by the device module 156 facilitating (e.g., taking one or more actions that, whether directly or indirectly, are intended to assist in the completion, execution, or carrying out of at least a portion of) performance (e.g., one or more steps or instructions in executing or carrying out) of at least a portion of the at least one service (e.g., the "where are the user's friends" service) that is at least partly related to the device (e.g., correlated in any way, regardless of how tenuous, e.g., in the example listed herein, the service is related because there is a contact list present on the smartphone, which for purposes of an embodiment of this application, is more than sufficient to establish "related"), in response to a grant of access (e.g., the giving of one or more authentication tools, e.g., passwords, privileges, logins, addresses, and the like, or permission, authorization, authentication, and the like to one or more of reading, writing, modifying, altering, deleting, encrypting, transmitting, receiving, or performing any of one or more actions or operations upon) to the particular protected portion (e.g., the user's contact list) of the device (e.g., the user's smartphone FIGS. 6A-6F depict various implementations of operation 502, depicting acquiring data regarding a device having a particular protected portion for which the device is configured to selectively allow access according to embodiments. Referring now to FIG. 6A, operation 502 may include operation 602 depicting acquiring data regarding a device having a particular sensor configured to collect information for which the device is configured to selectively allow access. For example, FIG. 2, e.g., FIG. 2A, shows data related to a device having a particular protected sensor for which the device controls access acquiring module 202 acquiring data (e.g., data that says "this sensor collected 55 megabytes of data over the last seven days," or "this sensor collected 25 blocks of data at this particular location," or "the data collected by this sensor appears to indicate that the user enjoys this location") regarding a device (e.g., a smartphone, e.g., an Apple iPhone) having a particular sensor (e.g., an accelerometer) configured to collect information (e.g., information regarding the device's movements, and by extension, the user's movements) for which the device is configured to selectively allow access (e.g., not all external entities, or internal programs and entities, may have access to the accelerometer data, and the device may control which entities have access).

Referring again to FIG. 6A, operation 602 may include operation 604 depicting acquiring data regarding a device having a particular sensor configured to collect information for which the device is configured to selectively allow access. For example, FIG. 2, e.g., FIG. 2A, shows position data related to a device having a particular protected position sensor for which the device controls access acquiring module 204 acquiring data (e.g., data indicating that over one hundred pictures have been taken) regarding a device having a particular sensor (e.g., an image capturing sensor) configured to collect information (e.g., pictures) for which the device (e.g., a network-enabled digital camera) is configured to selectively allow access (e.g., the user's home computer may have access, but unspecified computers that attempt to communicate with the digital camera do not).

Referring again to FIG. 6A, operation 604 may include operation 606 depicting acquiring data regarding a device having a positioning sensor configured to collect position information of the device, for which the device is configured to selectively allow access to one or more entities. For example, FIG. 2, e.g., FIG. 2A, shows position data related to a device having a particular protected position sensor for which the device controls access to one or more entities acquiring module 206 acquiring data regarding a device having a positioning sensor configured to collect position information of the device (e.g., a built-in motor vehicle control system), for which the device is configured to selectively allow access to one or more entities (e.g., the user is allowed access, and programs authorized by the vehicle manufacturer also may have access, but other programs may not have access).

Referring again to FIG. 6A, operation 606 may include operation 608 depicting acquiring data regarding a device having a positioning sensor configured to collect position information of the device, for which the device is configured to selectively allow access to one or more applications on the device. For example, FIG. 2, e.g., FIG. 2A, shows position data related to a device having a particular protected position sensor for which the device controls access to one or more device programs acquiring module 208 acquiring data regarding a device (e.g., a tablet device, e.g., a Samsung Galaxy Tab 10) having a positioning sensor configured to collect position information of the device, for which the device is configured to selectively allow access to one or more applications (e.g., map applications) on the device.

Referring again to FIG. 6A, operation 608 may include operation 610 depicting receiving an indication that the device has a positioning sensor configured to collect position information of the device, for which the device is configured to selectively allow access to one or more applications on the device. For example, FIG. 2, e.g., FIG. 2A, shows position data indicating a particular protected position sensor is present on the device, and that the device controls access to the position sensor for one or more device programs acquiring module 210 receiving an indication that the device has a positioning sensor (e.g., receiving a flag indicating "yes" regarding whether a positioning sensor exists) configured to collect position information of the device (e.g., a bargain tablet device), for which the device is configured to selectively allow access to one or more applications on the device (e.g., Automated Teller Machine ("ATM") device finder applications).

Referring again to FIG. 6A, operation 608 may include operation 612 depicting receiving an indication that the positioning sensor configured to collect position information of the device, for which the device is configured to selectively allow access to one or more applications on the device, has collected twenty-five unique positions in the previous twenty-four hours. For example, FIG. 2, e.g., FIG. 2A, shows position data indicating a number of data collected by a particular protected position sensor on the device, and that the device controls access to the data for one or more device programs acquiring module 212 receiving an indication that the positioning sensor configured to collect position information of the device (e.g., a personal navigation system that is mountable in a car windshield), for which the device is configured to selectively allow access to one or more applications on the device (e.g., a "church finder" application), has collected twenty-five unique positions in the previous twenty-four hours.

Referring again to FIG. 6A, operation 606 may include operation 614 depicting acquiring data regarding a device having a positioning sensor configured to collect position information of the device, for which the device is configured to selectively allow access to one or more other devices configured to communicate with the device. For example, FIG. 2, e.g., FIG. 2A, shows position data related to a device having a particular protected position sensor for which the device controls access to one or more other devices in communication with the device acquiring module 214 acquiring data (e.g., how much time the device stays within a particular area, without getting data regarding the actual position with more granularity) regarding a device (e.g., a smartphone, e.g., a Samsung Android phone) having a positioning sensor configured to collect position information of the device, for which the device is configured to selectively allow access to one or more other devices (e.g., other devices which are identified by the user as "friend" devices have full access to the data from the positioning sensor and can see where the device is).

Figure 6B:
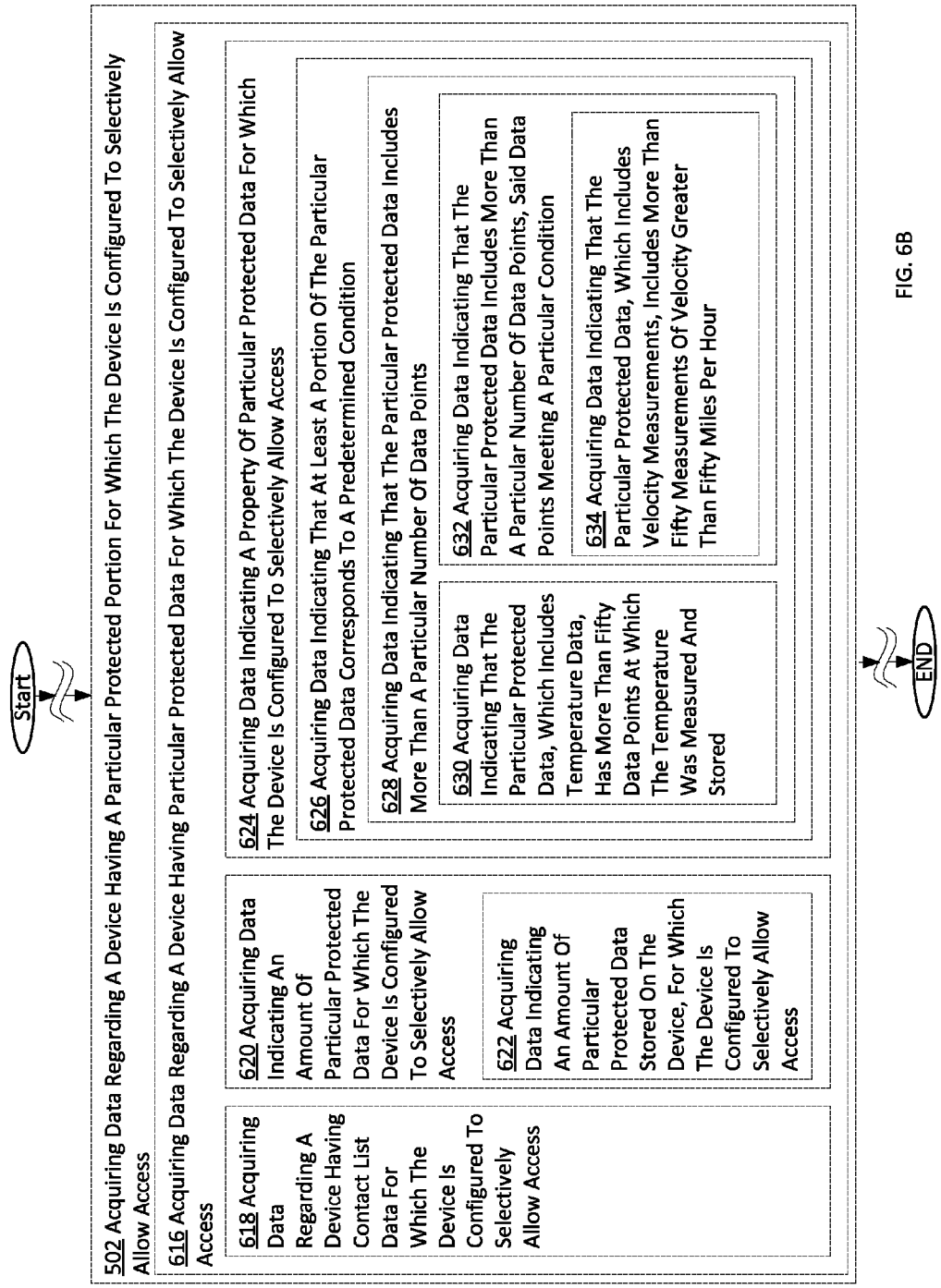
FIG. 6B is a high-level logic flow chart of a process depicting alternate implementations of a data acquiring operation 502, according to one or more embodiments.

Referring now to FIG. 6B, operation 502 may include operation 616 depicting acquiring data regarding a device having particular protected data for which the device is configured to selectively allow access. For example, FIG. 2, e.g., FIG. 2B, shows data related to a device having particular protected data for which the device controls access acquiring module 216 acquiring data regarding a device (e.g., acquiring an amount of free space left on the device) regarding a device (e.g., a cellular phone with limited features) having particular protected data (e.g., a log of all the text messages sent by the device) for which the device is configured to selectively allow access (e.g., only the text messaging delivery service has access to the log, and not, for example, the search function).

Referring again to FIG. 6B, operation 616 may include operation 618 depicting acquiring data regarding a device having contact list data for which the device is configured to selectively allow access. For example, FIG. 2, e.g., FIG. 2B, shows data related to a device having protected contact list data for which the device controls access acquiring module 218 acquiring data regarding a device (e.g., a smartphone, e.g., a an HTC Evo phone) having contact list data for which the device is configured to selectively allow access (e.g., an e-mail application of the device may have access to the contact list information, but a spreadsheet application may not have access to the contact list).

Referring again to FIG. 6B, operation 616 may include operation 620 depicting acquiring data indicating an amount of particular protected data for which the device is configured to selectively allow access. For example, FIG. 2, e.g., FIG. 2B, shows data indicating an amount of particular protected data on a device for which the device controls access acquiring module 220 acquiring data indicating an amount of particular protected data (e.g., "this device has 500 MB of pictures stored," or "this device has a contact list with more than 55 contacts," or "this device has seven different unique user logins," or "this device collects 57 weather measurements every hour," or "this device collects 24 still images per hour") for which the device is configured to selectively allow access (e.g., a decision is made whether to allow access when a user, entity, or application attempts to access the data).

Referring again to FIG. 6B, operation 620 may include operation 622 depicting acquiring data indicating an amount of particular protected data stored on the device, for which the device is configured to selectively allow access. For example, FIG. 2, e.g., FIG. 2B, shows data indicating an amount of particular protected data stored on the device and for which the device controls access acquiring module 222 acquiring data indicating an amount of particular protected data (e.g., "this device has twenty five songs stored on the device," or "this device has 2 GB of music stored on it," or "this device has 75 different songs from Norah Jones," or "this device has 1,600 MB of music purchased from Amazon MP3," or "this device has more than fifty songs produced by BMG music stored on the device") stored on the device, for which the device is configured to selectively allow access (e.g., some of the entities that access the device may have rights to read or write to the area of memory where the songs are stored, and some may not).

Referring again to FIG. 6B, operation 616 may include operation 624 depicting acquiring data indicating a property of particular protected data for which the device is configured to selectively allow access. For example, FIG. 2, e.g., FIG. 2B, shows data indicating at least one characteristic of particular protected data for which the device controls access acquiring module 224 acquiring data indicating a property of particular protected data (e.g., "velocity data indicating that the device spends at least one hour a day traveling between five and eight miles per hour," but no additional information about the velocity or specific velocities at any particular time) for which the device (e.g., an exercise assistant watch) is configured to selectively allow access (e.g., access is granted through Bluetooth to the user's home computer device, but not to other devices).

Referring again to FIG. 6B, operation 624 may include operation 626 depicting acquiring data indicating that at least a portion of the particular protected data corresponds to a predetermined condition. For example, FIG. 2, e.g., FIG. 2B, shows data indicating at least a portion of the particular protected data meets a predetermined condition, said data having access controlled by the device acquiring module 226 acquiring data indicating that at least a portion of the particular protected data (e.g., "at least twenty weather measurements were taken within the target area," or "at least twenty of the pictures stored on the device were taken between 6 and 8 pm," or "at least five of the pictures stored on the device were of the target entity," or "at least twenty of the text messages sent by the device in the last twenty-four hours contain the words "Justin Bieber," or "at least seven of the barometric pressure readings showed a barometric pressure of greater than twenty-eight bars") corresponds to a predetermined condition (e.g., some condition about the data, e.g., a size, a number of samples, a specific type of result, and the like).

Referring again to FIG. 6B, operation 626 may include operation 628 depicting acquiring data indicating that the particular protected data includes more than a particular number of data points. For example, FIG. 2, e.g., FIG. 2B, shows data indicating at least a portion of the particular protected data is based on greater than a particular number of data collections, said data having access controlled by the device acquiring module 228 acquiring data indicating that the particular protected data (e.g., wireless network detection data) includes more than a particular number of data points (e.g., wireless networks were detected in more than twenty coffee shop locations, or more than twenty unsecured wireless networks were detected).

Referring again to FIG. 6B, operation 628 may include operation 630 depicting acquiring data indicating that the particular protected data, which includes temperature data, has more than fifty data points at which the temperature was measured and stored. For example, FIG. 2, e.g., FIG. 2B, shows data indicating at least a portion of the particular protected data is temperature data based on greater than fifty measurements, said data having access controlled by the device acquiring module 230 acquiring data (e.g., which, in an embodiment, may be as simple as a flag indicating that the data condition has been met or not) indicating that the particular protected data, which includes temperature data, has more than fifty data points at which the temperature was measured and stored.

Referring again to FIG. 6B, operation 628 may include operation 632 depicting acquiring data indicating that the particular protected data includes more than a particular number of data points, said data points meeting a particular condition. For example, FIG. 2, e.g., FIG. 2B, shows data indicating at least a portion of the particular protected data is based on greater than a particular number of data collections resulting in data having a particular condition, said data having access controlled by the device acquiring module 232 acquiring data indicating that the particular protected data includes more than a particular number of data points (e.g., velocity measurements from an in-car navigation system), said data points meeting a particular condition (e.g., the car was traveling faster than the posted speed limit at the time of the measurement).

Referring again to FIG. 6B, operation 632 may include operation 634 depicting acquiring data indicating that the particular protected data, which includes velocity measurements, includes more than fifty measurements of velocity greater than fifty miles per hour. For example, FIG. 2, e.g., FIG. 2B, shows data indicating at least a portion of the particular protected velocity data is based on more than fifty collections of velocity data greater than fifty MPH, said data having access controlled by the device acquiring module 234 acquiring data, indicating that the particular protected data, which includes velocity measurements, includes more than fifty measurements of velocity greater than fifty miles per hour.

Figure 6C:
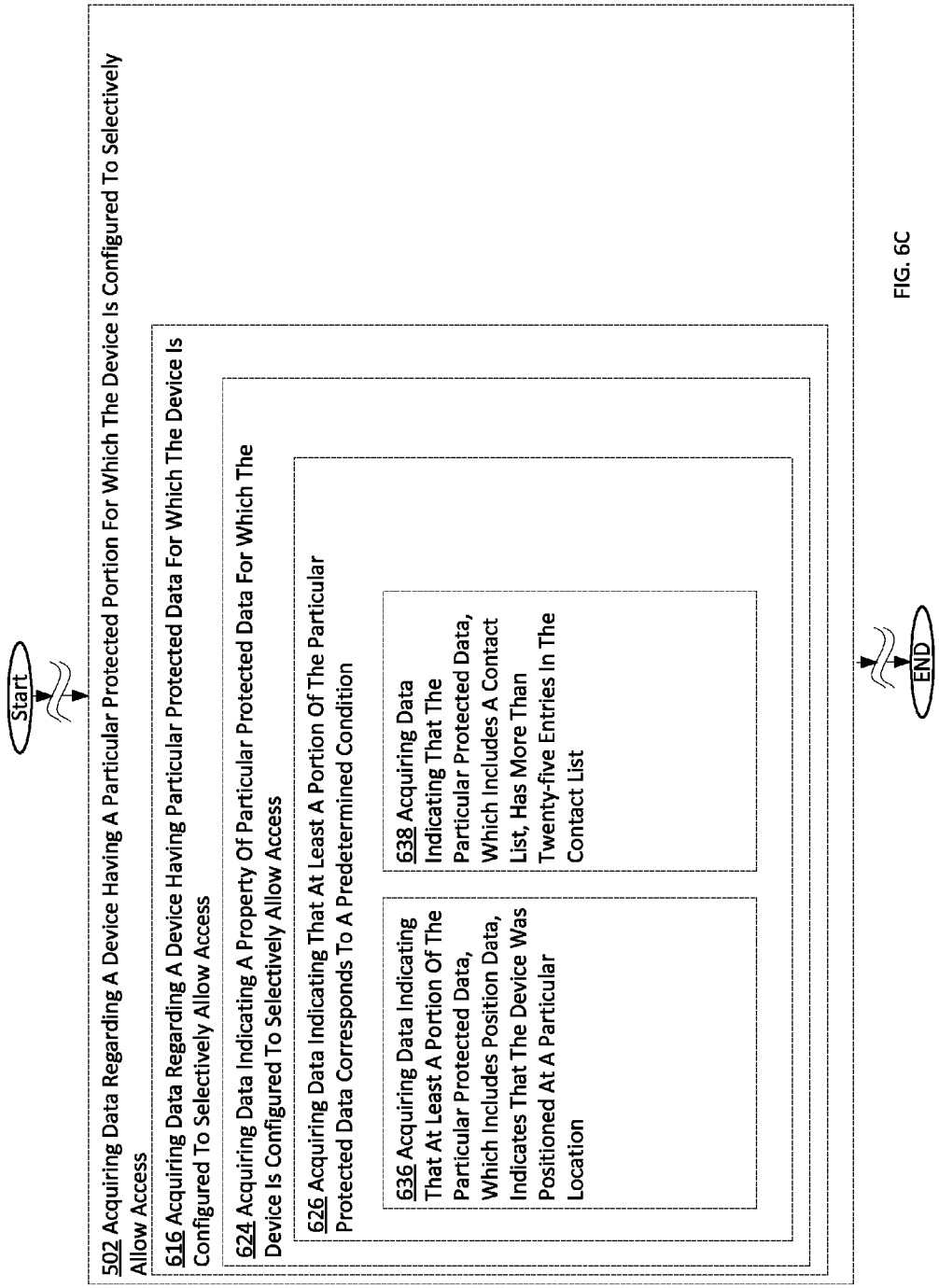
FIG. 6C is a high-level logic flow chart of a process depicting alternate implementations of a data acquiring operation 502, according to one or more embodiments.

Referring now to FIG. 6C, operation 626 may include operation 636 depicting acquiring data indicating that at least a portion of the particular protected data, which includes position data, indicates that the device was positioned at a particular location. For example, FIG. 2, e.g., FIG. 2C, shows data indicating at least a portion of the particular protected data is position data indicating that the device was located at a particular position, said position data having access controlled by the device acquiring module 236 acquiring data indicating that at least a portion of the particular protected data, which includes position data, indicates that the device (e.g., a smartphone, e.g., an Apple iPhone) was positioned at a particular location (e.g., a trendy new restaurant).

Referring again to FIG. 6C, operation 626 may include operation 638 depicting acquiring data indicating that the particular protected data, which includes a contact list, has more than twenty-five entries in the contact list. For example, FIG. 2, e.g., FIG. 2C, shows data indicating at least a portion of the particular protected data is contact list data that has more than twenty-five entries in the contact list, said contact list data having access controlled by the device acquiring module 238 acquiring data indicating that the particular protected data, which includes a contact list, has more than twenty-five entries in the contact list.

Figure 6D:
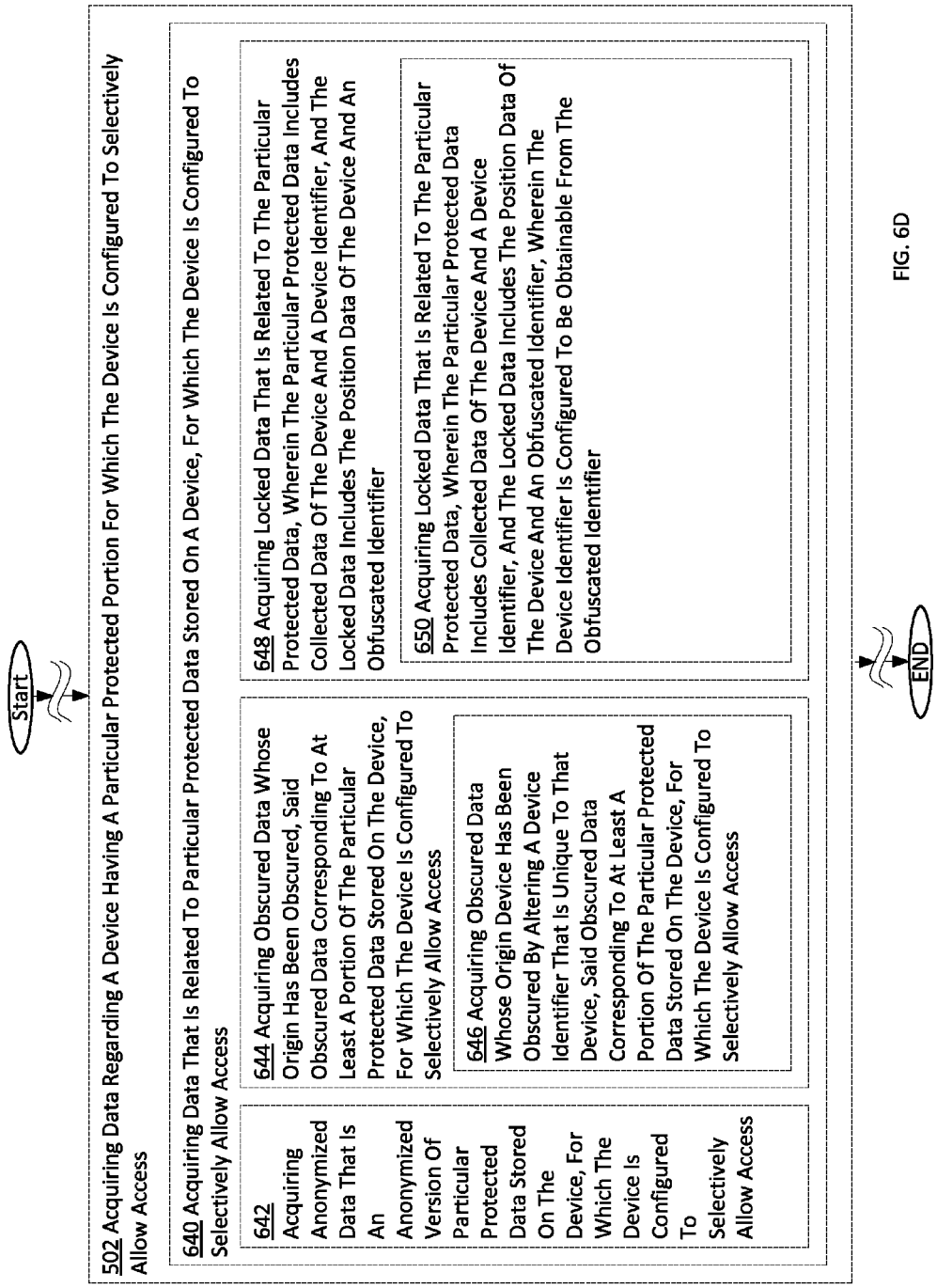
FIG. 6D is a high-level logic flow chart of a process depicting alternate implementations of a data acquiring operation 502, according to one or more embodiments.

Referring now to FIG. 6D, operation 502 may include operation 640 depicting acquiring data that is related to particular protected data stored on a device, for which the device is configured to selectively allow access. For example, FIG. 2, e.g., FIG. 2D, shows derivation data that is derived from device data for which the device controls access acquiring module 240 acquiring data that is related to (e.g., that is similar to, or that contains information about, or that is of a same type) particular protected data stored on a device (e.g., a tablet device), for which the device is configured to selectively allow access (e.g., the device allows full access to read and write the data to some entities, and allows partial or no access to other entities).

Referring again to FIG. 6D, operation 640 may include operation 642 depicting acquiring anonymized data that is an anonymized version of particular protected data stored on the device, for which the device is configured to selectively allow access. For example, FIG. 2, e.g., FIG. 2D, shows anonymized data that is device data that has been anonymized, said device data for which the device controls access acquiring module 242 acquiring anonymized data (e.g., data that does not uniquely identify a device and/or a user from which the data originated) that is an anonymized version (e.g., a version for which the identifying data, which may be uniquely identifying data, has been modified, removed, altered, or otherwise obscured) of particular protected data (e.g., position data collected by the position sensor) stored on the device (e.g., a smartphone device, e.g., a Nokia Lumia 920), for which the device is configured to selectively allow access (e.g., the device prompts the user whether to grant access to an application trying to access the position data; in an embodiment, the prompt occurs the first time a particular application attempts to access the data, in another embodiment, the prompt occurs every time a particular application attempts to access the data, and in yet another embodiment, the prompt occurs on a periodic basis, e.g., once a week).

Referring again to FIG. 6D, operation 640 may include operation 644 depicting acquiring obscured data whose origin has been obscured, said obscured data corresponding to at least a portion of the particular protected data stored on the device, for which the device is configured to selectively allow access. For example, FIG. 2, e.g., FIG. 2D, shows obscured data that is device data that has been obscured, said device data for which the device controls access acquiring module 244 acquiring obscured data whose origin (e.g., the device and/or the user that collected or otherwise originated, e.g., entered, gathered, collected, received from another source and modified, and the like) has been obscured (e.g., data that uniquely identifies the origin device and/or user has been modified so that the data on its face no longer uniquely identifies the origin device and/or the origin user), said obscured data corresponding to at least a portion (e.g., in some embodiments, portion may mean a subset of the data, and in other embodiments, portion may mean a less-specific version of the data, e.g., rather than giving exact position data, giving position data within five miles, or rather than giving contact list information, giving first and last initials of contacts) of the particular protected data (e.g., position information) stored on the device (e.g., a personal navigation system that can be mounted to an interior of a motor vehicle), for which the device is configured to selectively allow access (e.g., an application on the device, e.g., a "church finder" application, must receive authorization from the device to access the position data).

Referring again to FIG. 6D, operation 644 may include operation 646 depicting acquiring obscured data whose origin device has been obscured by altering a device identifier that is unique to that device, said obscured data corresponding to at least a portion of the particular protected data stored on the device, for which the device is configured to selectively allow access. For example, FIG. 2, e.g., FIG. 2D, shows obscured data that is device data that has been obscured by changing device identifier data, said device data for which the device controls access acquiring module 246 acquiring obscured data whose origin device (e.g., the device to which the data was inputted, or the device that collected the data, or the device that modified the data into its present form) has been obscured by altering a device identifier that is unique to that device (e.g., for an Apple-branded device, an Apple identifier issued by Apple Corporation), said obscured data corresponding to at least a portion of the particular protected data (e.g., the contact list) stored on the device (e.g., an iMac personal computer that runs an email program with a contact list feature, e.g., Microsoft Outlook), for which the device is configured to selectively allow access (e.g., not every application on the iMac can access the contact list data).

Referring again to FIG. 6D, operation 640 may include operation 648 depicting acquiring locked data that is related to the particular protected data, wherein the particular protected data includes collected data of the device and a device identifier, and the locked data includes the collected data of the device and an obfuscated identifier. For example, FIG. 2, e.g., FIG. 2D, shows locked data that is device data for which one or more device identifying portions of the device data that has been modified, said device data for which the device controls access acquiring module 248 acquiring locked data that is related to (e.g., is a less-specific subset of) the particular protected data (e.g., barometric pressure data collected by a barometer of a device), wherein the particular protected data includes collected data (e.g., barometric pressure data) of the device (e.g., a home weather station) and a device identifier (e.g., the home weather station identification code assigned at time of sale of the home weather station to the end user), and the locked data includes the collected data of the device (e.g., the barometric pressure data collected by the barometer of the home weather station) and an obfuscated identifier (e.g., the home weather station identification code, but modified by applying one or more data transformations to the home weather station identification code).

Referring again to FIG. 6D, operation 648 may include operation 650 depicting acquiring locked data that is related to the particular protected data, wherein the particular protected data includes collected data of the device and a device identifier, and the locked data includes the position data of the device and an obfuscated identifier, wherein the device identifier is configured to be obtainable from the obfuscated identifier. For example, FIG. 2, e.g., FIG. 2D, shows obscured data that is particular protected data and an obfuscated identifier that has been generated from the particular protected data and a device identifier, said device identifier configured to be calculable from the obfuscated identifier acquiring module 250 acquiring locked data that is related to the particular protected data (e.g., the locked data is the same as the particular protected data, but with the obfuscated identifier). wherein the particular protected data includes collected data (e.g., collected position data from a GPS sensor of the device) of the device (e.g., a smartphone, e.g., a Samsung Galaxy S3) and a device identifier (e.g., a device SIM card identification number), and the locked data includes the position data of the device (e.g., the smartphone, e.g., the Samsung Galaxy S3) and an obfuscated identifier (e.g., an identifier that represents the device SIM card identification number to which a known algorithm has been applied to change the identification number), wherein the device identifier is configured to be obtainable from the obfuscated identifier (e.g., if the algorithm is known, the reverse of thee algorithm can be applied by the acquiring entity to arrive at the device identifier).

Figure 6E:
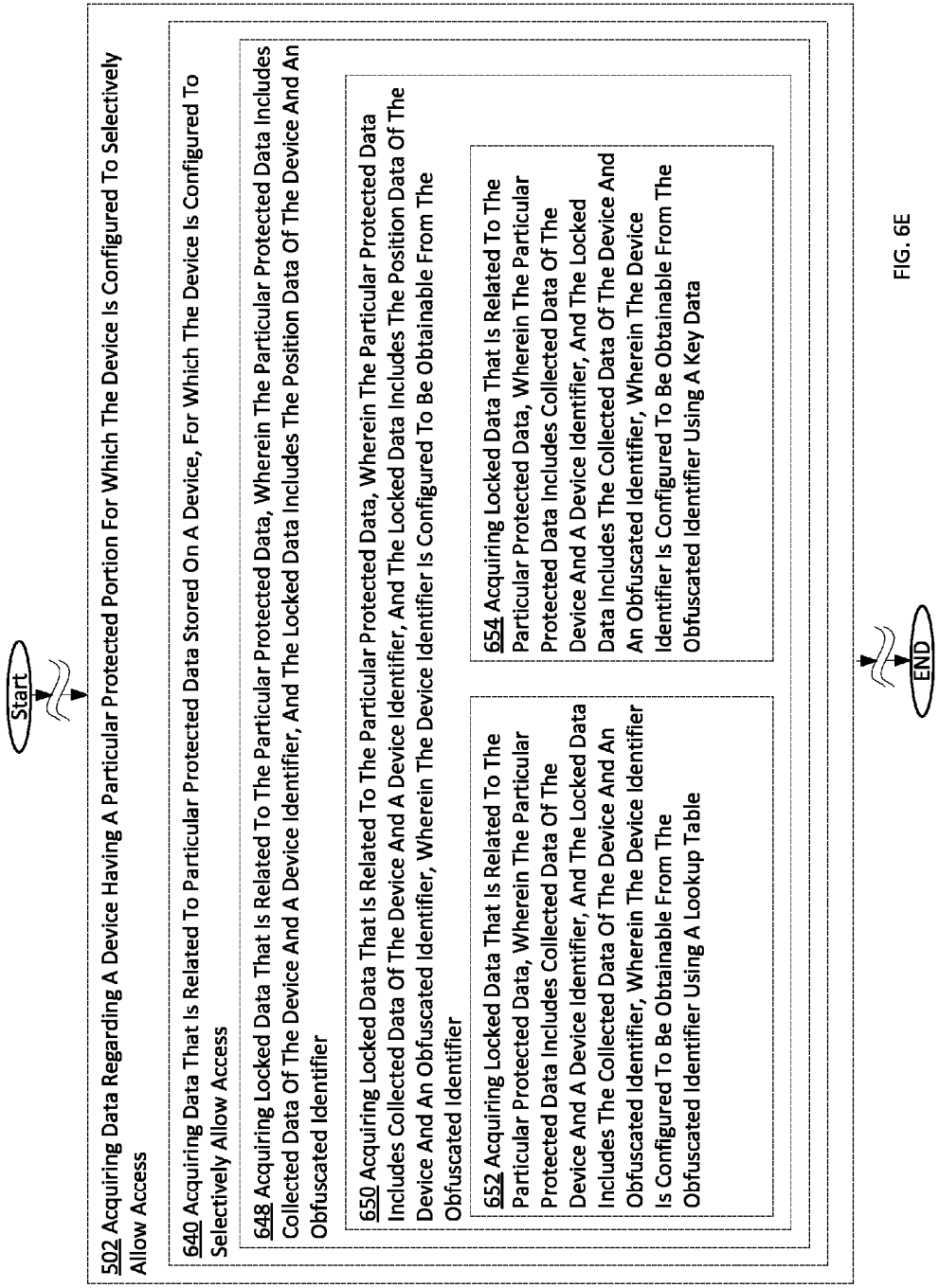
FIG. 6E is a high-level logic flow chart of a process depicting alternate implementations of a data acquiring operation 502, according to one or more embodiments.

Referring now to FIG. 6E, operation 650 may include operation 652 depicting acquiring locked data that is related to the particular protected data, wherein the particular protected data includes collected data of the device and a device identifier, and the locked data includes the collected data of the device and an obfuscated identifier, wherein the device identifier is configured to be obtainable from the obfuscated identifier using a lookup table. For example, FIG. 2, e.g., FIG. 2D, shows obscured data that is particular protected data and an obfuscated identifier that has been generated from the particular protected data and a device identifier, said device identifier configured to be calculable from the obfuscated identifier only with assistance of a lookup table acquiring module 252 acquiring locked data that is related to the particular protected data (e.g., a list of songs stored on the device), wherein the particular protected data includes collected data (e.g., the device tracks what songs are loaded onto the device and maintains the list) of the device (e.g., a portable music player, e.g., a Microsoft Zune) and a device identifier (e.g., a unique username associated with the device, e.g., a Zune Marketplace ID), and the locked data includes the collected data of the device and an obfuscated identifier (e.g., an identifier that does not reveal the unique username), wherein the device identifier is configured to be obtainable from the obscured identifier using a lookup table (e.g., when the device identifier is obscured into a different identifier, the relationship between the device identifier and the obscured identifier is stored in a lookup table, so that with access to the lookup table, the device identifier can be retrieved by looking up the obscured identifier in the lookup table).

Referring again to FIG. 6E, operation 650 may include operation 654 depicting acquiring locked data that is related to the particular protected data, wherein the particular protected data includes collected data of the device and a device identifier, and the locked data includes the collected data of the device and an obfuscated identifier, wherein the device identifier is configured to be obtainable from the obfuscated identifier using a key data. For example, FIG. 2, e.g., FIG. 2D, shows obscured data that is particular protected data and an obfuscated identifier that has been generated from the particular protected data and a device identifier, said device identifier configured to be calculable from the obfuscated identifier only using key data acquiring module 254 acquiring locked data that is related to the particular protected data (e.g., a list of the last five restaurant locations the device visited), wherein the particular protected data (e.g., location data) includes collected data (e.g., location data collected by the position sensor) of the device (e.g., a smartphone, e.g., an Apple iPhone) and a device identifier (e.g., a unique ID associated with the device), and the locked data includes the collected data of the device and an obfuscated identifier (e.g., an encrypted version of the device identifier, e.g., the unique ID, e.g., encrypted by RSA encryption), wherein the device identifier is configured to be obtainable from the obfuscated identifier using a key data (e.g., a private key, which could be used to decrypt the obfuscated identifier and arrive at the device identifier).

Figure 6F:
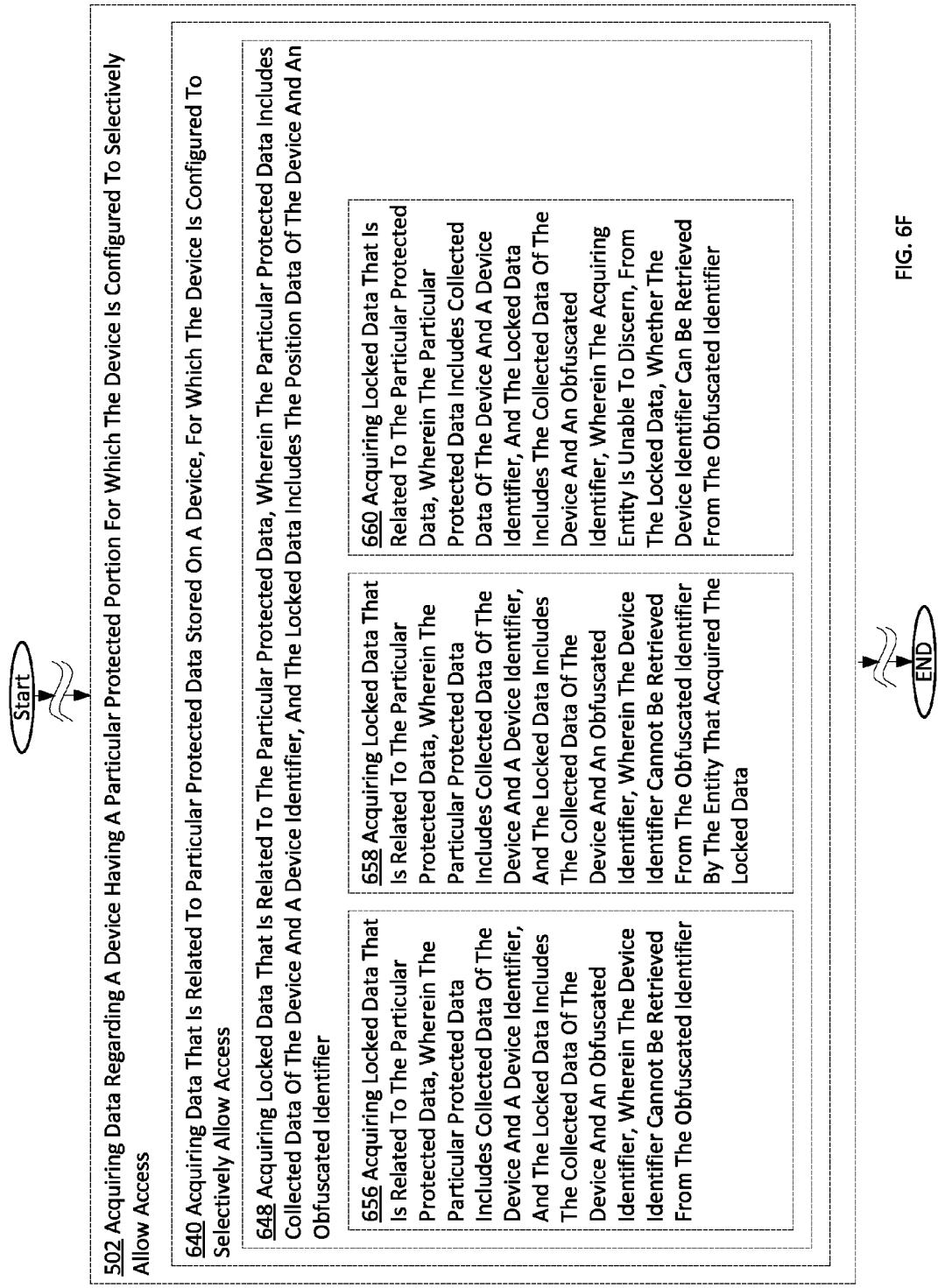
FIG. 6F is a high-level logic flow chart of a process depicting alternate implementations of a data acquiring operation 502, according to one or more embodiments.

Referring now to FIG. 6F, operation 648 may include operation 656 depicting acquiring locked data that is related to the particular protected data, wherein the particular protected data includes collected data of the device and a device identifier, and the locked data includes the collected data of the device and an obfuscated identifier, wherein the device identifier cannot be retrieved from the obfuscated identifier. For example, FIG. 2, e.g., FIG. 2E, shows obscured data that is particular protected data and an obfuscated identifier that has been generated from the particular protected data and a device identifier, said device identifier configured to be irretrievable from the obfuscated identifier acquiring module 256 acquiring locked data that is related to the particular protected data (e.g., position data), wherein the particular protected data includes collected data of the device (e.g., data collected by a position sensor of the device, e.g., a positioning watch) and a device identifier (e.g., a network ID address assigned by the network to that device, which may be unique for at least one communication session), and the locked data includes the collected data of the device and an obfuscated identifier (e.g., the device identifier that has been replaced with random numbers, or simply replaced with a text string that informs that the device identifier data has been removed), wherein the device identifier cannot be retrieved from the obfuscated identifier (e.g., the device identifier is overwritten by random or specific data that has no direct correlation with the device identifier, and reversal information is not stored or saved, so that the original device identifier cannot be retrieved after the writing of the obfuscated identifier).

Referring again to FIG. 6F, operation 648 may include operation 658 depicting acquiring locked data that is related to the particular protected data, wherein the particular protected data includes collected data of the device and a device identifier, and the locked data includes the collected data of the device and an obfuscated identifier, wherein the device identifier cannot be retrieved from the obfuscated identifier by the entity that acquired the locked data. For example, FIG. 2, e.g., FIG. 2E, shows locked data that is particular protected data and an identifier that has been generated from the particular protected data and a device identifier, said device identifier configured to be irretrievable from the obfuscated identifier by the locked data acquiring entity acquiring module 258 acquiring locked data that is related to the particular protected data (e.g., picture data from the device), wherein the particular protected data includes collected data of the device (e.g., collected picture data collected from a smartphone using a SIM card, e.g., a T-Mobile branded phone) and a device identifier (e.g., a SIM card identification number), and the locked data includes the collected data of the device and an obfuscated identifier (e.g., the device SIM card identification number, mixed in with other SIM card identification numbers, which may or may not be real SIM card identification numbers, such that it cannot be determined on the face of the numbers which identification number is the true identification number), wherein the device identifier cannot be retrieved from the obfuscated identifier by the entity that acquired the locked data (e.g., the acquiring entity has no way of determining which identification number is the true identification number, so even though the device has the information, and could correctly guess the true SIM card identification, it cannot be sure it has the right data, and thus the device identifier "cannot be retrieved" as used in this application).

Referring again to FIG. 6F, operation 648 may include operation 660 depicting acquiring locked data that is related to the particular protected data, wherein the particular protected data includes collected data of the device and a device identifier, and the locked data includes the collected data of the device and an obfuscated identifier, wherein the acquiring entity is unable to discern, from the locked data, whether the device identifier can be retrieved from the obfuscated identifier. For example, FIG. 2, e.g., FIG. 2E, shows locked data that is particular protected data and an obfuscated identifier that has been generated from the particular protected data and a device identifier, said locked data acquiring entity configured to be unable to discern a retrievability of the device identifier from the obfuscated identifier acquiring module 360 acquiring locked data that is related to the particular protected data (e.g., velocity data from a built-in in-vehicle motor vehicle control and monitoring system), wherein the particular protected data includes the collected data of the device (e.g., velocity data) and a device identifier (e.g., a VIN number of the motor vehicle, or a license plate number of the motor vehicle, or a driver of the vehicle's driver's license number), and the locked data includes the collected data of the device and an obfuscated identifier (e.g., an identifier that looks like the device identifier but that has been modified), wherein the acquiring entity is unable to discern, from the locked data, whether the device identifier can be retrieved from the obfuscated identifier (e.g., the acquiring entity, by looking at the obfuscated identifier, cannot tell if it has merely been overwritten by random data, in which case it is not retrievable, or if the data is the device identifier data to which an algorithm has been applied, in which case the data would be retrievable).

Figure 7A:
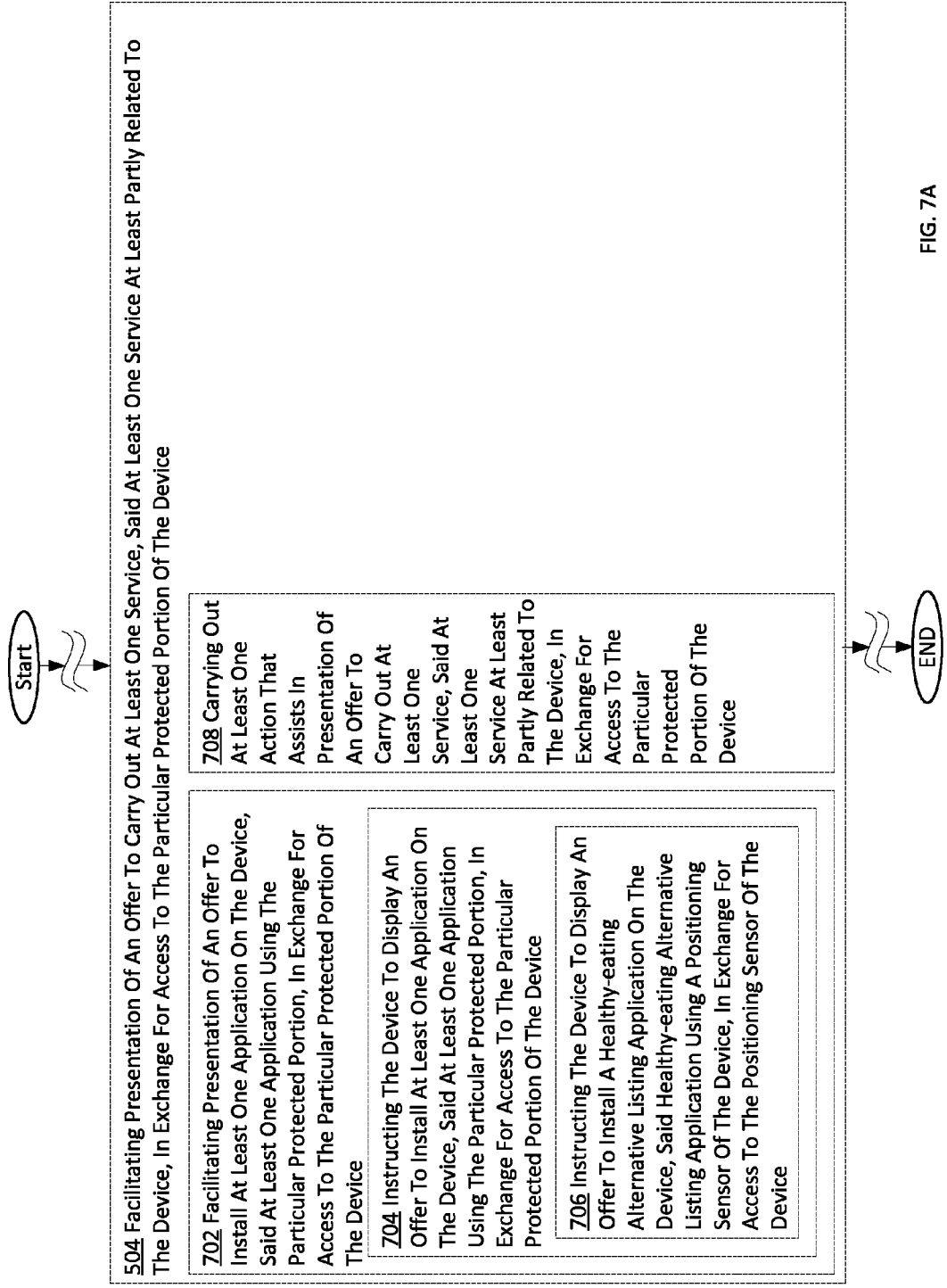
FIG. 7A is a high-level logic flow chart of a process depicting alternate implementations of an offer to carry out a service presentation facilitating operation 504, according to one or more embodiments.

FIGS. 7A-7I depict various implementations of operation 504, depicting facilitating presentation of an offer to carry out at least one service, said at least one service at least partly related to the device, in exchange for access to the particular protected portion of the device, according to embodiments. Referring now to FIG. 7A, operation 504 may include operation 702 depicting facilitating presentation of an offer to make installation available of at least one application on the device, said at least one application using the particular protected portion, in exchange for access to the particular protected portion of the device. For example, FIG. 3, e.g., FIG. 3A, shows presentation of an offer to install at least one program on the device in return for access to the device particular protected portion facilitating module 302 facilitating (e.g., performing one or more actions that assist in the execution or completion of) presentation (e.g., display, through any combination of visual and non-visual interfaces) of an offer (e.g., a presentation to a potential recipient for which the recipient is free to accept or reject, e.g., which may be in the form of, for example "this is a service we are willing to provide, are you interested," or any variant of that) to make installation available of (e.g., transmit the application onto so that the device, or transmit an installer program to the device, or provide instructions for retrieving from a location) at least one application (e.g., a road trip planning application that plans stops along a route) on the device (e.g., a personal navigation system whether built into the car or separate), said at least one application using the particular protected portion (e.g., a portion that determines the vehicle's speed, and/or, in an embodiment, whether the vehicle is on cruise control), in exchange for access to the particular protected portion (e.g., the speed meter and/or the speed data stored on the device) of the device (e.g., the personal navigation system).

Referring again to FIG. 7A, operation 702 may include operation 704 depicting instructing the device to display an offer to make installation available of at least one application on the device, said at least one application using the particular protected portion, in exchange for access to the particular protected portion of the device. For example, FIG. 3, e.g., FIG. 3A, shows presentation of an offer to install at least one program on the device configured to utilize data stored in the particular protected portion of the device in return for access to the device particular protected portion facilitating module 304 instructing the device (e.g., a smartphone, e.g., an Apple iPhone) to display an offer to make installation available (e.g., display a screen that says "Press OK to grant access to your position and install the "Cool Road Trip" application (e.g., an application that plans stops and sights and bathroom breaks on a road trip)) of at least one application on the device (e.g., the "Cool Road Trip" application), said at least one application using the particular protected portion (e.g., position information derived from a GPS sensor, which, in an embodiment, also may be stored in memory), in exchange for access to the particular protected portion (e.g., the position information, either pulled from the sensor or stored in memory, or both) of the device (e.g., the smartphone, e.g., the Apple iPhone).

Referring again to FIG. 7A, operation 704 may include operation 706 depicting instructing the device to display an offer to make installation available of a healthy-eating alternative listing application on the device, said healthy-eating alternative listing application using a positioning sensor of the device, in exchange for access to the positioning sensor of the device. For example, FIG. 4, e.g., FIG. 4A, shows presentation of an offer to install at least one alternative-eatery finding program on the device configured to utilize data stored in the particular protected portion of the device in return for access to the device particular protected portion facilitating module 306 instructing the device to display an offer to make installation available of a healthy eating alternative listing application on the device (e.g., a tablet device, e.g., an ASUS Transformer), said healthy eating alternative listing application using a positioning sensor of the device (e.g., using the position to find nearby healthy restaurants), in exchange for access to the positioning sensor of the device (e.g., the tablet device).

Referring again to FIG. 7A, operation 504 may include operation 708 depicting carrying out at least one action that assists in presentation of an offer to carry out at least one service, said at least one service at least partly related to the device, in exchange for access to the particular protected portion of the device. For example, FIG. 3, e.g., FIG. 3A, shows presentation of a proposal to perform at least one device-related service in return for access to the device particular protected portion executing module 308 carrying out at least one action (e.g., giving out a login and a password that will allow a user of a device to download an application for the device) that assists in presentation of an offer to carry out at least one service (e.g., an application that plans concerts to go to), said at least one service at least partly related to the device (e.g., the device may be a portable music player, and the service may be related to live music), in exchange for access to the particular protected portion (e.g., the user's identification of her favorite songs on the device) of the device (e.g., the portable music player, e.g., a Microsoft Zune HD).

Figure 7B:
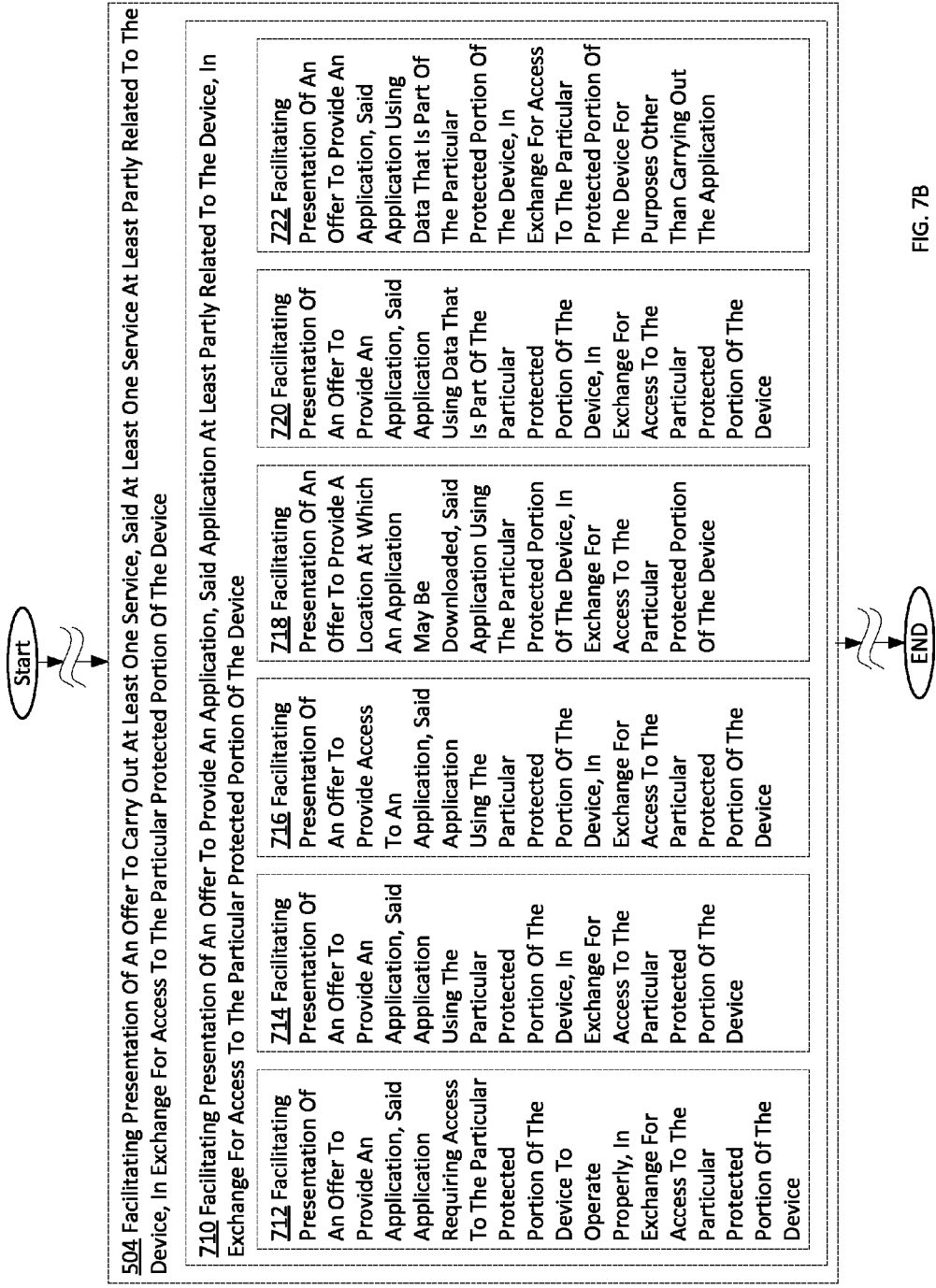
FIG. 7B is a high-level logic flow chart of a process depicting alternate implementations of an offer to carry out a service presentation facilitating operation 504, according to one or more embodiments.

Referring now to FIG. 7B, operation 504 may include operation 710 depicting facilitating presentation of an offer to provide an application, said application at least partly related to the device, in exchange for access to the particular protected portion of the device. For example, FIG. 3, e.g., FIG. 3B, shows presentation of a proposal to assist in delivery of an application configured to operate on the device at least one device-related service in return for access to the device particular protected portion facilitating module 310 facilitating presentation of an offer to provide an application (e.g., a hiking trail status tracking application), said application at least partly related to the device (e.g., the device was previously detected in a wilderness area with a high density of hiking trails), in exchange for access to the particular protected portion (e.g., a temperature sensor) of the device (e.g., a smartphone).

Referring again to FIG. 7B, operation 710 may include operation 712 depicting facilitating presentation of an offer to provide an application, said application requiring access to the particular protected portion of the device to operate properly, in exchange for access to the particular protected portion of the device. For example, FIG. 3, e.g., FIG. 3B, shows presentation of a proposal to assist in delivery of an application configured to require the particular protected portion of the device to function in return for access to the device particular protected portion facilitating module 312 facilitating presentation of an offer to provide an application (e.g., a "friend finder" application), said application requiring access to the particular protected portion (e.g., a contact list) of the device (e.g., a computer with Microsoft Outlook installed, which has a contact list service) to operate properly (e.g., the application uses a Microsoft Outlook-formatted contact list to determine who the device's friends are, so it can locate them, and without that type of formatted contact list, cannot properly gather all of the device user's friends that are stored on the device's contact list), in exchange for access to the particular protected portion of the device (e.g., the Microsoft Outlook-formatted contact list).

Referring again to FIG. 7B, operation 710 may include operation 714 depicting facilitating presentation of an offer to provide an application, said application using the particular protected portion of the device, in exchange for access to the particular protected portion of the device. For example, FIG. 3, e.g., FIG. 3B, shows presentation of a proposal to assist in delivery of an application configured to operate using the particular protected portion of the device in return for access to the device particular protected portion facilitating module 314 facilitating presentation of an offer to provide an application (e.g., a pickup football game scheduler that compares friends' locations and schedules), said application using the particular protected portion of the device (e.g., a telephone number contact list stored on a smartphone), in exchange for access to the particular protected portion (e.g., the block of memory where the telephone number contact list is stored) of the device (e.g., a smartphone, e.g., an HTC Evo).

Referring again to FIG. 7B, operation 710 may include operation 716 depicting facilitating presentation of an offer to provide access to an application, said application using the particular protected portion of the device, in exchange for access to the particular protected portion of the device. For example, FIG. 3, e.g., FIG. 3B, shows presentation of a proposal to provide access to an application configured to perform one or more operations on data related to the particular protected portion of the device in return for access to the device particular protected portion facilitating module 316 facilitating presentation (e.g., providing the "downloading" graphic) of an offer to provide access (e.g., provide a username and password to log onto a bicycle-riding mapping application website) to an application (e.g., bicycle-riding mapping application), said application using the particular protected portion (e.g., the portion of memory that stores position data and speed data taken from the ride) of the device (e.g., the website runs a Java applet that retrieves position and speed data from the device), in exchange for access to the particular protected portion (e.g., the portion of memory that stores position data and speed data taken from the ride) of the device (e.g., a ride-tracking device, e.g., that gets strapped to the bicycle during a ride, but that has a web browser for accessing the internet, along with other features).

Referring again to FIG. 7B, operation 710 may include operation 718 depicting facilitating presentation of an offer to provide a location at which an application may be downloaded, said application using the particular protected portion of the device, in exchange for access to the particular protected portion of the device. For example, FIG. 4, e.g., FIG. 3B, shows presentation of a location at which an application configured to perform one or more operations on data related to the particular protected portion of the device may be obtained in return for access to the device particular protected portion facilitating module 318 facilitating presentation of an offer to provide a location (e.g., a computer on an enterprise network run by a corporation) at which an application (e.g., a time tracking application) may be downloaded, said application using the particular protected portion (e.g., the portion of the memory that shows which application windows are open on a computer, and for what duration) of the device (e.g., a user's work computer), in exchange for access to the particular protected portion of the device (e.g., the user's work computer).

Referring again to FIG. 7B, operation 710 may include operation 720 depicting facilitating presentation of an offer to provide an application, said application using data that is part of the particular protected portion of the device, in exchange for access to the particular protected portion of the device. For example, FIG. 3, e.g., FIG. 3B, shows presentation of a proposal to assist in delivery of an application configured to process data that is part of the particular protected portion of the device in return for access to the device particular protected portion facilitating module 320 facilitating presentation of an offer (e.g., sending an instruction to the device to display the offer) to provide an application (e.g., a balanced-budget application), said application using data (e.g., financial data from a spreadsheet, e.g., a Microsoft Excel spreadsheet) that is part of the particular protected portion (e.g., the Excel-formatted spreadsheet is stored in an area of memory that is restricted, and the financial data is part of the spreadsheet) of the device (e.g., a user's home computer), in exchange for access to the particular protected portion (e.g., accessing other spreadsheets stored in the memory also, e.g., it does not have to be only the spreadsheet for which the information used to carry out the application is located) of the device (e.g., the user's home computer).

Referring again to FIG. 7B, operation 710 may include operation 722 depicting facilitating presentation of an offer to provide an application, said application using data that is part of the particular protected portion of the device, in exchange for access to the particular protected portion of the device for one or more purposes other than carrying out the application. For example, FIG. 3, e.g., FIG. 3B, shows presentation of a proposal to assist in delivery of an application configured to operate on the device at least one device-related service in return for access to the device particular protected portion for purposes unrelated to the application facilitating module 322 facilitating presentation (e.g., providing the graphics to the device that indicate what should be displayed to the user) of an offer to provide an application (e.g., to transmit an application, e.g., a high score tracking application), said application using data that is part of the particular protected portion (e.g., the area of memory where overall non-game specific game playing statistics are stored) of the device (e.g., a game system, e.g., a new Nintendo Wii), in exchange for access to the particular protected portion of the device (e.g., the area of memory where game playing statistics are stored) for one or more purposes (e.g., predicting similar min-games or in-game items the user might purchase) other than carrying out the application (e.g., tracking the user's high scores on different days and at different times to show the user when the best time to play is based on her habits).

Figure 7C:
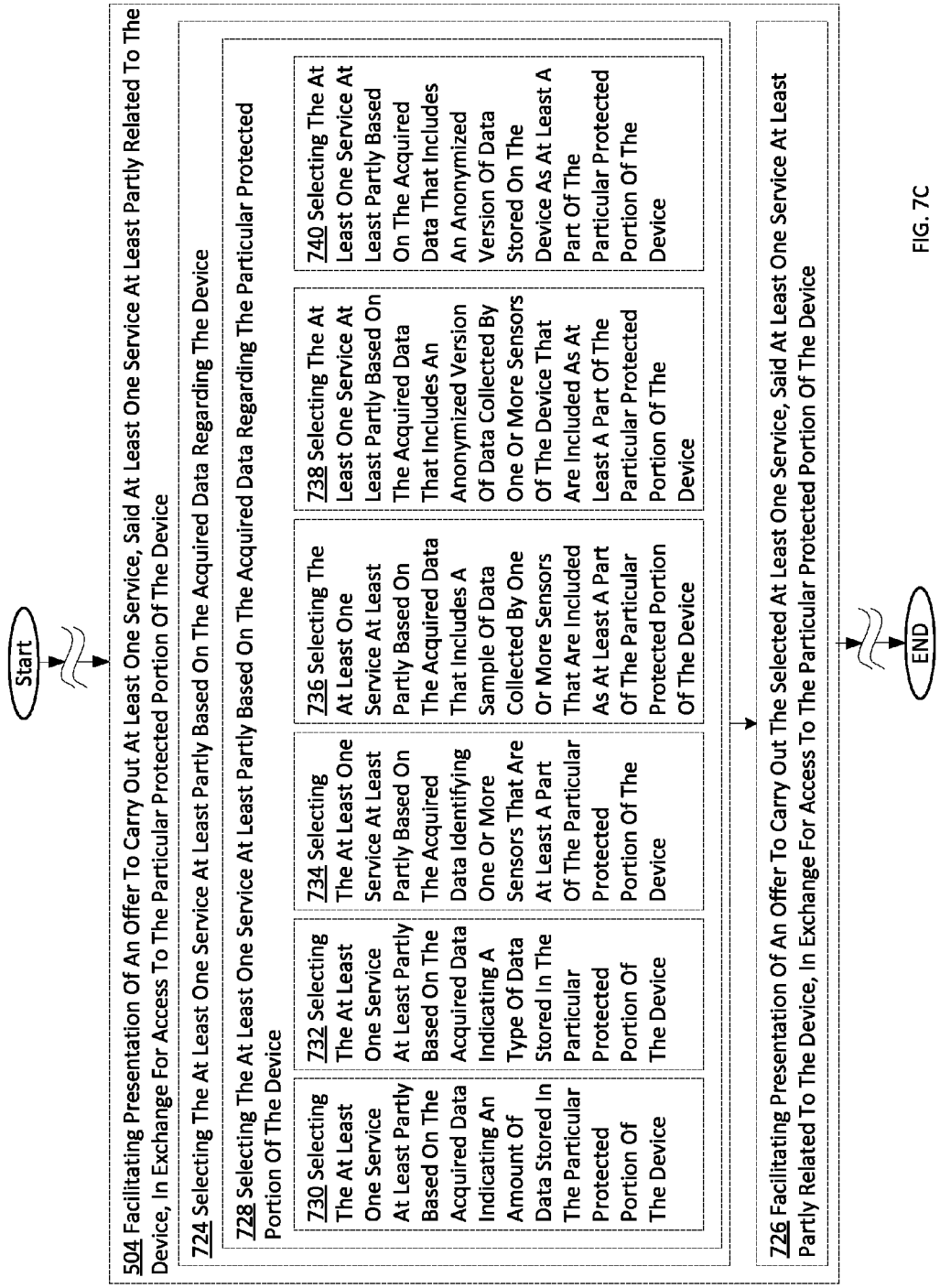
FIG. 7C is a high-level logic flow chart of a process depicting alternate implementations of an offer to carry out a service presentation facilitating operation 504, according to one or more embodiments.

Referring now to FIG. 7C, operation 504 may include operation 724 depicting selecting the at least one service at least partly based on the acquired data regarding the device. For example, FIG. 3, e.g., FIG. 3C, shows at least one service selecting at least partly based on acquired data module 324 selecting the at least one service (e.g., an in-game item recommending service) at least partly based on the acquired data (e.g., data regarding which games are played for which duration) regarding the device (e.g., a game system, e.g., a computer running a gaming client, e.g., Steam, or a game web portal, e.g., Kongregate).

Referring again to FIG. 7C, operation 504 may include operation 726 depicting facilitating presentation of an offer to carry out the selected at least one service, said at least one service at least partly related to the device, in exchange for access to the particular protected portion of the device. For example, FIG. 3, e.g., FIG. 3C, shows access to data acquired by the device as negotiated result of facilitating a presentation of an offer to provide the at least one selected services module 726 facilitating presentation of an offer to carry out the selected at least one service (e.g., the in-game item recommending service), said at least one service at least partly related to the device (e.g., the service relates to buying items in a game, and the device is a game system or a computer running a gaming client), in exchange for access to the particular protected portion (e.g., a breakdown of which games were played and when, and for how long, and what other games might be played or stored on the user's device) of the device (e.g., a computer running a gaming client).

Referring again to FIG. 7C, operation 724 may include operation 728 depicting selecting the at least one service at least partly based on the acquired data regarding the particular protected portion of the device. For example, FIG. 3, e.g., FIG. 3C, shows at least one service selecting at least partly based on acquired data regarding the particular protected portion of the device module 328 selecting the at least one service (e.g., a picture classification service) at least partly based on the acquired data (e.g., data indicating that the user has over 500 pictures in a single directory) regarding the particular protected portion (e.g., at least one area of memory where pictures are stored) of the device (e.g., a smartphone, e.g., a Nokia Lumia Windows phone, or a desktop computer).

Referring again to FIG. 7C, operation 728 may include operation 730 depicting selecting the at least one service at least partly based on the acquired data indicating an amount of data stored in at least a part of the particular protected portion of the device. For example, FIG. 3, e.g., FIG. 3C, shows at least one service selecting at least partly based on acquired data indicating an amount of data stored as part of the particular protected portion of the device module 330 selecting the at least one service (e.g., an "application deleting to free up memory" service) at least partly based on the acquired data indicating an amount of data (e.g., an amount of application data, and/or whether the device is close to capacity) store in at least a part of the particular protected portion (e.g., a portion of the memory that stores applications) of the device (e.g., a smartphone, e.g., a Google Android-based phone).

Referring again to FIG. 7C, operation 728 may include operation 732 depicting selecting the at least one service at least partly based on the acquired data indicating a type of data stored in at least a part of the particular protected portion of the device. For example, FIG. 3, e.g., FIG. 3C, shows at least one service selecting at least partly based on acquired data indicating a type of data stored in the particular protected portion of the device module 332 selecting the at least one service (e.g., a new music finding service) at least partly based on the acquired data (e.g., the acquired data shows that 65% of the memory on the device is occupied with music files in MP3 format) indicating a type of data (e.g., music data) stored in at least a part of the particular protected portion (e.g., the entire memory) of the device (e.g., a smartphone, e.g., a Blackberry 8800).

Referring again to FIG. 7C, operation 728 may include operation 734 depicting selecting the at least one service at least partly based on the acquired data identifying one or more sensors that are at least a part of the particular protected portion of the device. For example, FIG. 3, e.g., FIG. 3C, shows at least one service selecting at least partly based on acquired data describing one or more sensors that are a portion of the particular protected portion of the device module 334 selecting the at least one service (e.g., a soda pop vending machine locating service) at least partly based on the acquired data (e.g., data indicating that the device in question has a thermometer and a position sensor) identifying one or more sensors (e.g., the thermometer and the position sensor) that are at least a part of the particular protected portion (e.g., the position sensor is protected, but the thermometer is not) of the device (e.g., a smartphone).

Referring again to FIG. 7C, operation 728 may include operation 736 depicting selecting the at least one service at least partly based on the acquired data that includes a sample of data collected by one or more sensors that are included as at least a part of the particular protected portion of the device. For example, FIG. 3, e.g., FIG. 3C, shows at least one service selecting at least partly based on acquired data including sample data from one or more sensors that are a portion of the particular protected portion of the device module 336 selecting the at least one service (e.g., a soda pop vending machine locating service) at least partly based on the acquired data (e.g., data indicating that a temperature sensor detects temperatures over eighty degrees Fahrenheit for the last seven hours) that includes a sample of data (e.g., a temperature sample taken once each hour from the device) that are included as at least a part of the particular protected portion (e.g., the temperature data is protected, but the sampling is allowed) of the device (e.g., a smartphone, or in another embodiment, a home weather station).

Referring again to FIG. 7C, operation 728 may include operation 738 depicting selecting the at least one service at least partly based on the acquired data that includes an anonymized version of data collected by one or more sensors of the device that are included as at least a part of the particular protected portion of the device. For example, FIG. 3, e.g., FIG. 3C, shows at least one service selecting at least partly based on acquired anonymized data including data from one or more particular protected portion sensors that has been anonymized device module 338 selecting the at least one service (e.g., a steak dinner finding service) at least partly based on the acquired data (e.g., data indicating that "user X," who is not known by the selecting entity, has spent five nights in the last month at various steakhouses) that includes an anonymized version (e.g., a version of the data in which the user identifier is replaced with "user X") of data collected by one or more sensors (e.g., data indicating that the device is located at a steakhouse from the position sensor) that are included as at least a part of the particular protected portion (e.g., the position sensor) of the device (e.g., a smartphone, e.g., an Apple iPhone).

Referring again to FIG. 7C, operation 728 may include operation 740 depicting selecting the at least one service at least partly based on the acquired data that includes an anonymized version of data stored on the device as at least a part of the particular protected portion of the device. For example, FIG. 3, e.g., FIG. 3C, shows at least one service selecting at least partly based on acquired anonymized data including data stored on at least part of the particular protected portion that has been anonymized device module 340 selecting the at least one service (e.g., offering tickets to the "Matt and Kim" concert) at least partly based on the acquired data (e.g., song artist data) that includes an anonymized version of data stored on the device (e.g., song artist data, but with identifying information removed or obscured) as at least a part of the particular protected portion (e.g., the song artist data) of the device (e.g., a personal music player, e.g., an Apple iPod).

Figure 7D:
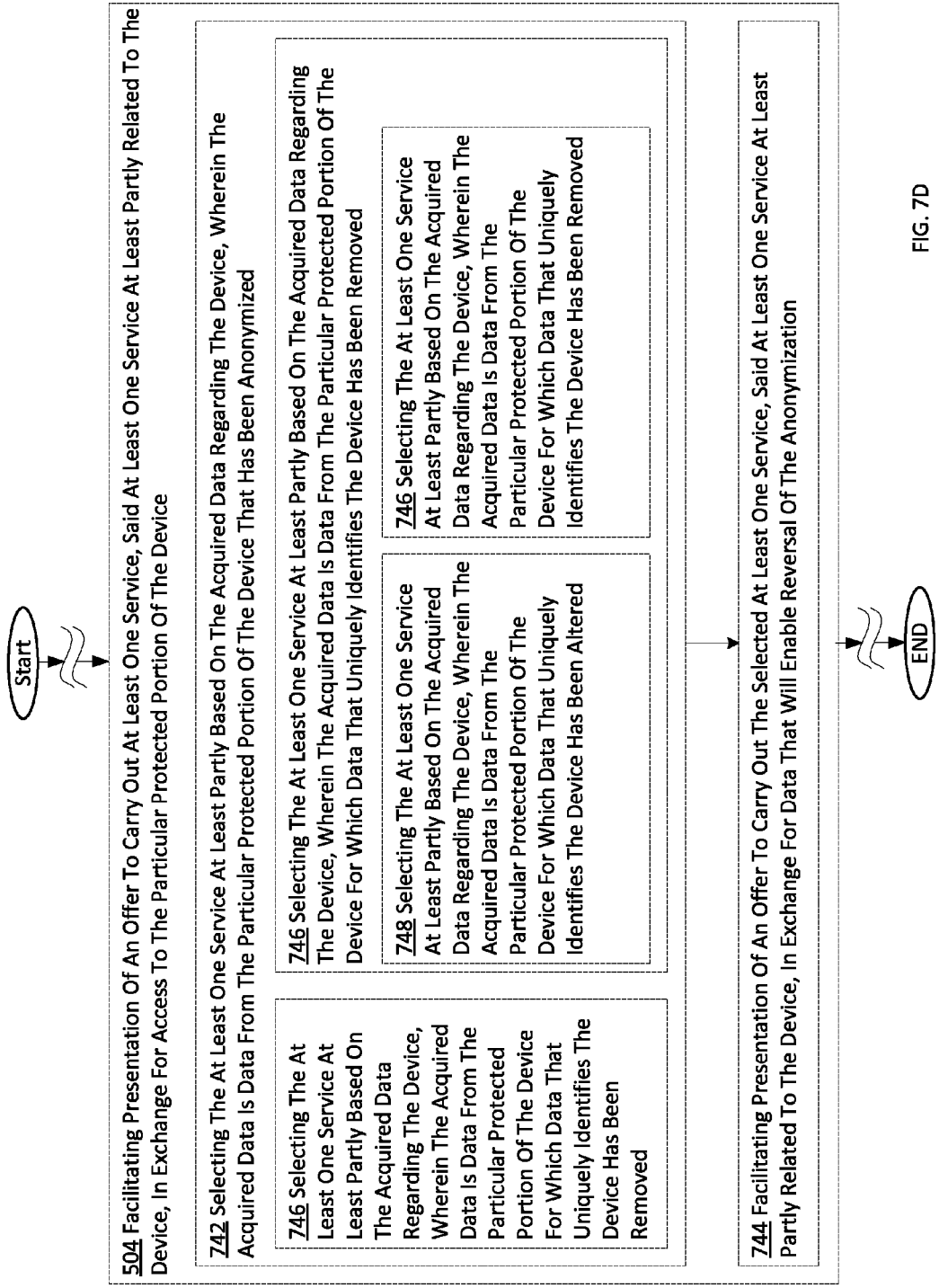
FIG. 7D is a high-level logic flow chart of a process depicting alternate implementations of an offer to carry out a service presentation facilitating operation 504, according to one or more embodiments.

Referring now to FIG. 7D, operation 504 may include operation 742 depicting selecting the at least one service at least partly based on the acquired data regarding the device, wherein the acquired data is data from the particular protected portion of the device that has been anonymized. For example, FIG. 3, e.g., FIG. 3D, shows at least one service selecting at least partly based on anonymized version of data from the particular protected portion of the device module 342 selecting the at least one service (e.g., an ideal garden planting time calculating service) at least partly based on the acquired data regarding the device (e.g., a web browsing history of the device), wherein the acquired data is data from the particular protected portion (e.g., a portion of the web browsing history) of the device (e.g., a user's laptop computer or tablet device) that has been anonymized (e.g., information in the data that uniquely identifies the device and/or the user has been removed or altered).

Referring again to FIG. 7D, operation 504 may include operation 744 depicting facilitating presentation of an offer to carry out the selected at least one service, said at least one service at least partly related to the device, in exchange for data that will enable reversal of the anonymization. For example, FIG. 3, e.g., FIG. 3D, shows access to data that will enable deanonymization of at least a portion of the data from the particular protected portion acquired by the device as negotiated result of facilitating a presentation of an offer to provide the at least one selected services module 344 facilitating presentation of an offer to carry out the selected at least one service (e.g., displaying a rule book for a sport or game being played in the proximity of the device), said at least one service at least partly related to the device (e.g., the device is detected as being in a proximity to a sporting event taking place), in exchange for data that will enable reversal of the anonymization (e.g., a decryption key, e.g., a digital signature key).

Referring again to FIG. 7D, operation 742 may include operation 746 depicting selecting the at least one service at least partly based on the acquired data regarding the device, wherein the acquired data is data from the particular protected portion of the device for which data that uniquely identifies the device has been removed. For example, FIG. 3, e.g., FIG. 3D, shows at least one service selecting at least partly based on version of data from the particular protected portion of the device without device uniquely identifying information module 346 selecting the at least one service (e.g., a data traffic analysis service) at least partly based on the acquired data regarding the device (e.g., data indicating that the device, which is a tablet having a Wi-Fi radio and a wireless 4G network radio, moves greater than 5 GB of data over the 4G network each month), wherein the acquired data is data from the particular protected portion (e.g., the Wi-Fi_33 radio is protected) of the device (e.g., the tablet device) for which data that uniquely identifies the device (e.g., a MAC address) has been removed (e.g., the MAC address is deleted from the data string).

Referring again to FIG. 7D, operation 742 may include operation 748 depicting selecting the at least one service at least partly based on the acquired data regarding the device, wherein the acquired data is data from the particular protected portion of the device for which data that uniquely identifies the device has been altered. For example, FIG. 3, e.g., FIG. 3D, shows at least one service selecting at least partly based on version of data from the particular protected portion of the device for which device uniquely identifying information has been modified module 348 selecting the at least one service (e.g., a service that shows which bars in a particular neighborhood have the highest ratio of women to men) at least partly based on the acquired data (e.g., data from a Facebook profile indicating that the user's relationship status is "single," gender is "male," and sexual orientation is "straight"), wherein the acquired data is data from the particular protected portion (e.g., a Facebook profile to which the device has access, but is not directly stored on the device) of the device (e.g., a smartphone), for which data that uniquely identifies the device has been altered (e.g., in the acquired data, the Facebook username "cooldude1234" has been altered to "afdgnmwkrngt," e.g., to gibberish).

Referring again to FIG. 7D, operation 748 may include operation 750 depicting selecting the at least one service at least partly based on the acquired data regarding the device, wherein the acquired data is data from the particular protected portion of the device for which data that uniquely identifies the device has been encrypted. For example, FIG. 3, e.g., FIG. 3D, shows at least one service selecting at least partly based on version of data from the particular protected portion of the device for which device uniquely identifying information has been encrypted module 350 selecting the at least one service (e.g., a service that provides add-on sales to products that were just purchased, e.g., if a video game system, it shows other games, if running shoes, it shows sweat-wicking socks, and so forth) at least partly based on the acquired data (e.g., a shopping profile from an online retailer, e.g., Amazon.com), Referring again to FIG. 7D, operation 750 may include operation 752 depicting selecting the at least one service at least partly based on the acquired data regarding the device, wherein the acquired data is data from the particular protected portion of the device for which data that uniquely identifies the device has been substituted for data that cannot be solely used to uniquely identify the device. For example, FIG. 3, e.g., FIG. 3D, shows at least one service selecting at least partly based on version of data from the particular protected portion of the device for which device uniquely identifying information has been substituted for data that is not device uniquely identifying module 352 selecting the at least one service (e.g., a service that shows a route through Washington, D.C., that avoids all roundabouts) at least partly based on the acquired data (e.g., data indicating the user and the device are located within Washington, D.C.) regarding the device, wherein the acquired data is data from the particular protected portion of the device (e.g., the position sensor of a smartphone) for which data that uniquely identifies the device (e.g., a name with which the device has been registered at the device manufacturer, e.g., "Bill's Asus Tablet") has been substituted for data that cannot be solely used to uniquely identify the device (e.g., "Bill's Asus Tablet" has been replaced with "generic Asus A500 tablet").

Figure 7E:
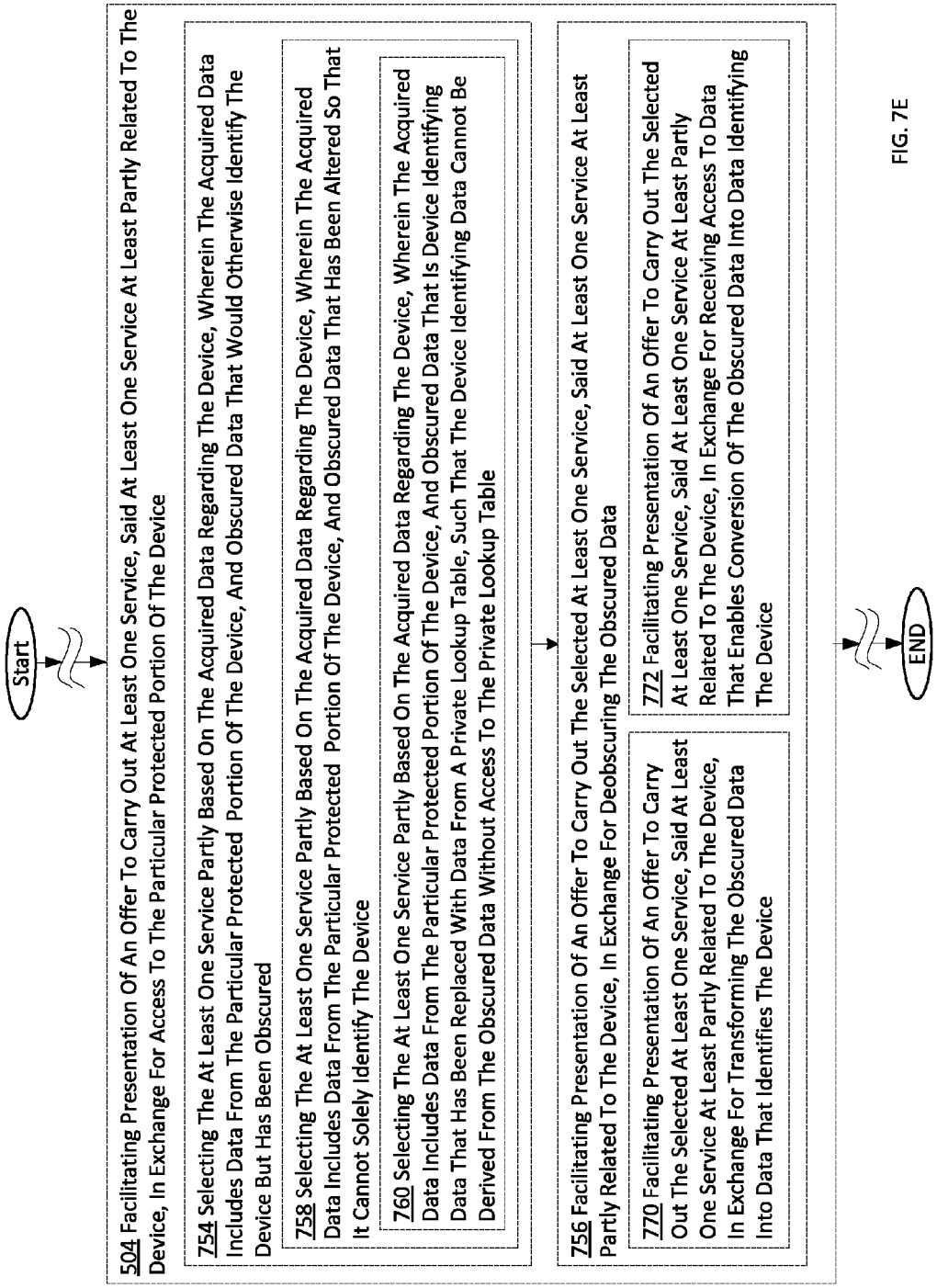
FIG. 7E is a high-level logic flow chart of a process depicting alternate implementations of an offer to carry out a service presentation facilitating operation 504, according to one or more embodiments.

Referring now to FIG. 7E, operation 504 may include operation 754 depicting selecting the at least one service partly based on the acquired data regarding the device, wherein the acquired data includes data from the particular protected portion of the device, and obscured data that would otherwise identify the device but has been obscured. For example, FIG. 3, e.g., FIG. 3E, shows at least one service selecting at least partly based on obscured version of data from the particular protected portion of the device module 354 selecting the at least one service (e.g., a service that shows where the nearest available taxi is to your location) partly based on the acquired data regarding the device (e.g., data indicating that the device is traveling at walking speed and is located more than three miles from the user's indicated home), wherein the acquired data includes data from the particular protected portion (e.g., the user's home address, in the protected portion of the device's memory), and obscured data that would otherwise identify the device but has been obscured (e.g., has been encrypted with a digital signature algorithm, e.g., a DES algorithm).

Referring again to FIG. 7E, operation 504 may include operation 756 depicting facilitating presentation of an offer to carry out the selected at least one service, said at least one service at least partly related to the device, in exchange for deobscuring the obscured data. For example, FIG. 3, e.g., FIG. 3E, shows deobscuring of at least a portion of the data from the particular protected portion acquired by the device as negotiated result of facilitating a presentation of an offer to provide the at least one selected services module 356 facilitating presentation of an offer to carry out the selected at least one service (e.g., a service that shows where the nearest available taxi is to the device's location), said at least one service at least partly related to the device (e.g., the service may be used by the device, e.g., a user's smartphone), in exchange for deobscuring the obscured data (e.g., in exchange for receiving the key that will decrypt the data).

Referring again to FIG. 7E, operation 754 may include operation 758 depicting selecting the at least one service partly based on the acquired data regarding the device, wherein the acquired data includes data from the particular protected portion of the device, and obscured data that has been altered so that it cannot solely identify the device. For example, FIG. 3, e.g., FIG. 3E, shows at least one service selecting at least partly based on obscured version of data from the particular protected portion of the device that cannot solely identify the device module 358 selecting the at least one service (e.g., a service that identifies how far an athlete should run on a particular day, based on the length and speed of the runs on previous days that are stored on the device, e.g., an athlete assistant device watch with Internet connectivity), wherein the acquired data includes data from the particular protected portion (e.g., the "run result" data storage portion of the device), and obscured data that has been altered so that it cannot solely identify the device (e.g., the device's MAC address is part of the acquired data, and to obscure the data, five hundred additional "fake" MAC addresses were added, so that an entity viewing the data cannot distinguish the real MAC address)

Referring again to FIG. 7E, operation 758 may include operation 760 depicting selecting the at least one service partly based on the acquired data regarding the device, wherein the acquired data includes data from the particular protected portion of the device, and obscured data that is device identifying data that has been replaced with data from a private lookup table, such that the device identifying data cannot be derived from the obscured data without access to the private lookup table. For example, FIG. 3, e.g., FIG. 3E, shows at least one service selecting at least partly based on obscured version of data from the particular protected portion of the device that cannot identify the device without access to a private lookup table module 360 selecting the at least one service partly based on the acquired data regarding the device (e.g., a facial-image recognition service) partly based on the acquired data regarding the device (e.g., data indicating that the device has at least twenty pictures with one or more people visible in them), wherein the acquired data includes data from the particular protected portion of the device (e.g., the image data is the particular protected portion), and obscured data that is device identifying data (e.g., a device identifier used on a network, e.g., a Google ID) that has been replaced with data from a private lookup table (e.g., "device 01234567"), such that the device identifying data (e.g., the Google ID device identifier) cannot be derived from the obscured data (e.g., device 01234567) without access to the private lookup table (e.g., if "device 01234567" is plugged into the private lookup table, it will return the device identifier, but without the private lookup table, there is no reversible non-coincidental relationship between the device identifier and the obscured data).

Figure 7F:
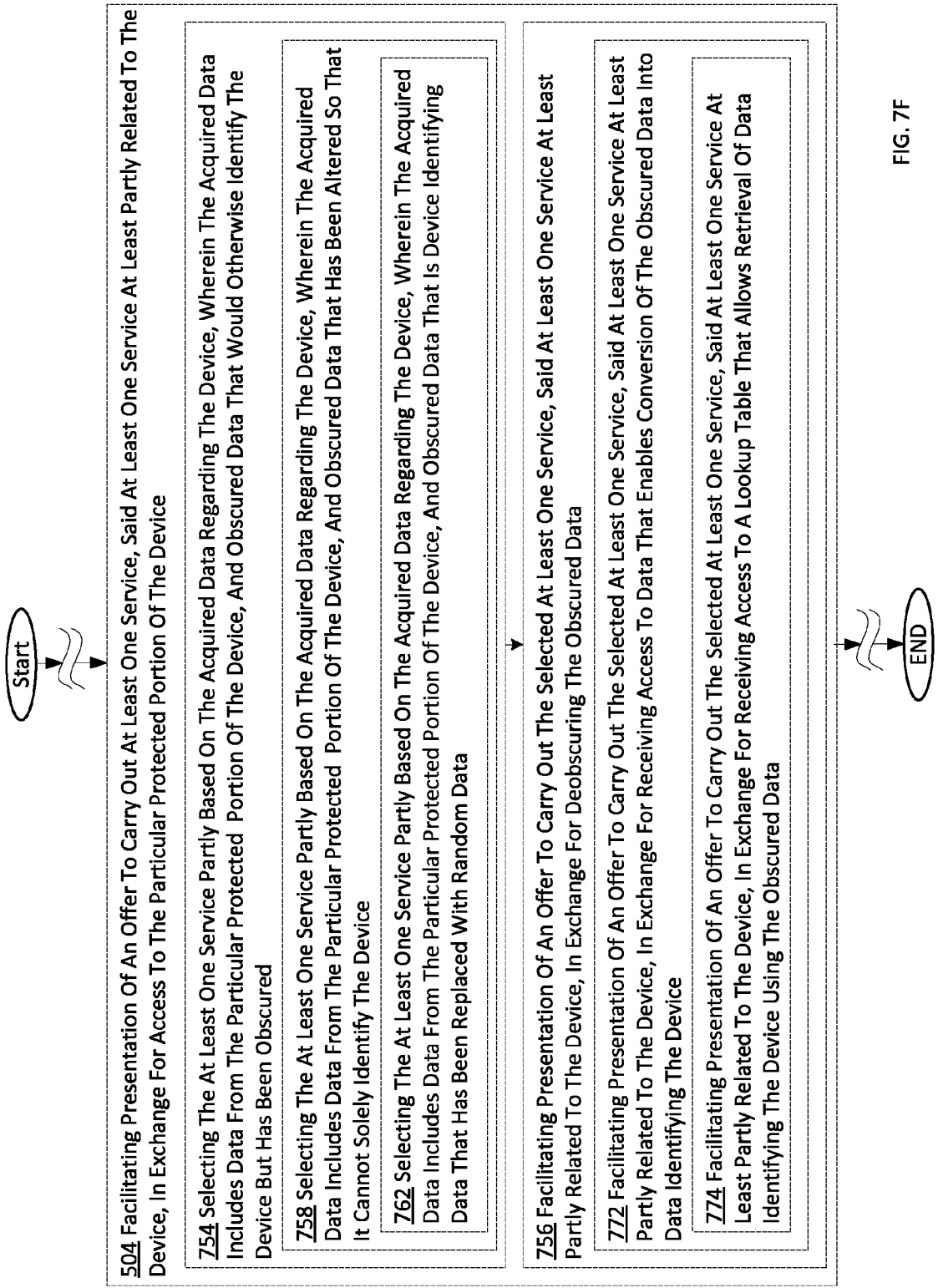
FIG. 7F is a high-level logic flow chart of a process depicting alternate implementations of an offer to carry out a service presentation facilitating operation 504, according to one or more embodiments.

Referring now to FIG. 7F, operation 758 may include operation 762 depicting selecting the at least one service partly based on the acquired data regarding the device, wherein the acquired data includes data from the particular protected portion of the device, and obscured data that is device identifying data that has been replaced with random data. For example, FIG. 3, e.g., FIG. 3E, shows at least one service selecting at least partly based on obscured version of data from the particular protected portion of the device that is random data in place of device identifying data module 362 selecting the at least one service (e.g., a service designed to predict the best time of day to go for a bicycle ride) partly based on the acquired data regarding the device (e.g., data from the position sensor indicating that the device moves at speeds and patterns indicating a substantial amount of bicycle travel), wherein the acquired data includes data from the particular protected portion (e.g., position data) of the device, and obscured data that is device identifying data (e.g., an IP address of the device) that has been replaced with random data (e.g., randomly selected numbers).

Figure 7G:
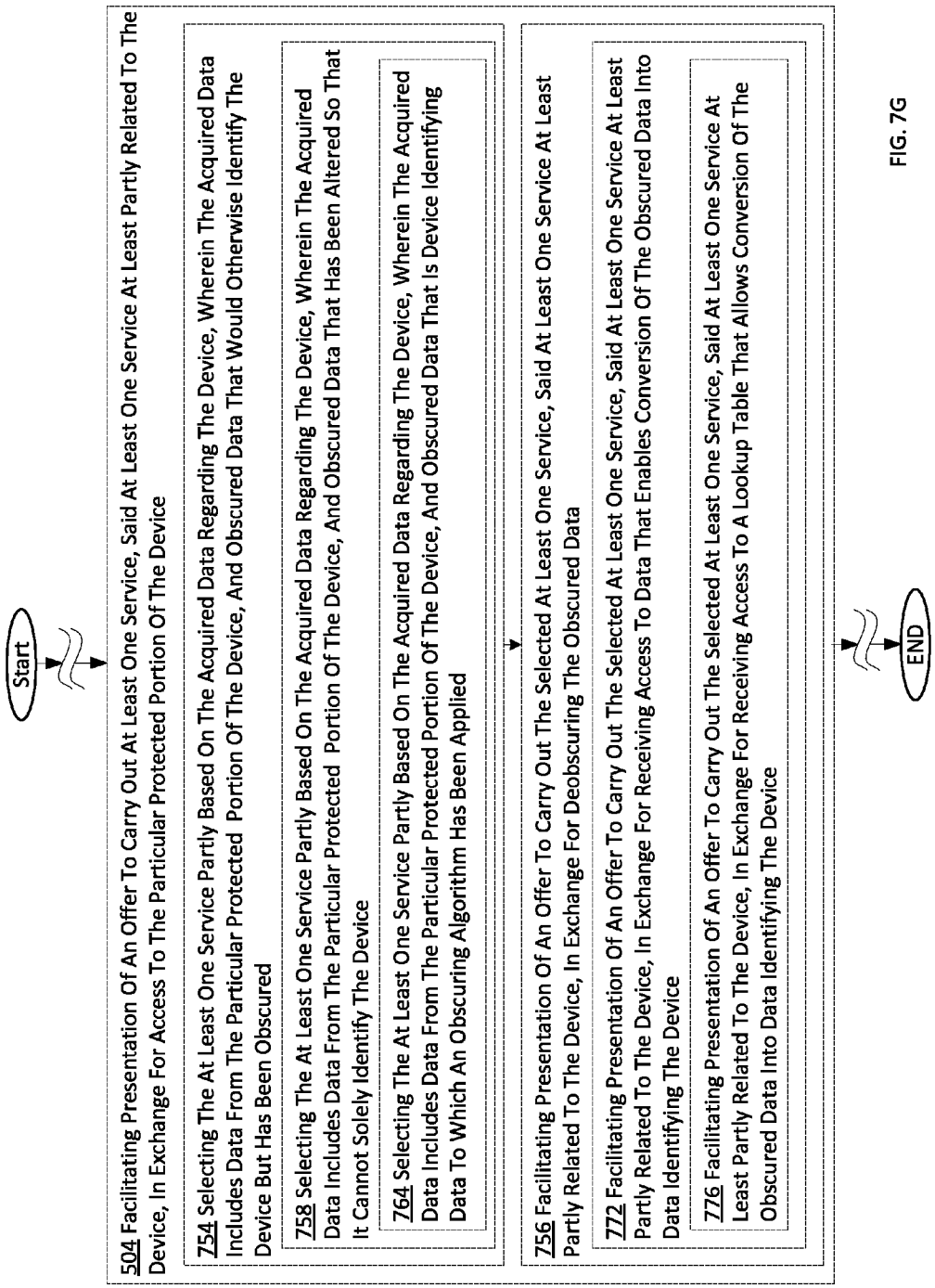
FIG. 7G is a high-level logic flow chart of a process depicting alternate implementations of an offer to carry out a service presentation facilitating operation 504, according to one or more embodiments.

Referring now to FIG. 7G, operation 758 may include operation 764 depicting selecting the at least one service partly based on the acquired data regarding the device, wherein the acquired data includes data from the particular protected portion of the device, and obscured data that is device identifying data to which an obscuring algorithm has been applied. For example, FIG. 3, e.g., FIG. 3F, shows at least one service selecting at least partly based on obscured version of data from the particular protected portion of the device that is device identifying data to which an obscuring algorithm has been applied module 364 selecting the at least one service (e.g., a service showing a map of available wireless networks in a certain area (e.g., a neighborhood), and the relative strengths and/or clarity of signal of those wireless networks) partly based on the acquired data (e.g., wireless network data collected over a period of time) regarding the device (e.g., a smartphone), wherein the acquired data includes data from the particular protected portion (e.g., data from the networks detected by the wireless radio) of the device (e.g., the smartphone), and obscured data that is device identifying data to which an obscuring algorithm (e.g., an algorithm, e.g., a Hasty Pudding Cipher (e.g., described and hereby incorporated by reference at http://en.wikipedia.org/wiki/Hasty_Pudding_cipher, retrieved on Sep. 20, 2012)) has been applied.

Figure 7H:
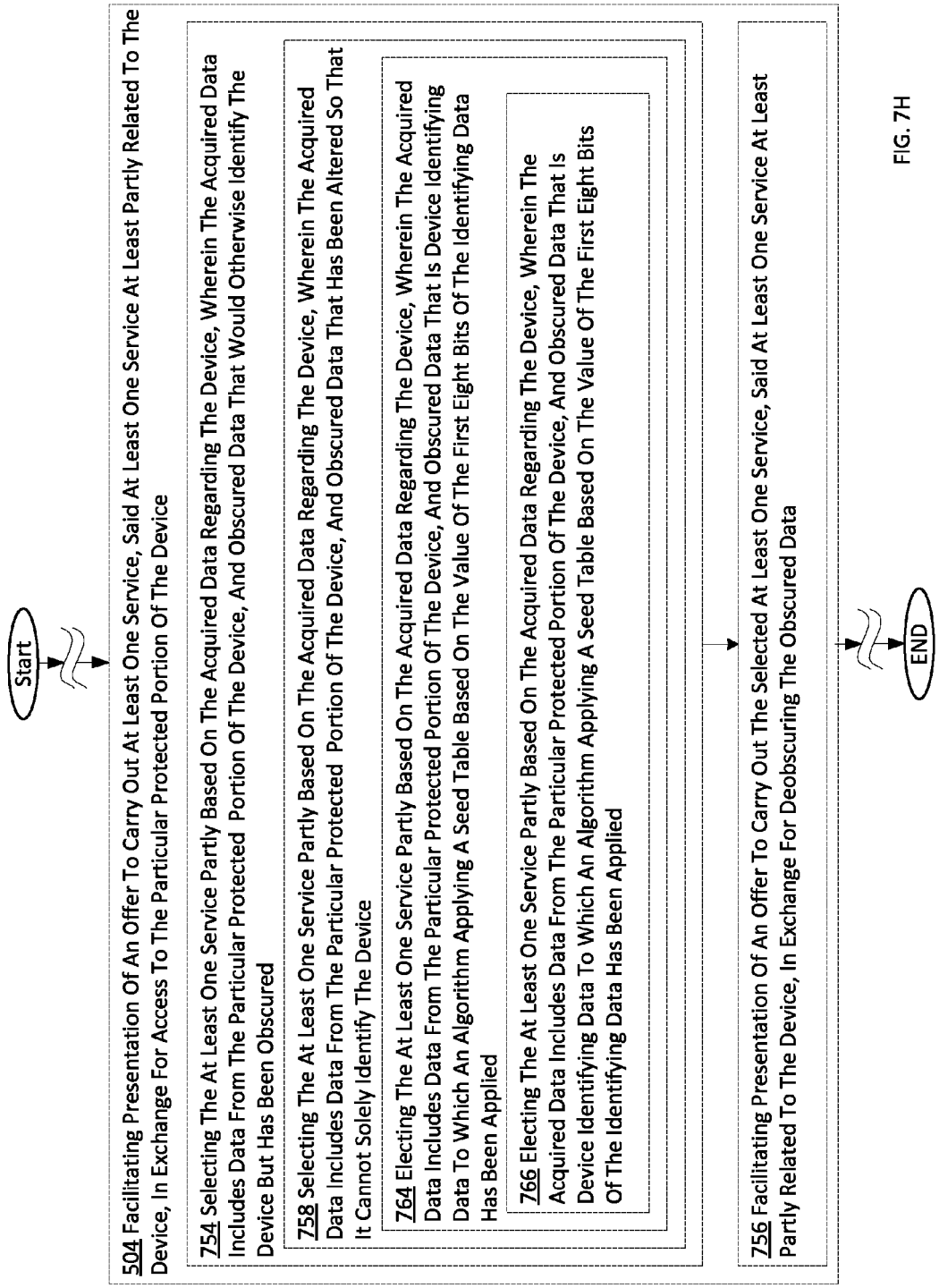
FIG. 7H is a high-level logic flow chart of a process depicting alternate implementations of an offer to carry out a service presentation facilitating operation 504, according to one or more embodiments.
Figure 71:
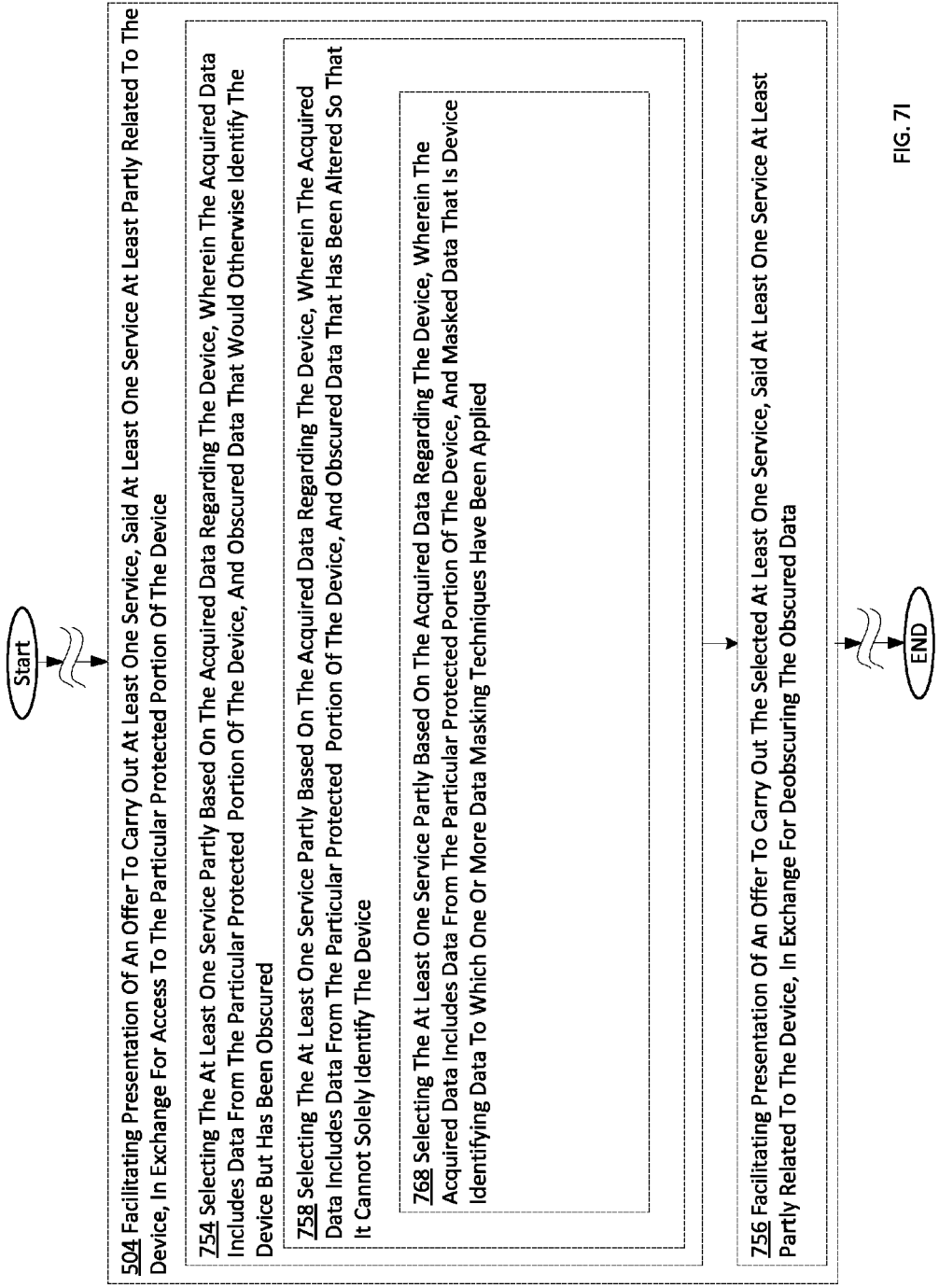

Referring now to FIG. 7H, operation 764 may include operation 766 depicting selecting the at least one service partly based on the acquired data regarding the device, wherein the acquired data includes data from the particular protected portion of the device, and obscured data that is device identifying data to which an algorithm applying a seed table based on the value of the first eight bits of the identifying data has been applied. For example, FIG. 3, e.g., FIG. 3F, shows at least one service selecting at least partly based on obscured version of data from the particular protected portion of the device that is device identifying data to which a seed table algorithm has been applied module 366 selecting the at least one service (e.g., an ice-cream shop locating service) partly based on the acquired data (e.g., temperature data indicating that the device is in a location that is hot and sunny) regarding the device (e.g., a tablet device with a thermometer), wherein the acquired data includes data from the particular protected portion (e.g., the temperature sensor) of the device (e.g., the tablet device with the thermometer), and obscured data that is device identifying data (e.g., a unique name assigned to the device by the device manufacturer when the device is "registered" by the user) to which an algorithm applying a seed table based on the value of the first eight bits of the identifying data has been applied.

Referring now to FIG. 7I, operation 758 may include operation 768 depicting selecting the at least one service partly based on the acquired data regarding the device, wherein the acquired data includes data from the particular protected portion of the device, and masked data that is device identifying data to which one or more data masking techniques have been applied. For example, FIG. 3, e.g., FIG. 3F, shows at least one service selecting at least partly based on a masked version of data from the particular protected portion of the device that is device identifying data to which a masking technique has been applied module 368 selecting the at least one service (e.g., an alternative health-food finding service) partly based on the acquired data regarding the device (e.g., an updating inventory of what is in the refrigerator that is stored and maintained on the device,e.g., a smart appliance, e.g., a smart refrigerator in a user's house), which has access to the things that the user bought with a credit card that are perishable), wherein the acquired data includes data (e.g., a portion of the inventory) from the particular protected portion of the device (e.g., the inventory maintained by the device), and masked data that is device identifying data (e.g., the serial number of the smart refrigerator) to which one or more data masking techniques (e.g., noise addition, micro-aggregation, or data swapping, e.g., and which one or more specific examples are mentioned elsewhere in this application)) have been applied.

Referring back to FIG. 7E, operation 756 may include operation 770 depicting facilitating presentation of an offer to carry out the selected at least one service, said at least one service at least partly related to the device, in exchange for transforming the obscured data into data that identifies the device. For example, FIG. 3, e.g., FIG. 3E, shows transforming obscured data from the particular protected portion acquired by the device into device identifying data as negotiated result of facilitating a presentation of an offer to provide the at least one selected services module 370 facilitating presentation of an offer to carry out the selected at least one service (e.g., identifying which grocery store has the freshest inventory of blackberries), said at least one service at least partly related to the device (e.g., the device is located in a grocery store), in exchange for transforming (e.g., retrieving, deobscuring, returning, reversing, and the like) the obscured data (e.g., data which was previously known as identifying data, but has been altered to obscure the identity of a device and/or a user) into data that identifies the device (e.g., a device identifier, e.g., a MAC address of a device).

Referring back to FIG. 7E, operation 356 may include operation 772 depicting facilitating presentation of an offer to carry out the selected at least one service, said at least one service at least partly related to the device, in exchange for receiving access to data that enables conversion of the obscured data into data identifying the device. For example, FIG. 3, e.g., FIG. 3E, shows receiving data enabling conversion of obscured data from the particular protected portion acquired by the device into device identifying data as negotiated result of facilitating a presentation of an offer to provide the at least one selected services module 372 facilitating presentation of an offer to carry out the selected at least one service (e.g., a workout designing service), said at least one service at least partly related to the device (e.g., the device (e.g., a watch that can load programs and take measurements designed to improve workout efficiency) is sold at gyms and sporting goods stores), in exchange for receiving data (e.g., a deobscuring algorithm that, when applied to the obscured data, results in the data in its form prior to being obscured, e.g., as a device and/or user identifier) that enables conversion of the obscured data into data identifying the device (e.g., a device identifier, e.g., the device's unique identification, e.g., the device's Apple ID, if the device is manufactured by Apple).

Referring back to FIG. 7F, operation 372 may include operation 774 depicting facilitating presentation of an offer to carry out the selected at least one service, said at least one service at least partly related to the device, in exchange for receiving access to a lookup table that allows retrieval of data identifying the device using the obscured data. For example, FIG. 3, e.g., FIG. 3E, shows receiving access to a lookup table enabling retrieval of obscured data from the particular protected portion acquired by the device into device identifying data as negotiated result of facilitating a presentation of an offer to provide the at least one selected services module 374 facilitating presentation of an offer to carry out the selected at least one service (e.g., determining one or more books a user of the device might like to read), said at least one service at least partly related to the device (e.g., the device is an e-reader, e.g., an Amazon Kindle, or a Barnes and Noble Nook), in exchange for receiving access to a lookup table that allows retrieval (e.g., by applying the obscured data to the lookup table) of data identifying the device (e.g., an Amazon login that has been associated with the device, which is an Amazon Kindle, by the user) using the obscured data.

Referring back to FIG. 7G, operation 372 may include operation 776 depicting facilitating presentation of an offer to carry out the selected at least one service, said at least one service at least partly related to the device, in exchange for receiving access to a lookup table that allows conversion of the obscured data into data identifying the device. For example, FIG. 3, e.g., FIG. 3F, shows receiving access to a lookup table enabling conversion of obscured data from the particular protected portion acquired by the device into device identifying data as negotiated result of facilitating a presentation of an offer to provide the at least one selected services module 376 facilitating presentation of an offer to carry out the selected at least one service (e.g., a service that estimates how much time until it starts raining), said at least one service at least partly related to the device (e.g., it is detected from the browser history of the web browser of the device that the user frequently checks weather-related web sites), in exchange for receiving access to a lookup table that allows conversion of the obscured data into data identifying the device (e.g., a home weather station application loaded on a home computer).

Figure 8A:
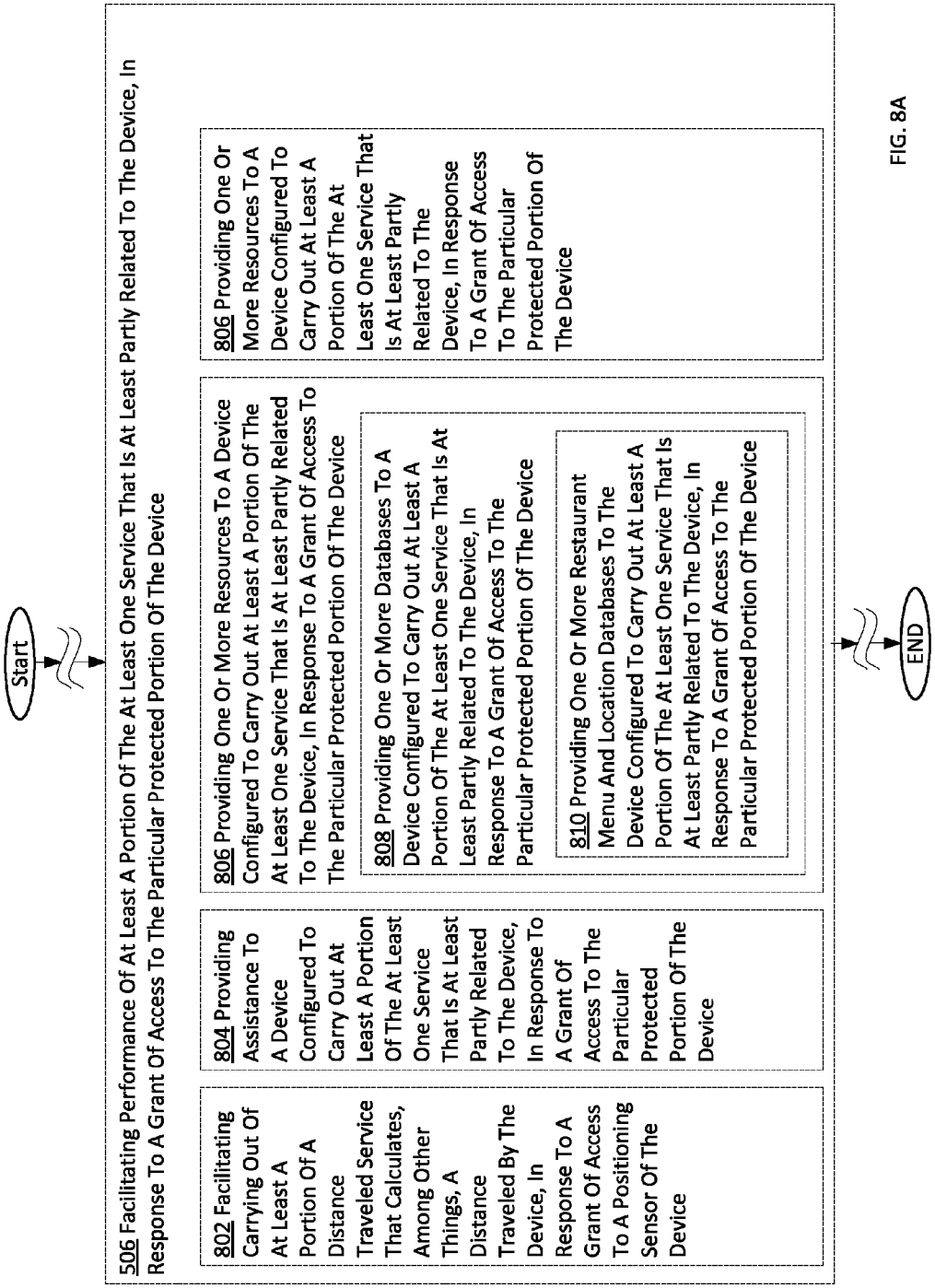
FIG. 8A is a high-level logic flow chart of a process depicting alternate implementations of a service performance facilitating operation 506, according to one or more embodiments.
Figure 8B:
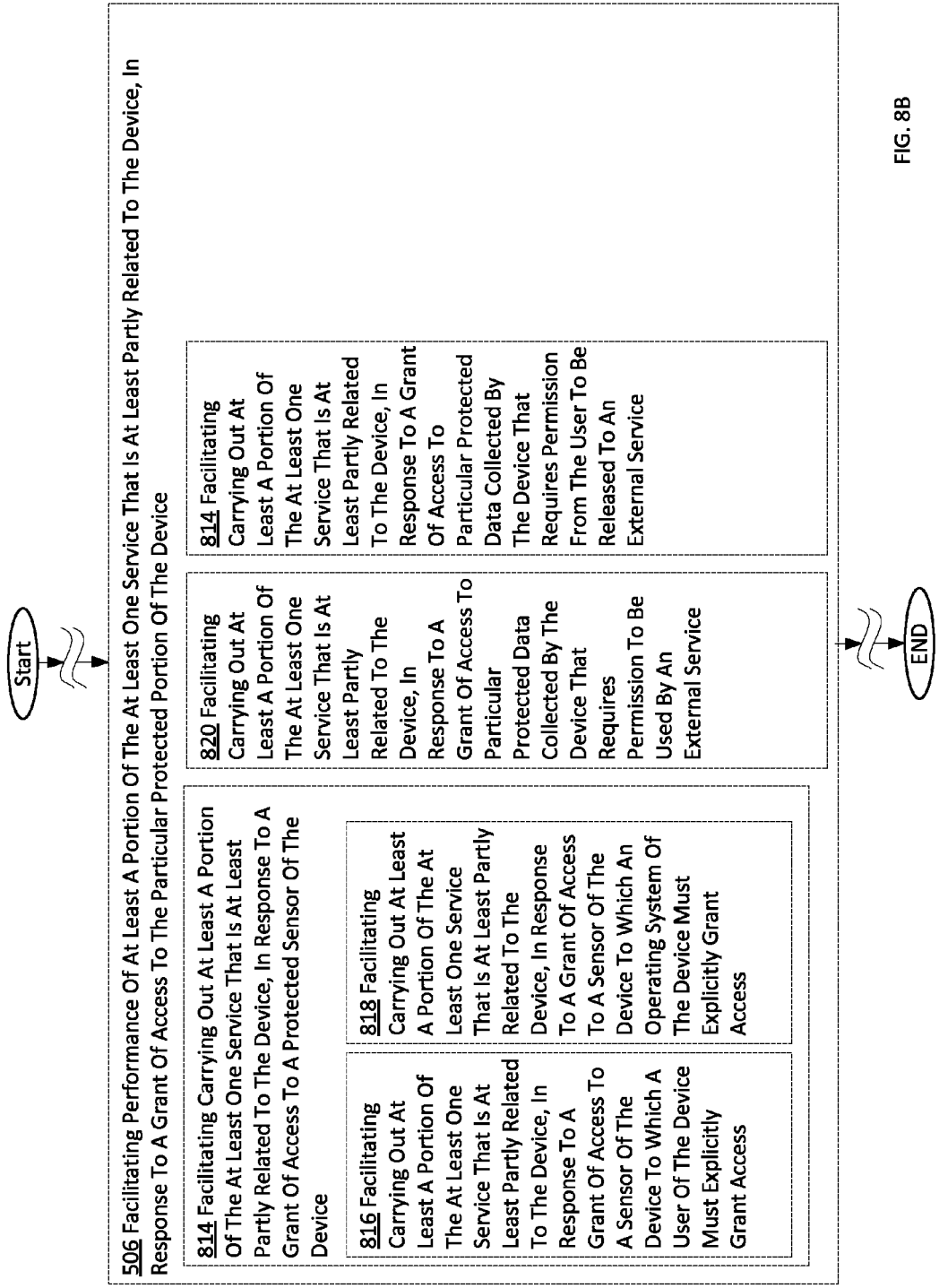
FIG. 8B is a high-level logic flow chart of a process depicting alternate implementations of a service performance facilitating operation 506, according to one or more embodiments.

FIGS. 8A-8B depict various implementations of operation 506 depicting facilitating performance of at least a portion of the at least one service that is at least partly related to the device, in response to a grant of access to the particular protected portion of the device, according to embodiments. Referring now to FIG. 8A, operation 506 may include operation 802 depicting facilitating carrying out of at least a portion of a distance traveled service that calculates a distance traveled by the device, in response to a grant of access to a positioning sensor of the device. For example, FIG. 4, e.g., FIG. 4A, shows execution of at least a portion of a distance traveled calculating service facilitating in response to a grant of access to a positioning sensor data acquired by the device module 402 facilitating carrying out (e.g., taking at least one action or executing at least one instruction that aids or assists in the completion or execution of) of at least a portion of a distance traveled service that calculates a distance traveled by the device (e.g., an in-vehicle navigation system), in response to a grant of access to a positioning sensor of the device (e.g., the in-vehicle navigation system).

Referring again to FIG. 8A, operation 506 may include operation 804 depicting providing assistance to a device configured to carry out at least a portion of the at least one service that is at least partly related to the device, in response to a grant of access to the particular protected portion of the device. For example, FIG. 4, e.g., FIG. 4A, shows assisting the device in executing at least a portion of the one or more services facilitating in response to a grant of access to data acquired by the device module 404 providing assistance to a device configured to carry out at least a portion of the at least one service (e.g., a service showing you a list of the nearest automated teller machine devices ("ATMs") and what the service fee for each of the ATMs is) that is at least partly related to the device (e.g., the device has a position sensor, and so showing a nearest entity is related to the device), in response to a grant of access to the particular protected portion of the device (e.g., in response to gaining access to the positioning sensor of the device, e.g., a smartphone).

Referring again to FIG. 8A, operation 506 may include operation 806 depicting providing one or more resources to a device configured to carry out at least a portion of the at least one service that is at least partly related to the device, in response to a grant of access to the particular protected portion of the device. For example, FIG. 4, e.g., FIG. 4A, shows providing one or more resources to a device to aid in performance of the one or more services facilitating in response to a grant of access to data acquired by the device module 406 providing one or more resources (e.g., providing a database (e.g., a database of all the public bathrooms and their ratings), or providing storage for data, or providing a processor-intensive algorithm) to a device configured to carry out at least a portion of the at least one service (e.g., giving the user of the device directions to the nearest public bathroom and information regarding its rating by other users) that is at least partly related to the device (e.g., the user has entered a query into a web-based search engine regarding one or more public bathrooms), in response to a grant of access to the particular protected portion (e.g., the positioning sensor) of the device (e.g., a user's smartphone).

Referring again to FIG. 8A, operation 806 may include operation 808 depicting providing one or more databases to a device configured to carry out at least a portion of the at least one service that is at least partly related to the device, in response to a grant of access to the particular protected portion of the device. For example, FIG. 4, e.g., FIG. 4A, shows providing one or more database resources to a device to aid in performance of the one or more services facilitating in response to a grant of access to data acquired by the device module 408 providing one or more databases to a device configured to carry out at least a portion of the at least one service (e.g., mapping the population density in the vicinity of the user of the device) that is at least partly related to the device (e.g., the device directly asked for a service similar to this, or the user of the device directly requested this type of service), in response to a grant of access to the particular protected portion of the device (e.g., the positioning sensor of the device).

Referring again to FIG. 8A, operation 808 may include operation 810 depicting providing one or more restaurant menu and location databases to the device configured to carry out at least a portion of the at least one service that is at least partly related to the device, in response to a grant of access to the particular protected portion of the device. For example, FIG. 4, e.g., FIG. 4A, shows providing a restaurant menu database and a restaurant location database to a device to aid in performance of an eating out analysis service facilitating in response to a grant of access to data acquired by the device module 410 providing one or more restaurant menu and location databases to the device (e.g., a user's home computer, e.g., a laptop, e.g., a Dell XPS laptop) configured to carry out at least a portion of the at least one service (e.g., a restaurant dessert comparison service) that is at least partly related to the device (e.g., the device already has a competing dessert-related application loaded in its memory), in response to a grant of access to the particular protected portion of the device (e.g., the device memory that stores a user's prior reviews of different desserts that were posted online).

Referring again to FIG. 8A, operation 506 may include operation 812 depicting providing one or more manipulations of data collected by the device to the device, in response to a grant of access to the particular protected portion of the device. For example, FIG. 4, e.g., FIG. 4A, shows providing one or more data manipulation services to a device to aid in performance of the one or more services facilitating in response to a grant of access to data acquired by the device module 412 providing one or more manipulations of data (e.g., weather pattern modeling) collected by the device to the device (e.g., a smartphone, in response to a grant of access to the particular protected portion of the device (e.g., a barometer and thermometer of the device, e.g., a home weather station).

Referring now to FIG. 8B, operation 506 may include operation 814 depicting facilitating carrying out at least a portion of the at least one service that is at least partly related to the device, in response to a grant of access to a protected sensor of the device. For example, FIG. 4, e.g., FIG. 4B, shows provision of at least a portion of the one or more services facilitating upon receipt of negotiated access to a protected sensor of the device module 414 facilitating carrying out at least a portion of the at least one service (e.g., a service that shows where the nearest available taxi is to your location) that is at least partly related to the device (e.g., the device once called a taxi service using its cellular radio), in response to a grant of access to a protected sensor (e.g., a location sensor) of the device (e.g., a user's smartphone device).

Referring again to FIG. 8B, operation 814 may include operation 816 depicting facilitating carrying out at least a portion of the at least one service that is at least partly related to the device, in response to a grant of access to a sensor of the device to which a user of the device must explicitly grant access. For example, FIG. 4, e.g., FIG. 4B, shows provision of at least a portion of the one or more services facilitating upon receipt of negotiated access to a protected sensor of the device to which a user must explicitly grant access module 416 facilitating carrying out at least a portion of the at least one service (e.g., a service that shows if there is a store within five miles of the device's location that has the item that the user is considering purchasing for a cheaper price) that is at least partly related to the device (e.g., the device is pointed at the item that the user is considering), in response to a grant of access to a sensor (e.g., an image capturing sensor) of the device to which a user of the device must explicitly grant access (e.g., the user must grant access to share the picture or to share data from the image capturing sensor generally).

Referring again to FIG. 8B, operation 814 may include operation 818 depicting facilitating carrying out at least a portion of the at least one service that is at least partly related to the device, in response to a grant of access to a sensor of the device to which an operating system of the device must explicitly grant access. For example, FIG. 4, e.g., FIG. 4B, shows provision of at least a portion of the one or more services facilitating upon receipt of negotiated access to a protected sensor of the device to which a root-access program must explicitly grant access module 418 facilitating carrying out at least a portion of the at least one service (e.g., a service that shows a route through Washington, D.C., that avoids all roundabouts) that is at least partly related to the device (e.g., the device is a OEM-produced motor vehicle control system), in response to a grant of access to a sensor of the device (e.g., the speedometer) to which an operating system (e.g., a custom OEM operating system, or a modified version of Google's Android operating system designed for motor vehicle controls) of the device must explicitly grant access (e.g., the entity must receive authorization from the operating system, which otherwise prohibits reading of the data).

Referring again to FIG. 8B, operation 506 may include operation 820 depicting facilitating carrying out at least a portion of the at least one service that is at least partly related to the device, in response to a grant of access to particular protected data collected by the device that requires permission to be used by an external service. For example, FIG. 4, e.g., FIG. 4B, shows provision of at least a portion of the one or more services facilitating upon receipt of negotiated access to data acquired by the device and requiring specific permission to be released to an external service module 420 facilitating carrying out at least a portion of the at least one service (e.g., a service that shows which bars in a particular neighborhood have the highest ratio of women to men) that is at least partly related to the device (e.g., the device has made one or more related search queries), in response to a grant of access to particular protected data (e.g., a social networking profile data, e.g., Facebook profile data, that was transmitted to the device when the user logged into the social networking service on the device) that requires permission to be used by an external service (e.g., the user and/or the device must grant explicit access for an outside entity that is providing the service to use the Facebook profile data).

Referring again to FIG. 8B, operation 506 may include operation 822 depicting facilitating carrying out at least a portion of the at least one service that is at least partly related to the device, in response to a grant of access to particular protected data collected by the device that requires permission from the user to be released externally to the device. For example, FIG. 4, e.g., FIG. 4B, shows provision of at least a portion of the one or more services facilitating upon receipt of negotiated access to data acquired by the device and requiring user permission to be released to an external service module 422 facilitating carrying out at least a portion of the at least one service (e.g., a fluid drinking guidance service for long bicycle rides) that is at least partly related to the device (e.g., the device already has a bicycle-riding assistance application installed in its memory), in response to a grant of access to particular protected data (e.g., heart rate data of the user) collected by the device (e.g., a bicycle-mounted rider monitoring device) that requires permission from the user to be released externally.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A method, comprising:
   receiving an indication of establishment of a network connection with a personal device, the personal device including at least a position sensor, the position sensor generating position data protected from network access by default and which can be unprotected for access upon request from one or more network services through one or more grants of permission by an end user of the personal device specifically granting position data network access to the one or more network services;
   selecting at least one service at least partly related to the personal device at least partly based on the receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out;

presenting, via the network connection with the personal device, an offer to carry out the selected at least one service at least partly related to the personal device in exchange for at least one network access to the position data protected from network access by default;

detecting an indication of a grant, by the end user of the personal device, of at least one network access to the position data protected from network access by default and at least one identifier of the end user of the personal device;

facilitating performance of at least a portion of the at least one service at least partly related to the personal device; and accessing, via the network connection with the personal device, the position data protected from network access by default and at least one identifier of the end user of the personal device responsive to the detecting an indication of a grant, by the end user of the personal device, of at least one network access to the position data protected from network access by default and at least one identifier of the end user of the personal device, wherein at least one of the receiving, selecting, presenting, detecting, facilitating, or accessing is at least partially implemented using at least one processing device.

2. A system, comprising:

circuitry for receiving an indication of establishment of a network connection with a personal device, the personal device including at least a position sensor, the position sensor generating position data protected from network access by default and which can be unprotected for access upon request from one or more network services through one or more grants of permission by an end user of the personal device specifically granting position data network access to the one or more network services;

circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out;

circuitry for presenting, via the network connection with the personal device, an offer to carry out the selected at least one service at least partly related to the personal device in exchange for at least one network access to the position data protected from network access by default;

circuitry for detecting an indication of a grant, by the end user of the personal device, of at least one network access to the position data protected from network access by default and at least one identifier of the end user of the personal device;

circuitry for facilitating performance of at least a portion of the at least one service at least partly related to the personal device; and circuitry for accessing, via the network connection with the personal device, the position data protected from network access by default and at least one identifier of the end user of the personal device responsive to the circuitry for detecting an indication of a grant, by the end user of the personal device, of at least one network access to the position data protected from network access by default and at least one identifier of the end user of the personal device.

3. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching location data indicating one or more airport locations as the at least one sample of data to determine at least one flight tracking service, at least one travel planning service, or at least one weather service at least partly related to the personal device to offer to carry out.

4. The system of claim 2, wherein circuitry for receiving an indication of establishment of a network connection with a personal device, the personal device including at least a position sensor, the position sensor generating position data protected from network access by default and which can be unprotected for access upon request from one or more network services through one or more grants of permission by an end user of the personal device specifically granting position data network access to the one or more network services comprises:

circuitry for receiving an indication of establishment of a network connection with a personal device, the personal device including at least a position sensor configured to collect position information to which the personal device controls network access.

5. The system of claim 4, wherein circuitry for receiving an indication of establishment of a network connection with a personal device, the personal device including at least a position sensor configured to collect position information to which the personal device controls network access comprises:

circuitry for receiving an indication of establishment of a network connection with a personal device, the personal device including at least a positioning sensor configured to collect position information of the personal device for which the personal device is configured to selectively allow access via the at least one network connection to one or more network services.

6. The system of claim 2, wherein circuitry for receiving an indication of establishment of a network connection with a personal device, the personal device including at least a position sensor, the position sensor generating position data protected from network access by default and which can be unprotected for access upon request from one or more network services through one or more grants of permission by an end user of the personal device specifically granting position data network access to the one or more network services comprises:
- circuitry for receiving an indication of establishment of a network connection with a personal device, the personal device including at least particular protected position data to which the personal device controls network access.

7. The system of claim 6, wherein circuitry for receiving an indication of establishment of a network connection with a personal device, the personal device including at least particular protected position data to which the personal device controls network access comprises:
- circuitry for receiving an indication of establishment of a network connection with a personal device, the personal device including at least velocity data to which the personal device controls network access.

8. The system of claim 6, wherein circuitry for receiving an indication of establishment of a network connection with a personal device, the personal device including at least particular protected position data to which the personal device controls network access comprises:
- circuitry for receiving an indication of establishment of a network connection with a personal device, the indication including at least an amount of particular protected position data to which the personal device controls network access.

9. The system of claim 8, wherein circuitry for receiving an indication of establishment of a network connection with a personal device, the indication including at least an amount of particular protected position data to which the personal device controls network access comprises:
- circuitry for receiving an indication of establishment of a network connection with a personal device, the indication including at least one type of particular protected position data stored on the personal device to which the personal device controls network access.

10. The system of claim 6, wherein circuitry for receiving an indication of establishment of a network connection with a personal device, the personal device including at least particular protected position data to which the personal device controls network access comprises:
- circuitry for receiving an indication of establishment of a network connection with a personal device, the indication including at least a property of particular protected position data to which the personal device controls network access.

11. The system of claim 10, wherein circuitry for receiving an indication of establishment of a network connection with a personal device, the indication including at least a property of particular protected position data to which the personal device controls network access comprises:
- circuitry for receiving an indication of establishment of a network connection with a personal device, the indication including at least data indicating that at least a portion of the particular protected position data corresponds to a predetermined condition.

12. The system of claim 10, wherein circuitry for receiving an indication of establishment of a network connection with a personal device, the indication including at least a property of particular protected position data to which the personal device controls network access comprises:
- circuitry for receiving an indication of establishment of a network connection with a personal device, the indication including at least data indicating that at least a portion of the particular protected position data includes more than a particular number of data points.

13. The system of claim 10, wherein circuitry for receiving an indication of establishment of a network connection with a personal device, the indication including at least a property of particular protected position data to which the personal device controls network access comprises:
- circuitry for receiving an indication of establishment of a network connection with a personal device, the indication including at least position data indicating that the particular protected portion includes at least a particular number of position data points meeting a particular condition.

14. The system of claim 10, wherein circuitry for receiving an indication of establishment of a network connection with a personal device, the indication including at least a property of particular protected position data to which the personal device controls network access comprises:
- circuitry for receiving an indication of establishment of a network connection with a personal device, the indication including at least data indicating that at least a portion of the particular protected position data indicates that the personal device was positioned at a particular location.

15. The system of claim 2, wherein circuitry for receiving an indication of establishment of a network connection with a personal device, the personal device including at least a position sensor, the position sensor generating position data protected from network access by default and which can be unprotected for access upon request from one or more network services through one or more grants of permission by an end user of the personal device specifically granting position data network access to the one or more network services comprises:
- circuitry for receiving an indication of establishment of a network connection with a personal device, the indication related to particular protected position data stored on the personal device to which the personal device controls network access.

16. The system of claim 15, wherein circuitry for receiving an indication of establishment of a network connection with a personal device, the indication related to particular protected position data stored on the personal device to which the personal device controls network access comprises:
- circuitry for receiving an indication of establishment of a network connection with a personal device, the indication including at least an anonymized version of particular protected position data stored on the personal device to which the personal device controls network access.

17. The system of claim 15, wherein circuitry for receiving an indication of establishment of a network connection with a personal device, the indication related to particular protected position data stored on the personal device to which the personal device controls network access comprises:
- circuitry for receiving an indication of establishment of a network connection with a personal device, the indication including at least obscured data corresponding to at least a portion of the particular protected position data stored on the personal device to which the personal device controls network access.

18. The system of claim 17, wherein circuitry for receiving an indication of establishment of a network connection with a personal device, the indication including at least obscured data corresponding to at least a portion of the particular protected position data stored on the personal device to which the personal device controls network access comprises:
    circuitry for receiving an indication of establishment of a network connection with a personal device, the indication including at least obscured data whose origin device has been obscured by altering a device identifier unique to that device, the obscured data corresponding to at least a portion of the particular protected position data stored on the personal device to which the personal device controls network access.

19. The system of claim 15, wherein circuitry for receiving an indication of establishment of a network connection with a personal device, the indication related to particular protected position data stored on the personal device to which the personal device controls network access comprises:
    circuitry for receiving an indication of establishment of a network connection with a personal device, the indication including at least locked data related to the particular protected position data, the particular protected data including at least collected data of the personal device and a device identifier, the locked data including at least the collected data of the personal device and an obfuscated identifier derived from the device identifier.

20. The system of claim 19, wherein circuitry for receiving an indication of establishment of a network connection with a personal device, the indication including at least locked data related to the particular protected position data, the particular protected data including at least collected data of the personal device and a device identifier, the locked data including at least the collected data of the personal device and an obfuscated identifier derived from the device identifier comprises:
    circuitry for receiving an indication of establishment of a network connection with a personal device, the indication including at least locked data related to the particular protected position data, the particular protected position data including at least collected data of the personal device and a device identifier, the locked data including at least position data of the personal device and an obfuscated identifier derived from the device identifier, the device identifier configured to be obtainable from the obfuscated identifier.

21. The system of claim 20, wherein circuitry for receiving an indication of establishment of a network connection with a personal device, the indication including at least locked data related to the particular protected position data, the particular protected position data including at least collected data of the personal device and a device identifier, the locked data including at least position data of the personal device and an obfuscated identifier derived from the device identifier, the device identifier configured to be obtainable from the obfuscated identifier comprises:
    circuitry for receiving an indication of establishment of a network connection with a personal device, the indication including at least locked data related to the particular protected position data, the particular protected data including at least collected position data of the personal device and a device identifier, the locked data including at least the position data of the personal device and an obfuscated identifier derived from the device identifier, the device identifier configured to be obtainable from the obfuscated identifier using a lookup table.

22. The system of claim 20, wherein circuitry for receiving an indication of establishment of a network connection with a personal device, the indication including at least locked data related to the particular protected position data, the particular protected position data including at least collected data of the personal device and a device identifier, the locked data including at least position data of the personal device and an obfuscated identifier derived from the device identifier, the device identifier configured to be obtainable from the obfuscated identifier comprises:
    circuitry for receiving an indication of establishment of a network connection with a personal device, the indication including at least locked data related to the particular protected position data, the particular protected data including at least collected position data of the personal device and a device identifier, the locked data including at least the position data of the personal device and an obfuscated identifier derived from the device identifier, the device identifier configured to be obtainable from the obfuscated identifier using a key data.

23. The system of claim 19, wherein circuitry for receiving an indication of establishment of a network connection with a personal device, the indication including at least locked data related to the particular protected position data, the particular protected data including at least collected data of the personal device and a device identifier, the locked data including at least the collected data of the personal device and an obfuscated identifier derived from the device identifier comprises:
    circuitry for receiving an indication of establishment of a network connection with a personal device, the indication including at least locked data related to the particular protected position data, the particular protected position data including at least collected position data of the personal device and a device identifier, the locked data including at least the collected position data of the personal device and an obfuscated identifier derived from the device identifier, the device identifier unable to be retrieved from the obfuscated identifier.

24. The system of claim 19, wherein circuitry for receiving an indication of establishment of a network connection with a personal device, the indication including at least locked data related to the particular protected position data, the particular protected data including at least collected data of the personal device and a device identifier, the locked data including at least the collected data of the personal device and an obfuscated identifier derived from the device identifier comprises:
    circuitry for receiving an indication of establishment of a network connection with a personal device, the indication including at least locked data related to the particular protected position data, the particular protected position data including at least collected position data of the personal device and a device identifier, the locked data including at least the collected position data of the personal device and an obfuscated identifier derived from the device identifier, the device identifier unable to be retrieved from the obfuscated identifier by the entity that acquired the locked data.

25. The system of claim 19, wherein circuitry for receiving an indication of establishment of a network connection with a personal device, the indication including at least locked data related to the particular protected position data, the particular protected data including at least collected data of the personal device and a device identifier, the locked data including at least the collected data of the personal device and an obfuscated identifier derived from the device identifier comprises:

circuitry for receiving an indication of establishment of a network connection with a personal device, the indication including at least locked data related to the particular protected position data, the particular protected position data including at least collected position data of the personal device and a device identifier, the locked data including at least the collected position data of the personal device and an obfuscated identifier derived from the device identifier, an ability to retrieve the device identifier from the obfuscated identifier being unknown from the locked data.

26. The system of claim 2, wherein circuitry for presenting, via the network connection with the personal device, an offer to carry out the selected at least one service at least partly related to the personal device in exchange for at least one network access to the position data protected from network access by default comprises:

circuitry for carrying out at least one action that assists in presentation of an offer to carry out the selected at least one service at least partly related to the personal device in exchange for at least one network access to the position data protected from network access by default.

27. The system of claim 2, wherein circuitry for presenting, via the network connection with the personal device, an offer to carry out the selected at least one service at least partly related to the personal device in exchange for at least one network access to the position data protected from network access by default comprises:

circuitry for presenting, via the network connection with the personal device, an offer to provide an application at least partly related to the personal device in exchange for at least one network access to the position data protected from network access by default.

28. The system of claim 27, wherein circuitry for presenting, via the network connection with the personal device, an offer to provide an application at least partly related to the personal device in exchange for at least one network access to the position data protected from network access by default comprises:

circuitry for presenting, via the network connection with the personal device, an offer to provide an application requiring access to the particular protected portion of the personal device to operate properly in exchange for at least one network access to the position data protected from network access by default.

29. The system of claim 27, wherein circuitry for presenting, via the network connection with the personal device, an offer to provide an application at least partly related to the personal device in exchange for at least one network access to the position data protected from network access by default comprises:

circuitry for presenting, via the network connection with the personal device, an offer to provide an application using data that is part of the position data protected from network access by default in exchange for at least one network access to the position data protected from network access by default.

30. The system of claim 27, wherein circuitry for presenting, via the network connection with the personal device, an offer to provide an application at least partly related to the personal device in exchange for at least one network access to the position data protected from network access by default comprises:

circuitry for presenting, via the network connection with the personal device, an offer to provide an application using data that is part of the particular protected portion of the personal device in exchange for at least one network access to the position data protected from network access by default for one or more purposes other than carrying out the application.

31. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for determining at least one service provided by at least one service provider that is providing a highest bid for facilitation of the offer of the at least one service to the personal device in association with matching the at least one sample of data with the at least one service provided by the at least one service provider.

32. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication conveying at least one property of the position data protected from network access by default.

33. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication conveying an amount of position data stored in at least a part of the position data protected from network access by default.

34. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication conveying a type of data stored in at least a part of the position data protected from network access by default.

35. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication identifying one or more sensors included as at least a part of the position data protected from network access by default.

36. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication including at least an anonymized version of data stored on the personal device as at least a part of the position data protected from network access by default.

37. The system of claim 2, wherein circuitry for presenting, via the network connection with the personal device, an offer to carry out the selected at least one service at least partly related to the personal device in exchange for at least one network access to the position data protected from network access by default comprises:

circuitry for presenting, via the network connection with the personal device, an offer to carry out the selected at least one service at least partly related to the personal device in exchange for data that will enable reversal of the anonymization.

38. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default for which data that uniquely identifies the personal device has been removed.

39. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default for which data that uniquely identifies the personal device has been altered.

40. The system of claim 2, wherein circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device, the indication including at least one sample of data collected by one or more sensors included as at least a part of the position data protected from network access by default, including at least matching velocity data indicating that the personal device spends at least one hour a day traveling between five and eight miles an hour as the at least one sample of data to determine at least one exercise service at least partly related to the personal device to offer to carry out.

41. The system of claim 2, wherein circuitry for selecting at least one service at least partly related to the personal device at least partly based on the circuitry for receiving an indication of establishment of a network connection with the personal device, the indication including at least one sample of data collected by one or more sensors included as at least a part of the position data protected from network access by default, including at least matching the at least one sample of data with one or more services to determine the at least one service at least partly related to the personal device to offer to carry out comprises:

circuitry for selecting at least one service at least partly related to the personal device at least partly based on the circuitry for receiving an indication of establishment of a network connection with a personal device that includes an anonymized version of position data collected by one or more position sensors of the personal device that are included as at least a part of the position data protected from network access by default.

42. The system of claim 41, wherein circuitry for selecting at least one service at least partly related to the personal device at least partly based on the circuitry for receiving an indication of establishment of a network connection with a personal device that includes an anonymized version of position data collected by one or more position sensors of the personal device that are included as at least a part of the position data protected from network access by default comprises:
circuitry for selecting at least one service associated with at least one particular geography at least partly based on the circuitry for receiving an indication of establishment of a network connection with a personal device that includes an anonymized version of location data collected by one or more position sensors of the personal device that are included as at least a part of the position data protected from network access by default, the at least one service associated with at least one particular geography selected at least partly based on the anonymized version of the location data collected by the one or more position sensors of the personal device.

43. The system of claim 2, wherein circuitry for facilitating performance of at least a portion of the at least one service at least partly related to the personal device comprises:
at least one of:
circuitry for providing, via the network connection with the personal device, one or more manipulations of data collected by the personal device to the personal device; or
circuitry for facilitating carrying out of at least a portion of a distance traveled service that at least calculates a distance traveled by the personal device at least partly based on one or more indications of position sensed by at least one protected location sensor of the personal device accessed via the network connection with the personal device.

44. The system of claim 2, wherein circuitry for accessing, via the network connection with the personal device, the position data protected from network access by default and at least one identifier of the end user of the personal device responsive to the circuitry for detecting an indication of a grant, by the end user of the personal device, of at least one network access to the position data protected from network access by default and at least one identifier of the end user of the personal device comprises:
circuitry for accessing, via the network connection with the personal device, the position data protected from network access by default and at least one identifier of the end user of the personal device by at least one service other than the at least one service in association with which access to the position data was granted by the end user of the personal device.

45. The system of claim 2, further comprising:
circuitry for detecting at least one unavailability via the network connection with the personal device of the position data protected from network access by default;
circuitry for inferring that the grant by the end user of the personal device of the at least one network access to the position data protected from network access by default has been revoked by the end user of the personal device; and
circuitry for terminating the performance of the at least one service at least partly related to the personal device responsive to revocation of the grant by the end user of the personal device of the at least one network access to the position data protected from network access.

46. The system of claim 2, wherein circuitry for accessing, via the network connection with the personal device, the position data protected from network access by default and at least one identifier of the end user of the personal device responsive to the circuitry for detecting an indication of a grant, by the end user of the personal device, of at least one network access to the position data protected from network access by default and at least one identifier of the end user of the personal device comprises:
circuitry for monitoring one or more movements of the personal device at least partially based on accessing, via the network connection with the personal device, the position data protected from network access by default and the at least one identifier of the end user of the personal device;
circuitry for storing in at least one database one or more movements of the end user of the personal device at least partially based on the monitored one or more movements of the personal device; and
circuitry for making the one or more movements of the end user of the personal device available via the at least one database to one or more entities for compensation.

47. The system of claim 46, further comprising:
circuitry for transmitting at least one offer to the personal device in association with at least one location of interest at least partly based on at least one indication of at least one movement of the personal device to within at least one proximity to the at least one location of interest.

48. A system, comprising:
at least one computing device; and
one or more instructions which, when executed by the at least one computing device, cause the at least one computing device to perform one or more operations including at least:
receiving an indication of establishment of a network connection with a personal device, the personal device including at least a position sensor, the position sensor generating position data protected from network access by default and which can be unprotected for access upon request from one or more network services through one or more grants of permission by an end user of the personal device specifically granting position data network access to the one or more network services;
selecting at least one service at least partly related to the personal device at least partly based on the receiving an indication of establishment of a network connection with a personal device, the indication including at least one sample of data collected by one or more sensors included as at least a part of the position data protected from network access by default, including at least matching the at least one sample of data with one or more services to determine the at least one service at least partly related to the personal device to offer to carry out;

presenting, via the network connection with the personal device, an offer to carry out the selected at least one service at least partly related to the personal device in exchange for at least one network access to the position data protected from network access by default;

detecting an indication of a grant, by the end user of the personal device, of at least one network access to the position data protected from network access by default and at least one identifier of the end user of the personal device;

facilitating performance of at least a portion of the at least one service at least partly related to the personal device; and accessing, via the network connection with the personal device, the position data protected from network access by default and at least one identifier of the end user of the personal device responsive to the detecting an indication of a grant, by the end user of the personal device, of at least one network access to the position data protected from network access by default and at least one identifier of the end user of the personal device.

* * * * *